US009689694B2

(12) United States Patent
Lord et al.

(10) Patent No.: US 9,689,694 B2
(45) Date of Patent: Jun. 27, 2017

(54) SYSTEM AND METHODS FOR FACILITATING REAL-TIME CARPOOLING

(71) Applicant: Elwha LLC, Bellevue, WA (US)

(72) Inventors: Richard T. Lord, Gig Harbor, WA (US); Robert W. Lord, Seattle, WA (US); Nathan P. Myhrvold, Medina, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/564,358

(22) Filed: Dec. 9, 2014

(65) Prior Publication Data

US 2015/0324717 A1 Nov. 12, 2015

Related U.S. Application Data

(63) Continuation of application No. 14/563,134, filed on Dec. 8, 2014, which is a continuation-in-part of application No. 14/318,182, filed on Jun. 27, 2014, and a continuation-in-part of application No. 14/329,451, filed on Jul. 11, 2014, which is a continuation-in-part of application No. 14/328,002, filed on Jul. 10, 2014, said application No.
(Continued)

(51) Int. Cl.
*G06Q 10/06* (2012.01)
*G01C 21/34* (2006.01)
*G06Q 50/30* (2012.01)

(52) U.S. Cl.
CPC ....... *G01C 21/343* (2013.01); *G01C 21/3438* (2013.01); *G06Q 10/06* (2013.01); *G06Q 10/06311* (2013.01); *G06Q 10/063114* (2013.01); *G06Q 50/30* (2013.01)

(58) Field of Classification Search
CPC .................. G06Q 10/06211; G06Q 50/30
USPC ....................................................... 701/410
See application file for complete search history.

(56) References Cited

U.S. PATENT DOCUMENTS 5,802,492 A 9/1998 DeLorme et al.
5,920,697 A 7/1999 Masters et al.
(Continued)

OTHER PUBLICATIONS

Dillenburg et al.; "The Intelligent Travel Assistant"; The IEEE 5th International conference on Intelligent Transportation Systems; Sep. 3-6, 2002; pp. 691-696; IEEE.
(Continued)

*Primary Examiner* — Anne M Antonucci

(57) ABSTRACT

Computationally implemented methods and systems that are designed for receiving a request for transport of a first end user; selecting, in response to the received request, a transportation vehicle unit that is currently en route to or is currently transporting a second end user for transporting the first end user, the selection of the transportation vehicle unit being based, at least in part, on ascertaining that the transportation vehicle unit is able to accommodate transport of the first end user while transporting the second end user; and transmitting one or more directives that direct the selected transportation vehicle unit to transport the first end user. In addition to the foregoing, other aspects are described in the claims, drawings, and text.

37 Claims, 27 Drawing Sheets

Related U.S. Application Data

14/563,134 is a continuation-in-part of application No. 14/456,627, filed on Aug. 11, 2014, which is a continuation of application No. 14/455,534, filed on Aug. 8, 2014, said application No. 14/563,134 is a continuation-in-part of application No. 14/476,042, filed on Sep. 3, 2014, which is a continuation of application No. 14/474,587, filed on Sep. 2, 2014, said application No. 14/563,134 is a continuation-in-part of application No. 14/511,706, filed on Oct. 10, 2014, which is a continuation of application No. 14/510,383, filed on Oct. 9, 2014, said application No. 14/563,134 is a continuation-in-part of application No. 14/537,313, filed on Nov. 10, 2014, which is a continuation of application No. 14/536,967, filed on Nov. 10, 2014.

(60) Provisional application No. 61/989,394, filed on May 6, 2014.

(56) References Cited

U.S. PATENT DOCUMENTS

| | | |
|---|---|---|
| 6,321,158 B1 | 11/2001 | DeLorme et al. |
| 7,312,712 B1 | 12/2007 | Worrall et al. |
| 7,840,427 B2 | 11/2010 | O'Sullivan |
| 7,957,871 B1 | 6/2011 | Echeruo |
| 8,626,366 B2 | 1/2014 | Noffsinger et al. |
| 8,688,532 B2 | 4/2014 | Khunger et al. |
| 8,775,070 B1 | 7/2014 | Bhatia |
| 8,831,677 B2 | 9/2014 | Villa-Real |
| 2002/0186144 A1 | 12/2002 | Meunier |
| 2003/0040944 A1 | 2/2003 | Hileman |
| 2009/0005963 A1 | 1/2009 | Jarvinen |
| 2009/0248587 A1 | 10/2009 | Van Buskirk |
| 2010/0280884 A1 | 11/2010 | Levine et al. |
| 2010/0332131 A1 | 12/2010 | Horvitz et al. |
| 2011/0059693 A1 | 3/2011 | O'Sullivan |
| 2011/0257883 A1 | 10/2011 | Kuznetsov |
| 2011/0288762 A1 | 11/2011 | Kuznetsov |
| 2012/0041675 A1* | 2/2012 | Juliver ............... G06Q 10/08 701/465 |
| 2012/0112696 A1 | 5/2012 | Ikeda et al. |
| 2012/0253654 A1* | 10/2012 | Sun .............................. 701/409 |
| 2013/0054139 A1 | 2/2013 | Bodin et al. |
| 2013/0131909 A1 | 5/2013 | Cooper et al. |
| 2013/0158861 A1 | 6/2013 | Lerenc |
| 2013/0158869 A1 | 6/2013 | Lerenc |
| 2013/0226365 A1 | 8/2013 | Brozovich |
| 2014/0094998 A1 | 4/2014 | Cooper et al. |
| 2014/0173511 A1 | 6/2014 | Lehmann et al. |
| 2015/0006005 A1 | 1/2015 | Yu et al. |
| 2015/0006072 A1 | 1/2015 | Goldberg et al. |
| 2015/0019132 A1 | 1/2015 | Gusikhin et al. |
| 2015/0025932 A1 | 1/2015 | Ross et al. |
| 2015/0278759 A1 | 10/2015 | Harris et al. |
| 2015/0294431 A1 | 10/2015 | Fiorucci |
| 2015/0323333 A1 | 11/2015 | Lord et al. |
| 2015/0323336 A1 | 11/2015 | Lord et al. |
| 2015/0324729 A1 | 11/2015 | Lord et al. |
| 2015/0324735 A1 | 11/2015 | Lord et al. |
| 2015/0324944 A1 | 11/2015 | Lord et al. |
| 2015/0324945 A1 | 11/2015 | Lord et al. |
| 2015/0325128 A1 | 11/2015 | Lord et al. |

OTHER PUBLICATIONS

Guc et al.; "Real-time, Scalable Route Planning using a Stream-Processing Infrastructure"; 2010 13$^{th}$ International IEEE Annual Conference on Intelligent Transportation Systems; Sep. 19-22, 2010; pp. 986-991; IEEE.

Lalos et al.; "A Framework for dynamic car and taxi pools with the use of Positioning Systems"; 2009 Computation World: Future Computing, Service Computation, Cognitive, Adaptive, Content, Patterns; bearing a date of 2009; pp. 385-391; IEEE Computer Society.

Shahzada et al.; "Dynamic Vehicle Navigation: An A* Algorithm Based Approach Using Traffic and Road Information"; 2011 International Conference on Computer Applications and Industrial Electronics; bearing a date of 2011; pp. 514-518; IEEE.

Boufraied, Amine; "A Diagnostic Approach for Advanced Tracking of Commercial Vehcles With Time Window Constraints"; IEEE Transaction on Intelligent Transportation Systems; bearing a date of Sep. 2013; pp. 1470-1479; vol. 14, No. 3; IEEE.

Fougeres et al; "A Push Service for Carpooling"; bearing a date of 2012 (created on Dec. 8, 2015); IEEE; 2012 IEEE International Conference on Green Computing and Communications, Conference on Internet of Things, and Conference on Cyber, Physical and Social Computing; pp. 685-691; IEEE Computer Society.

Megalingam et al; "Automated Wireless Carpooling System for an Eco-Friendly Travel"; bearing a date of 2011 (created on Dec. 8, 2015); IEEE; pp. 325-329.

Vaughn-Nichols, Steven J.; "Will Mobile Computing's Future be Location, Location, Location?"; IEEE; bearing a date of Feb. 2009; pp. 14-17; IEEE Computer Society.

Amey et al.; "'Real-Time' Ride sharing—The Opportunities and Challenges of Utilizing Mobile Phone Technology to Improve Rideshare Services"; Paper submitted to the 2011 Transportation Research Board Annual Meeting; bearing a date of Aug. 1, 2010; pp. 1-17.

* cited by examiner

**202\* Request Receiving Module**

302 Location Data Receiving Module

304 Preference Data Receiving Module

306 Image Data Receiving Module

FIG. 3A

**206\* Directive Transmitting Module**

332 Transport rate data Transmitting Module

FIG. 3C

**208\* Notification Transmitting Module**

334 Transport rate data Transmitting Module

FIG. 3D

**204\* Transport Vehicle Unit Selecting Module**

308 Identity Ascertaining Module

310 Location Ascertaining Module

312 En Route Ascertaining Module

314 Currently Transporting Ascertaining Module

316 Vehicle Location Compatibility Ascertaining Module

318 Rendezvous Location Compatibility Ascertaining Module

320 Destination Location Compatibility Ascertaining Module

322 Spatial Accommodation Ascertaining Module

324 Delay Compatibility Ascertaining Module

326 Passenger Drop Off Compatibility Ascertaining Module

328 Candidate Vehicle Ranking Module

330 Transport Rate Providing Module

FIG. 3B

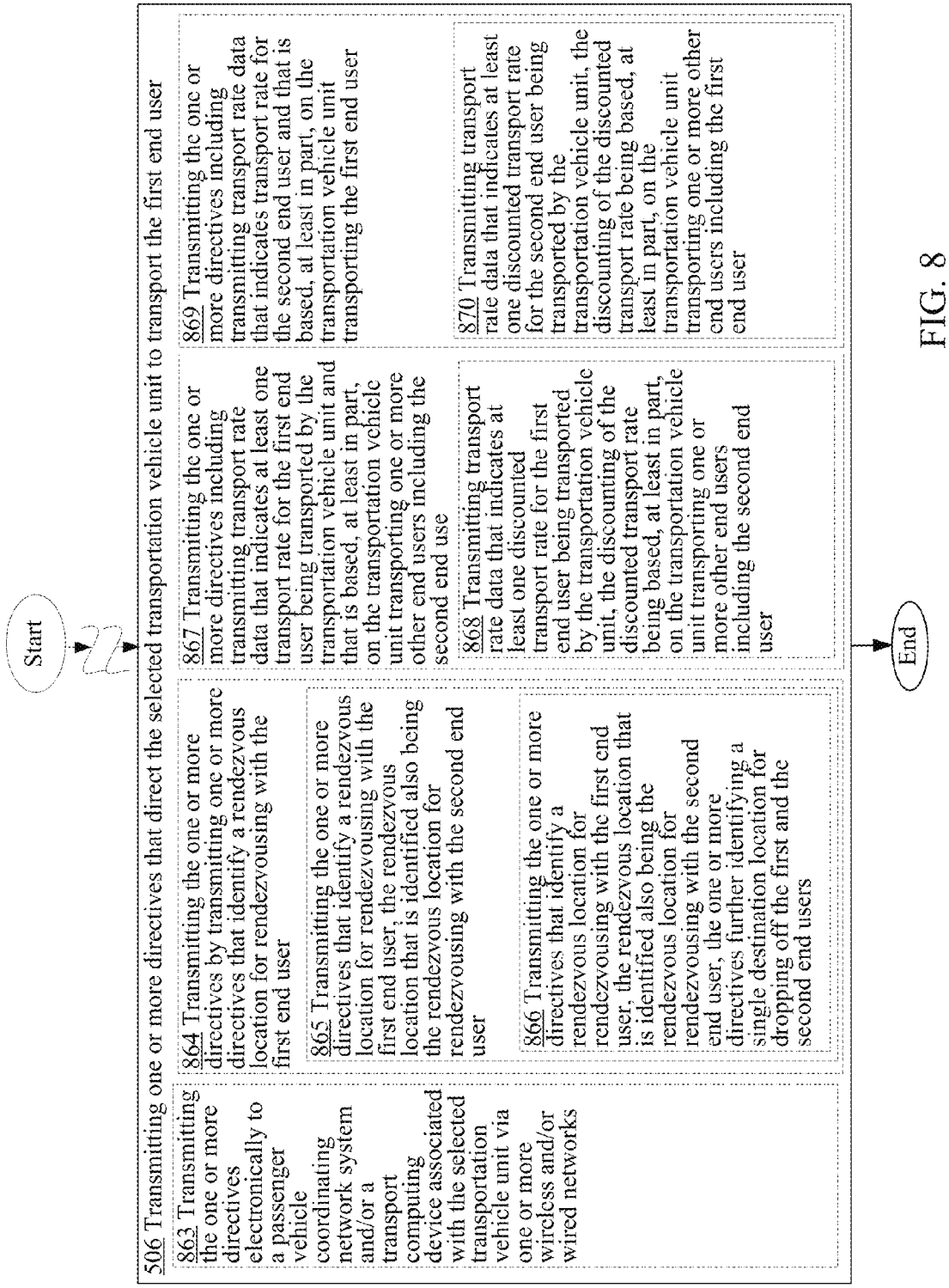

SYSTEM AND METHODS FOR FACILITATING REAL-TIME CARPOOLING

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 14/563,134, entitled SYSTEM AND METHODS FOR FACILITATING REAL-TIME CARPOOLING, naming Richard T. Lord, Robert W. Lord, Nathan P. Myhrvold, and Clarence T. Tegreene as inventors, filed 08 Dec. 2014, which is currently co-pending or is an application of which a currently co-pending application is entitled to the benefit of the filing date.

For purposes of the USPTO extra-statutory requirements, the present application claims benefit of priority of U.S. Provisional Patent Application No. 61/989,394titled RIDE-SHARING SCENARIOS, naming Richard T. Lord and Robert W. Lord as inventors, filed May 6, 2014 , which was filed within the twelve months preceding the filing date of the present application or is an application of which a currently co-pending application is entitled to the benefit of the filing date.

The present application constitutes a continuation-in-part of U.S. patent application Ser. No. 14/318,182, entitled METHODS, SYSTEMS, AND DEVICES FOR PROVIDING TRANSPORTATION SERVICES, naming Richard T. Lord, Robert W. Lord, Nathan P. Myhrvold, and Clarence T. Tegreene, as inventors, filed 27 Jun. 2014 .

The present application constitutes a continuation-in-part of U.S. patent application Ser. No. 14/329,451, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 11 Jul. 2014 , which is currently co-pending or is an application of which a currently co-pending application is entitled to the benefit of the filing date, and which is a continuation of U.S. patent application Ser. No. 14/328,002, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 10 Jul. 2014 .

The present application constitutes a continuation-in-part of U.S. patent application Ser. No. 14/456,627, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 11 Aug. 2014 , which is currently co-pending or is an application of which a currently co-pending application is entitled to the benefit of the filing date, and which is a continuation of U.S. patent application Ser. No. 14/455,534, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 8 Aug. 2014 .

The present application constitutes a continuation-in-part of U.S. patent application Ser. No. 14/476,042, entitled SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS, naming Richard T. Lord, Robert W. Lord, Nathan P. Myhrvold, and Clarence T. Tegreene, as inventors, filed 3 Sep. 2014 , which is currently co-pending or is an application of which a currently co-pending application is entitled to the benefit of the filing date, and which is a continuation of U.S. patent application Ser. No. 14/474,587, entitled SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS, naming Richard T. Lord, Robert W. Lord, Nathan P. Myhrvold, and Clarence T. Tegreene, as inventors, filed 2 Sep. 2014 .

The present application constitutes a continuation-in-part of U.S. patent application Ser. No. 14/511,706, entitled SYSTEM AND METHODS FOR DIRECTING ONE OR MORE TRANSPORTATION VEHICLE UNITS TO TRANSPORT ONE OR MORE END USERS, naming Richard T. Lord, Robert W. Lord, Nathan P. Myhrvold, and Clarence T. Tegreene, as inventors, filed 10 Oct. 2014 , which is currently co-pending or is an application of which a currently co-pending application is entitled to the benefit of the filing date, and which is a continuation of U.S. patent application Ser. No. 14/510,383, entitled SYSTEM AND METHODS FOR DIRECTING ONE OR MORE TRANSPORTATION VEHICLE UNITS TO TRANSPORT ONE OR MORE END USERS, naming Richard T. Lord, Robert W. Lord, Nathan P. Myhrvold, and Clarence T. Tegreene, as inventors, filed 9 Oct. 2014 .

The present application constitutes a continuation-in-part of U.S. patent application Ser. No. 14/537,313, entitled SYSTEM AND METHODS FOR VERIFYING THAT ONE OR MORE END USER TRANSPORT DIRECTIVES DO NOT CONFLICT WITH ONE OR MORE PACKAGE DELIVERY DIRECTIVES, naming Richard T. Lord, Robert W. Lord, Nathan P. Myhrvold, and Clarence T. Tegreene, as inventors, filed 10 Nov. 2014 , which is currently co-pending or is an application of which a currently co-pending application is entitled to the benefit of the filing date, and which is a continuation of U.S. patent application Ser. No. 14/536,967, entitled SYSTEM AND METHODS FOR VERIFYING THAT ONE OR MORE END USER TRANSPORT DIRECTIVES DO NOT CONFLICT WITH ONE OR MORE PACKAGE DELIVERY DIRECTIVES, naming Richard T. Lord, Robert W. Lord, Nathan P. Myhrvold, and Clarence T. Tegreene, as inventors, filed 10 Nov. 2014.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, receiving a request for transport of a first end user, selecting, in response to the received request, a transportation vehicle unit that is currently en route to or is currently transporting a second end user for transporting the first end user, the selection of the transportation vehicle unit being based, at least in part, on ascertaining that the transportation vehicle unit is able to accommodate transport of the first end user while transporting the second end user; and transmitting one or more directives that direct the selected transportation vehicle unit to transport the first end user. In various implementations, at least one of the above described operations is performed by a machine or an article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving a request for transport of a first end user, means for selecting, in response to the received request, a transportation vehicle unit that is currently en route to or is currently transporting a second end user for transporting the first end user, the selection of the transportation vehicle unit being based, at least in part, on ascertaining that the transportation vehicle unit is able to accommodate transport of the first end user while transporting the second end user; and means for transmitting one or more directives that direct the selected transportation vehicle unit to transport the first end user. In addition to the foregoing, other system aspects are described in the claims, drawings, and text forming a part of the disclosure set forth herein.

In one or more various aspects, a system includes, but is not limited to, circuitry for receiving a request for transport of a first end user, circuitry for selecting, in response to the received request, a transportation vehicle unit that is currently en route to or is currently transporting a second end user for transporting the first end user, the selection of the transportation vehicle unit being based, at least in part, on ascertaining that the transportation vehicle unit is able to accommodate transport of the first end user while transporting the second end user; and circuitry for transmitting one or more directives that direct the selected transportation vehicle unit to transport the first end user. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving a request for transport of a first end user, selecting, in response to the received request, a transportation vehicle unit that is currently en route to or is currently transporting a second end user for transporting the first end user, the selection of the transportation vehicle unit being based, at least in part, on ascertaining that the transportation vehicle unit is able to accommodate transport of the first end user while transporting the second end user, and transmitting one or more directives that direct the selected transportation vehicle unit to transport the first end user. In addition to the foregoing, other computer program product aspects are described in the claims, drawings, and text forming a part of the disclosure set forth herein.

In one or more various aspects, a system includes, but is not limited to a transportation vehicle unit selecting module configured to select, in response to receiving a request for transport of a first end user, a transportation vehicle unit that is currently en route to or is currently transporting a second end user for transporting the first end user, the selection of the transportation vehicle unit being based, at least in part, on ascertaining that the transportation vehicle unit is able to accommodate transport of the first end user while transporting the second end user; a directive transmitting module configured to transmit one or more directives that direct the selected transportation vehicle unit to transport the first end user; a notification transmitting module configured to transmit one or more notifications that provide notification that the selected transportation vehicle unit has been selected to transport the first end user; and one or more processors In one or more various aspects, a system includes, but is not limited to, circuitry configured to selecting, in response to receiving a request for transport of a first end user, a transportation vehicle unit that is currently en route to or is currently transporting a second end user for transporting the first end user, the selection of the transportation vehicle unit being based, at least in part, on ascertaining that the transportation vehicle unit is able to accommodate transport of the first end user while transporting the second end user; circuitry for transmitting one or more directives that direct the selected transportation vehicle unit to transport the first end user; and circuitry for transmitting one or more notifications that provide notification that the selected transportation vehicle unit has been selected to transport the first end user.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3A shows another perspective of the request receiving module 202* of FIGS. 2A and 2B (e.g., the request receiving module 202' of FIG. 2A or the request receiving module 202" of FIG. 2B) in accordance with various embodiments.

FIG. 3B shows another perspective of the transportation vehicle unit selecting module 204* of FIGS. 2A and 2B (e.g., the transportation vehicle unit selecting module 204' of FIG. 2A or the transportation vehicle unit selecting module 204" of FIG. 2B) in accordance with various embodiments.

FIG. 3C shows another perspective of the directive transmitting module 206* of FIGS. 2A and 2B (e.g., the directive transmitting module 206' of FIG. 2A or the directive transmitting module 206" of FIG. 2B) in accordance with various embodiments.

FIG. 3D shows another perspective of the notification transmitting module 208* of FIGS. 2A and 2B (e.g., the notification transmitting module 208' of FIG. 2A or the notification transmitting module 208" of FIG. 2B) in accordance with various embodiments.

FIG. 8 is a high-level logic flowchart of a process depicting alternate implementations of the directive transmitting operation 506 of FIG. 5.

DETAILED DESCRIPTION

Figure 1:
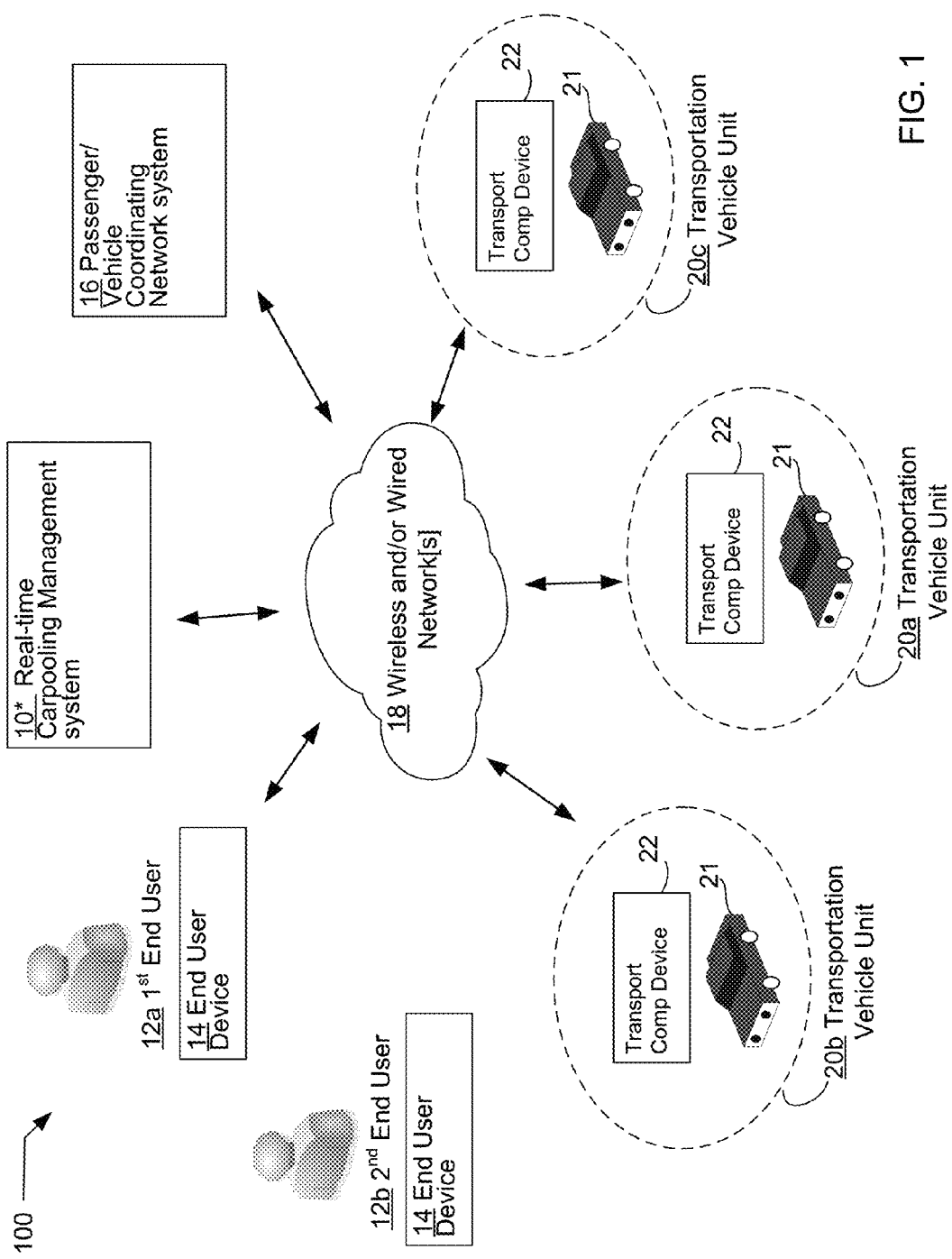
FIG. 1 illustrates a real-time carpooling management system 10* operating in an exemplary environment

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., WIKIPEDIA, High-level programming language, (as of Jun. 5, 2012, 21:00 GMT). In order to facilitate human comprehension, in many instances, high-level programming languages resemble or even share symbols with natural languages. See, e.g., WIKIPEDIA, (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., WIKIPEDIA, Logic gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., WIKIPEDIA, Computer architecture, (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "111100001010111100001111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., WIKIPEDIA, Instructions per second, (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mutt," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and RACK-SPACE). PaaS may include, e.g., one or more software and/or development tools hosted on an infrastructure (e.g., a computing platform and/or a solution stack from which the client can create software interfaces and applications, e.g., MICROSOFT AZURE). SaaS may include, e.g., software hosted by a service provider and accessible over a network (e.g., the software for the application and/or the data associated with that software application may be kept on the network, e.g., GOOGLE APPS, SALES FORCE). DaaS may include, e.g., providing desktop, applications, data, and/or services for the user over a network (e.g., providing a multi-application framework, the applications in the framework, the data associated with the applications, and/or services related to the applications and/or the data over the network, e.g., CITRIX). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One of the newest trends in the field of transportation/commuting particularly in urban settings is the development of transportation networking services provided by web-based companies such as UBER and LYFT that allow users to retain drivers/vehicles for transportation serves through, for example, mobile applications. The increasingly popularity of such "ridesharing" services have made some of the early entrants in this new field household names. As with many new technological ventures, the functionalities provided through such services are somewhat limited. However there appears to be ample opportunities for adding new and value adding functionalities to such services (as well as to more traditional transportation services such as Taxi services) in order to provide more robust transportation networking systems.

Generally, these types of online transportation services appear to provide services and functionalities that are basically already provided by traditional taxi and limo companies but being provided through the latest technological innovations (e.g., using the Internet and mobile devices such as Smartphones in order to request transport services). One possible future avenue for growth is providing true ridesharing services (e.g., carpooling) where nonaffiliated passengers (e.g., unassociated end users) are assigned for transport by a single vehicle. There are already a few online carpooling services that provide some level of carpooling services. However, these carpooling services generally provide basic carpooling services (e.g., providing a listing of vehicles/drivers that are scheduled to depart at a particular future time from one departure point and going to a particular destination point) that typically require arrangements in advance of a trip.

In accordance with various embodiments, systems and methods are presented herein that will allow for-hire passenger vehicles (herein "transportation vehicle units"), such as those provided by ridesharing or taxi services, to provide true "real-time" carpooling services (e.g., to assign a plurality of unassociated travelers to a single automobile within a small time window such as within 20 minutes from the time that the unassociated travelers request transport and to be efficiently transported to one or more destinations) as well as, in some cases, non-carpooling transport services. In some cases, for example, these systems and methods may be able to coordinate the matching of a transportation vehicle unit with a first end user (e.g., a passenger) who is interested in carpooling with other nonaffiliated or unassociated end users by selecting, in response to receiving a request for transport of the first end user, a transportation vehicle unit that is currently en route to or is already transporting a second end user for transporting the first end user, the selection of the transportation vehicle unit being based, at least in part, on ascertaining that the transportation vehicle unit is able to accommodate transport of the first end user while transporting the second end user.

In various embodiments, a transportation vehicle unit may comprise of a passenger vehicle such as a gas or electric powered automobile, a human or robotic driver, and a transport computing device such as a mobile computing device or a specialized dedicated computing device for receiving directives/assignments and for transmitting status information. In some embodiments, a transportation vehicle unit may be "currently en route" to transporting a second end user when the transportation vehicle unit is spatially approaching (e.g., nearing and being within 3 miles) a rendezvous location to rendezvous with the second end user. Note that the phrase "currently" may correspond to a point in time when the request for transport of the first end user is received (or alternatively, the point in time when the selection of a transportation vehicle unit for transport of the first end user is being made). As will be further described herein, a variety of factors may be considered when determining whether a particular transportation vehicle unit that is currently en route to or is already transporting a second end user is able to accommodate transport of the first end user while transporting the second end user. Some of these factors include, for example, the amount of delay time that may incur if the particular transportation vehicle unit transports the second end user to the second end user's destination and as a result of transporting the first end user, whether the first and second end users are to be picked up (e.g., secured) from the same rendezvous location and/or to be transported to the same destination location, and so forth.

In some embodiments, the systems and methods to be described herein may also be designed to rank "candidate" transportation vehicle units for transport of the first end users based on their suitability for transporting the first end user as well as other end users (e.g., a second end user). The ranking of the candidate transportation vehicle units may be particular useful, for example, when the initially selected transportation vehicle unit is unable to transport the first end user (for a variety of reasons including vehicle breakdowns or traffic delays) and a "backup" transportation vehicle unit is needed in order to transport the first end user. As will be further described herein, a variety of factors may be considered when ranking the candidate transportation vehicle units including, for example, their ability to efficiently transport their passengers to their destinations (e.g., destination locations).

In some embodiments, the systems and methods to be described herein may additionally or alternatively be designed to provide (e.g., generate or selectively retrieve) transport rates for the first end user and the second end user based, at least in part, on the selected transportation vehicle unit (which is en route to or is already transporting the second end user) transporting both the first and the second end users. In some cases, a discounted transported rate for the second end user may be provided based, at least in part, on the selected transportation vehicle unit being assigned to transport the first end user. In some cases, a premium transport rate (e.g., a relatively high transport rate) may be provided for the first end user as a result of being transported by the selected transportation vehicle unit. The providing of the premium transport rate for the first end user may be for a variety of reasons including, for example, to pay for a larger percentage of the total fee charged to all of the passengers being transported by the selected transportation vehicle unit (as a result, the second end user who may already be transported by the selected transportation vehicle unit may have to pay less).

Turning now to FIG. 1, which illustrates a real-time carpooling management system 10* operating in an exemplary environment 100. In various embodiments, the various operations and functionalities to be described herein may be implemented by the real-time carpooling management system 10*. In some embodiments, the real-time carpooling management system 10* may be a network device such as server or workstation, or a plurality of network devices such as servers, workstations, storage, and so forth (e.g., "the cloud"). Note that for purposes of the following description "*" represents a wildcard. Thus, references in the following description to, for example, "real-time carpooling management system 10*" may be in reference to the real-time carpooling management system 10' of FIG. 2A, as well as to the real-time carpooling management system 10" of FIG. 2B, which are two different implementations of the real-time carpooling management system 10* of FIG. 1.

As further illustrated in FIG. 1, the real-time carpooling management system 10* may communicate with a plurality of end users 12* (e.g., a first end user 12a and a second end user 12b) through end user devices 14, a passenger/vehicle coordinating network system 16, and multiple transportation vehicle units 20* (e.g., a transportation vehicle unit 20a, a transportation vehicle unit 20b, and a transportation vehicle unit 20b) via one or more wireless and/or wired networks 18. The one or more wireless and/or wired networks 18 may comprise of, for example, one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth. Note that for ease of illustration and simplicity, only two end users 12* (e.g., the first end user 12a and the second end user 12b) and only three transportation vehicle units 20* (e.g., the transportation vehicle unit 20a, the transportation vehicle unit 20b, and the transportation vehicle unit 20b) are illustrated. However, and as those of ordinary skill will recognize, a greater number of end users 12* and/or a greater number of transportation vehicle units 20* may be in communication with the real-time carpooling management system 10* in alternative embodiments.

In various embodiments, a particular end user device 14 may be associated with a particular end user 12*. An end user device 14 may be a mobile device (e.g., a Smartphone or tablet computer) or a personal computer (e.g., a laptop computer, a desktop computer, a workstation, and so forth). Although not clearly illustrated in FIG. 1, in various embodiments, the real-time carpooling management system 10* may communicate with a transportation vehicle unit 20* (which may comprise of, among other things, a transportation vehicle and a robotic or human driver) via a transport computing device 22 (e.g., a dedicated computing device or a general purpose mobile device such as a Smartphone or tablet computer) associated with the transportation vehicle unit 20* (or associated with a driver of the transportation vehicle unit 20*). Note that in various embodiments, and as illustrated in FIG. 1, a transport computing device 22 may be part of a transportation vehicle unit 20*.

In some embodiments, the real-time carpooling management system 10* may directly interact/communicate with an end user device 14 and/or transportation vehicle unit 20* via the one or more wireless and/or wired networks 18. In alternative embodiments, however, the real-time carpooling management system 10* may interface with an end user device 14 and/or a transportation vehicle unit 20* via a passenger/vehicle coordinating network system 16 (which may be located locally, for example in the same city), with respect to end users 12* and transportation vehicle units 20*. The passenger/vehicle coordinating network system 16 may be one or more network devices (e.g., servers or workstations) that may be associated with a third party (e.g., a taxi or car service company or a ridesharing company).

In various embodiments, the real-time carpooling management system 10* may be designed to receive a request for transport of a first end user 12a. In response to receiving the request, the real-time carpooling management system 10* may be design to select a transportation vehicle unit (e.g., the transportation vehicle unit 20a of FIG. 1, which may be referred to herein as the "selected" transportation vehicle unit 20a in the following description) that is currently en route to or is currently transporting a second end user 12b for transporting the first end user 12a, the selection of the transportation vehicle unit 20a being based, at least in part, on ascertaining that the transportation vehicle unit 20a is able to accommodate transport of the first end user 12a while transporting the second end user 12b.

After a transportation vehicle unit 20a has been selected to transport the first end user 12a, the real-time carpooling management system 10* may be designed to transmit one or more directives that direct the selected transportation vehicle unit 20a to transport the first end user 12a. In some embodiments, the one or more directives may be transmitted to a transport computing device 22 associated with the selected transportation vehicle unit 20a via one or more wireless and/or wired networks 18. In alternative embodiments, however, the one or more directives may be transmitted to a passenger/vehicle coordinating network system 16, which may relay the one or more directives (or a modified form thereof) to the transport computing device 22 associated with the selected transport vehicle unit 20a. In some embodiments, the real-time carpooling management system 10* may be further designed to transmit one or more notifications that provide a notification that the selected transportation vehicle unit 20a has been selected to transport the first end user 12a. In various implementations, the one or more notifications may be transmitted directly or indirectly (e.g., indirectly via the passenger/vehicle coordinating network system 16) to one or more end user devices 14 associated with one or more end users 12* (e.g., the first end user 12a and/or the second end user 12b).

The following example is provided in order to illustrate how the real-time carpooling management system 10* may, in some embodiments, arrange a first end user 12a to be transported by a carpooling vehicle that will be transporting one or more other end users (e.g., second end user 12b) who are not affiliated with the first end user 12a. For these embodiments, the arrangement and transport of the end user 12a by a carpooling vehicle (e.g., transportation vehicle unit 20a) may be executed in real-time (e.g., to have the first end user 12a be picked up by a carpooling vehicle within a small time window, such as within a 15 minute time window, which starts a point in time when the first end user 12a requests transport by a carpooling vehicle).

When the first end user 12a is ready to be transported by a carpooling vehicle, the first end user 12a may transmit a request for transport directly or indirectly (e.g., via the passenger/vehicle coordinating network system 16) to the real-time carpooling management system 10*. Upon receiving the request, the real-time carpooling management system 10* may select from a plurality of "available" transportation vehicle units 20* (e.g., an available transportation vehicle unit 20* may be a vehicle unit that is near the current location of the first end user 12a and that has spatial capacity to transport the first end user 12a), a transport vehicle unit 20a that is currently en route to or currently transporting other end users (e.g., a second end user 12b) that is ascertained to be able to accommodate transport of the first end user 12a while transporting one or more other end users (e.g., the second end user 12b). Note that purposes of this description, the transportation vehicle unit 20a of FIG. 1 will be designated as the "selected" vehicle unit that is selected to transport the first end user 12a while transporting one or more other end users including the second end user 12b.

As will be further described herein, various factors may be considered in selecting the transportation vehicle unit 20a for transporting the first end user 12a including, for example, the amount of delay that will result in transporting the second end user 12b to his or her destination if the selected transportation vehicle unit 20a does indeed transport the first end user 12a, the efficiency in transporting the first end user 12a and the second end user 12b to their destinations, the carpooling preferences of the first end user 12a and/or the second end user 12b, and so forth. In some embodiments, the selection of the transportation vehicle unit 20a (which is currently en route to secure the second end user 12b or currently transporting the second end user 12b) for transport of the first end user 12a may only be as a result of not initially finding any available non-carpooling vehicle (e.g., a transportation vehicle unit 20* that is not designated or assigned to be a carpooling vehicle) to transport the first end user 12a. That is, the first end user 12a may have a preference to use a non-carpooling vehicle for transport, and to be assigned to be transported by a carpooling vehicle only if no non-carpooling vehicle is found.

In some embodiments, the real-time carpooling management system 10* may provide (e.g., generate or retrieve) a first end user transport rate for the first end user 12a as well as a second end user transport rate (which may or may not be the same as the first end user transport rate) for the second end user 12b as a result of the first end user 12a being assigned to be transported by the transportation vehicle unit 20a (which is already assigned to or is already transporting the second end user 12b). In some embodiments, the second end user transport rate to be provided for the second end user 12b may be a discounted rate that is a result of the first end user 12b being assigned to be transported by the selected transportation vehicle unit 20a. In some cases, the second end user transport rate for the second end user 12b may be a revised transport rate from a previously presented second end user transport rate that was provided when the selected transportation vehicle unit 20a was not assigned to transport the first end user 12a. That is, the second end user 12b may be charged with a discounted transport rate as a result of having to share the transport vehicle (e.g., transportation vehicle unit 20a) with another end user (e.g., the first end user 12a).

In contrast, the first end user transport rate to be provided for the first end user 12a may be a discounted rate or a premium rate. That is, in some cases, the first end user transport rate may be a discounted rate as a result of the first end user 12a sharing the transport vehicle (e.g., transportation vehicle unit 20a) with another end user (e.g., the second end user 12b). In alternative cases, however, the first end user transported rate to be provided for the first end user 12a may be a premium transport rate (e.g., a higher transport rate than a rate that would have been charged if, for example, the transportation vehicle unit 20* was not transporting the second end user 12b). In various embodiments, the first end user transport rate and/or the second end user transport rate may be transmitted to a transport computing device 22 associated with the selected transportation vehicle unit 20a and/or to interested parties (e.g., the first end user 12a and/or the second end user 12b).

In various embodiments, and as part of the selection process, the real-time carpooling management system 10* may be designed to rank "candidate" transportation vehicle units (e.g., transportation vehicle unit 20*) for transporting the first end user 12a. The ranking may be based on a number of factors including, in some cases, the same types of factors used to select the transportation vehicle unit 20* for transporting the first end user 12a. The ranking of the candidate transportation vehicle units may be particular useful when, for example, the initially selected transportation vehicle unit (e.g., transportation vehicle unit 20a), which may be the top ranked transportation vehicle unit, is unable to transport the first end user 12a as a result of some unforeseen circumstances (e.g., the transportation vehicle unit 20a is delayed or unable to rendezvous with the first end user 12a due to traffic or vehicle breakdown).

After a transportation vehicle unit 20a (which is currently en route to transport the second end user 12a or is currently transporting the second end user 12b) has been selected for transporting the first end user 12a, the real-time carpooling management system 10* may be designed to transmit one or more directive that direct the selected transportation vehicle unit 20a to transport the first end user 12a. In various embodiments, the one or more directives that are transmitted may be transmitted directly or indirectly (e.g., via the passenger/vehicle coordinating network system 16) to a transport computing device 22 associated with the selected transportation vehicle unit 20a.

In various embodiments, the real-time carpooling management system 10* may, upon the transportation vehicle unit 20a having been selected to transport the first end user 12a, transmit one or more notifications that provide a notification that the selected transportation vehicle unit 20a has been selected to transport the first end user 12a. The one or more notifications may be transmitted to the first end user 12a and/or the second end user 12b through their end user device(s) 14.

Figure 4A:
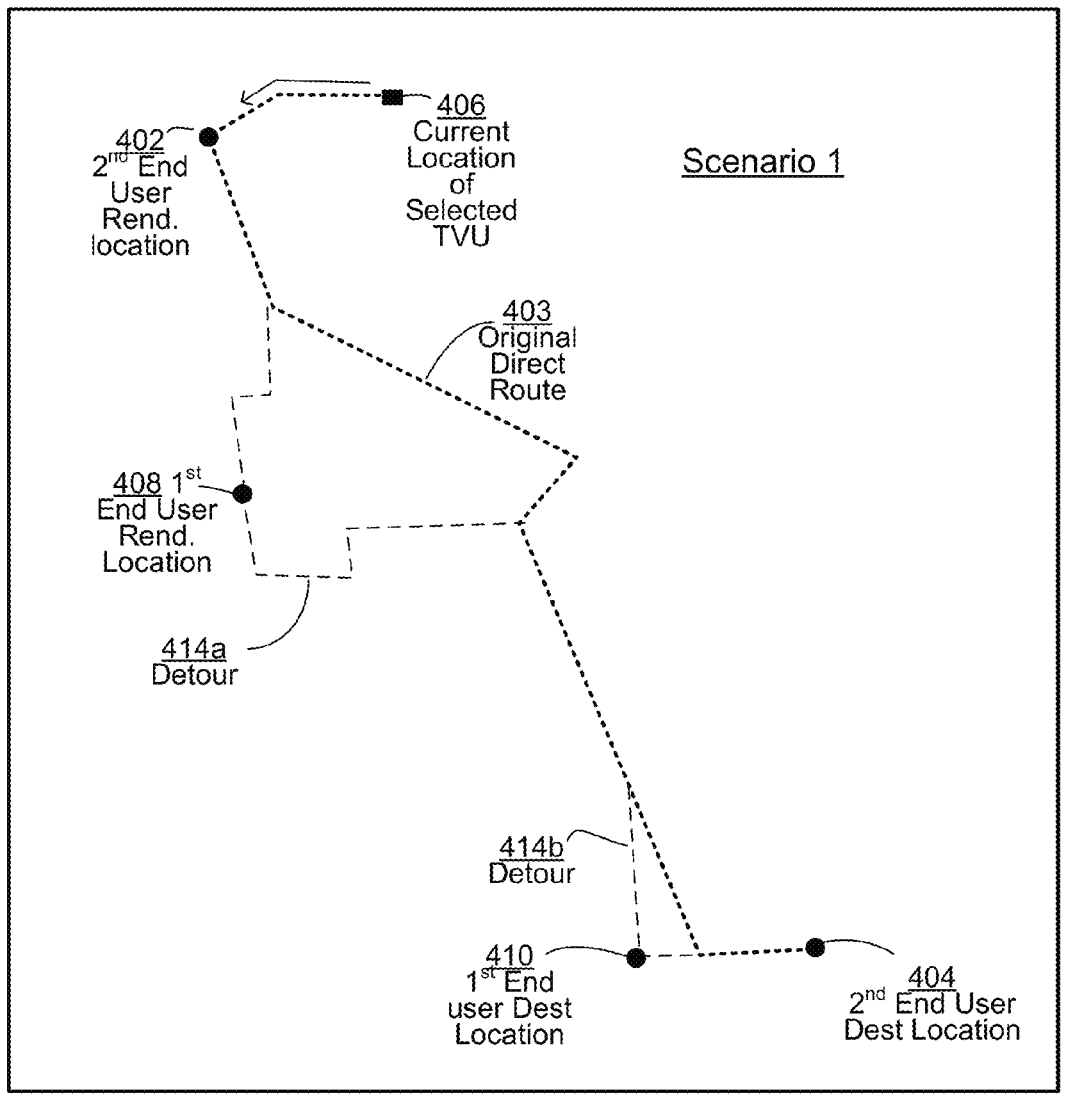
FIG. 4A illustrates an exemplary route that an example transportation vehicle unit 20a of FIG. 1 may use in order to transport carpooling passengers.

Turning now to FIGS. 4A to 4D, which illustrates various routes that the selected transportation vehicle unit 20a of FIG. 1 may use in order to transport the first end user 12a and the second end user 12b to their destination(s) (e.g., destination location(s)) for different example scenarios (e.g., scenario 1, scenario 2, scenario 3, and scenario 4). These scenarios may better facilitate understanding of the various concepts to be introduced with respect to the various operations and processes to be described herein. Referring particularly now to FIG. 4A, which illustrates a route that the selected transportation vehicle unit 20a of FIG. 1 may take in order to transport the first end user 12a and the second end user 12b to their destination locations (e.g., $1^{st}$ end user destination location 410 and $2^{nd}$ end user destination location 404) in accordance with scenario 1. In scenario 1, the transportation vehicle unit 20a (e.g., "selected" TVU or selected transportation vehicle unit) is en route to rendezvous with the second end user 12b at a second end user rendezvous location 402 when it is selected for transport of the first end user 12a.

As illustrated, the selected transportation vehicle unit 20a is depicted as being currently located at current location 406 when it is selected to transport the first end user 12a. FIG. 4A further illustrates an original direct route 403 that the transportation vehicle unit 20a could have taken to transport the second end user 12a from the second end user rendezvous location 402 to a second end user destination location 404 if the transportation vehicle unit 20a was not selected/assigned to transport the first end user 12a. However, because the transportation vehicle unit 20a is selected to transport the first end user 12a, the transportation vehicle unit 20a must take detour 414a in order to secure the first end user 12a from first end user rendezvous location 408 and take detour 414b to drop off the first end user 12a at a first end user destination location 410. As a result, the second end user 12b may be delayed in being transported to his/her destination location (e.g., second end user destination location 404). In various embodiments, the transport of the first end user 12a by the selected transportation vehicle unit 20a may be allowed so long as the delay in transporting the second end user 12b is permitted by the second end user 12b and/or permitted by a third party such as a ridesharing company associated with the real-time carpooling management system 10*.

Figure 4B:
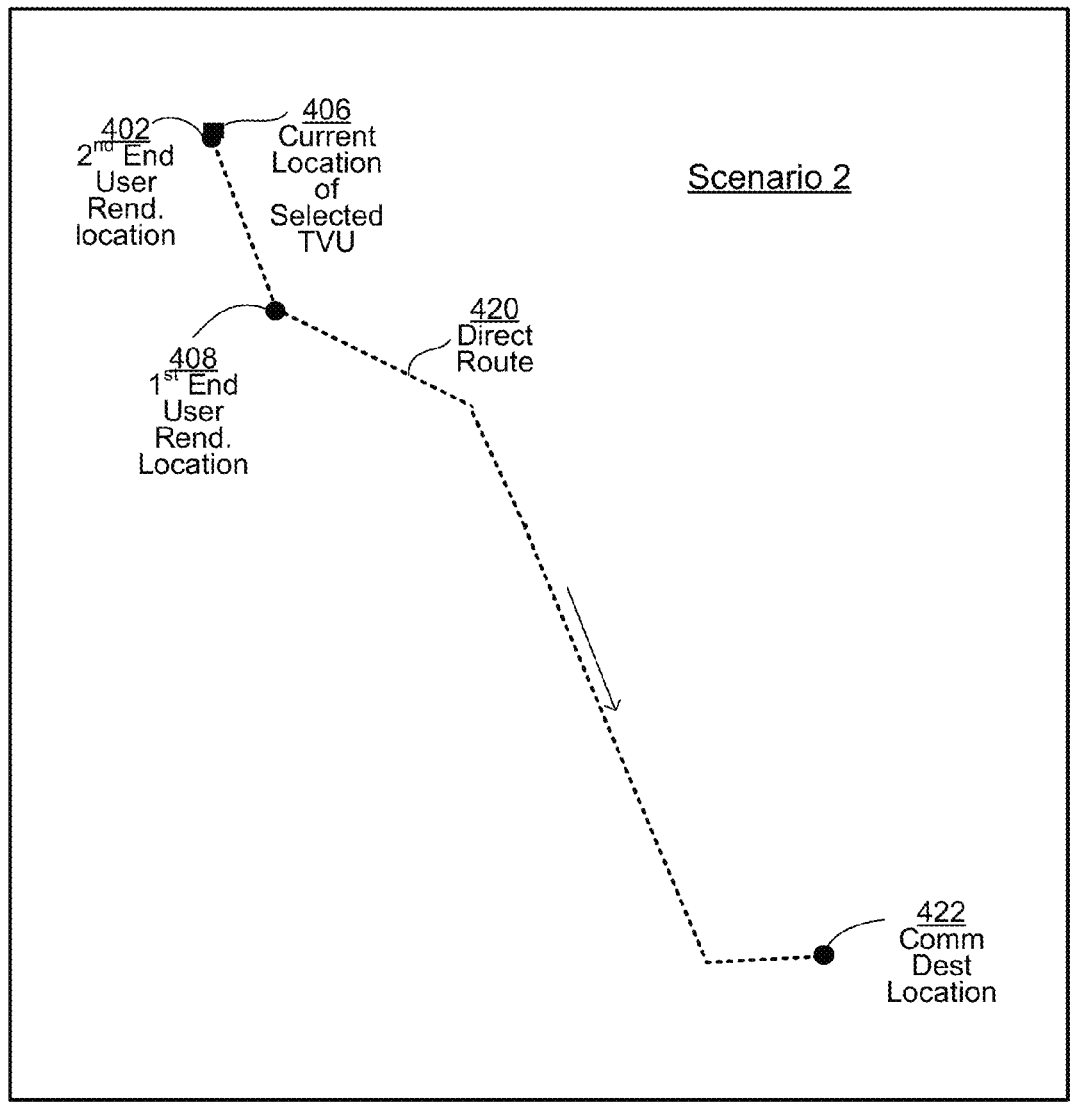
FIG. 4B illustrates another exemplary route that the example transportation vehicle unit 20a of FIG. 1 may use in order to transport carpooling passengers.

Turning now to FIG. 4B, which illustrates a scenario 2 in which the selected transportation vehicle unit 20a uses a particular route (e.g., direct route 420) to transport the first end user 12a and the second end user 12b to a common destination location 422. In contrast to scenario 1 illustrated in FIG. 4A, in scenario 2 both the first end user 12a and the second end user 12b are going to the same destination (e.g., common destination location 422). Further, the first end user rendezvous location 408 for rendezvousing with the first end user 12a is located along the direct route 420 for transporting the second end user 12b from a second end user rendezvous location 402 to the second end user's destination location (e.g., common destination location 422). In FIG. 4B, the selected transportation vehicle unit 20a is currently located, at a point in time when the transportation vehicle unit 20a is selected for transport of the first end user 12a, at current location 406 that is the same as the second end user rendezvous location 402. Thus, in scenario 2, the second end user 12b will not incur a significant delay because the first end user rendezvous location 408 is located along the direct route 420 and the first end user 12a is going to the same common destination location 422 as the second end user 12b. Scenario 2 reflects many true life situations. For example, scenario 2 may occur when a number of end users from the same general neighborhood are intent on attending the same sporting or concert event.

Figure 4C:
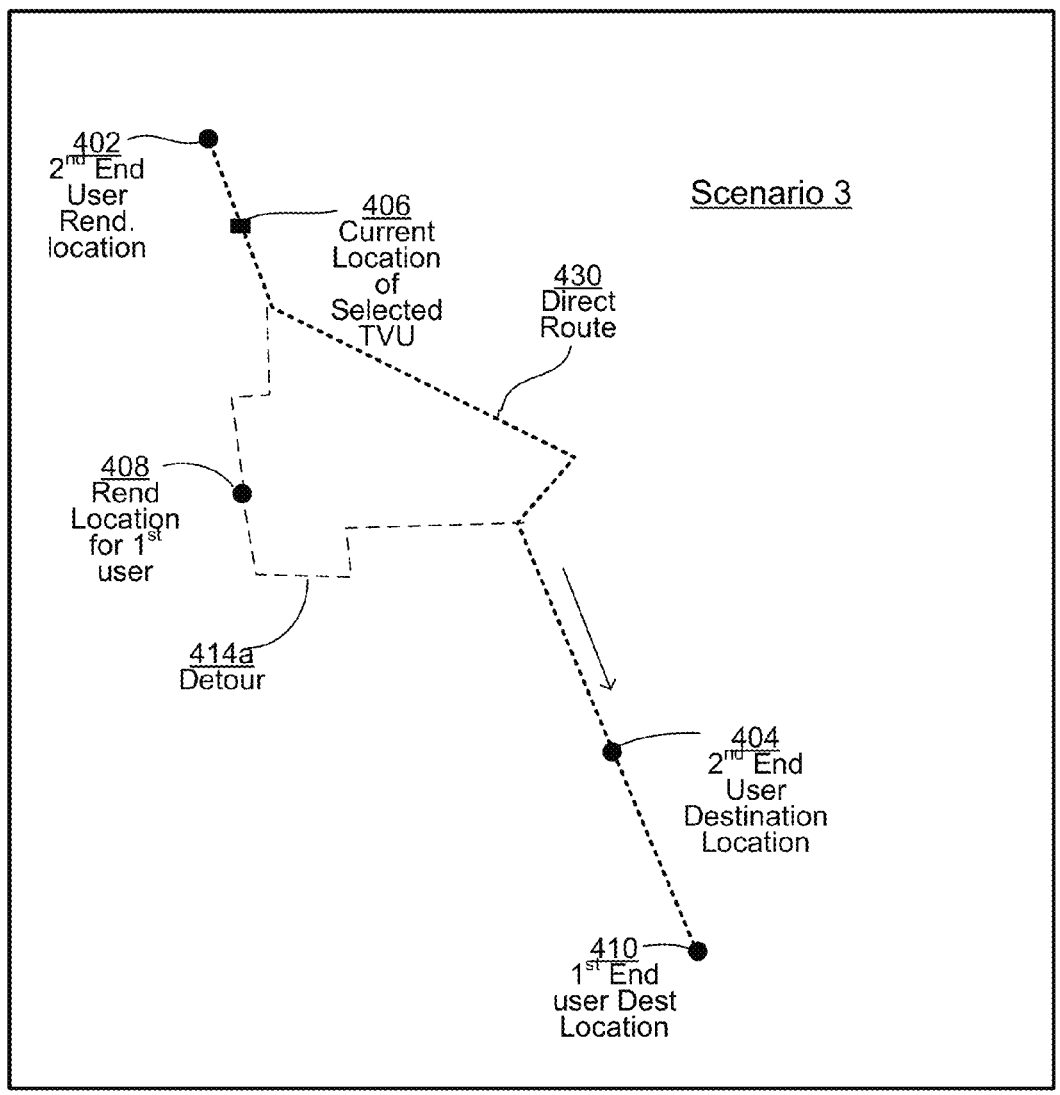
FIG. 4C illustrates another exemplary route that the example transportation vehicle unit 20a of FIG. 1 may use in order to transport carpooling passengers.

FIG. 4C illustrates a scenario 3 in which the selected transportation vehicle unit 20a is already transporting the second end user 12b when the transportation vehicle unit 20a is selected to transport the first end user 12a. As illustrated, when the transportation vehicle unit 20a is selected for transport of the first end user 12a, the transportation vehicle unit 20a is located at current location 406 along the direct route 430 from the second end user rendezvous location 402 to the second end user destination location 404 (which continues on to first end user destination location 410). In order to transport the first end user 12a, the selected transportation vehicle unit 20a uses a detour 414 to secure the first end user at rendezvous location 408. Note that in scenario 3, the first end user 12a is designated to be dropped off at first end user destination location 410, which is scheduled to occur after the second end user 12b has already been dropped off at a second end user destination location 404. Thus, the delay to transport the second end user 12b to his or her destination location (e.g., second end user destination location 404) as a result of the transportation vehicle unit 20a transporting the first end user 12a may be relatively minimal. That is, the only delay to the transport of the second end user 12b may be as a result of the transportation vehicle unit 20a being rerouted to rendezvous with the first end user 12a at the rendezvous location 408 using detour 414a.

Figure 4D:
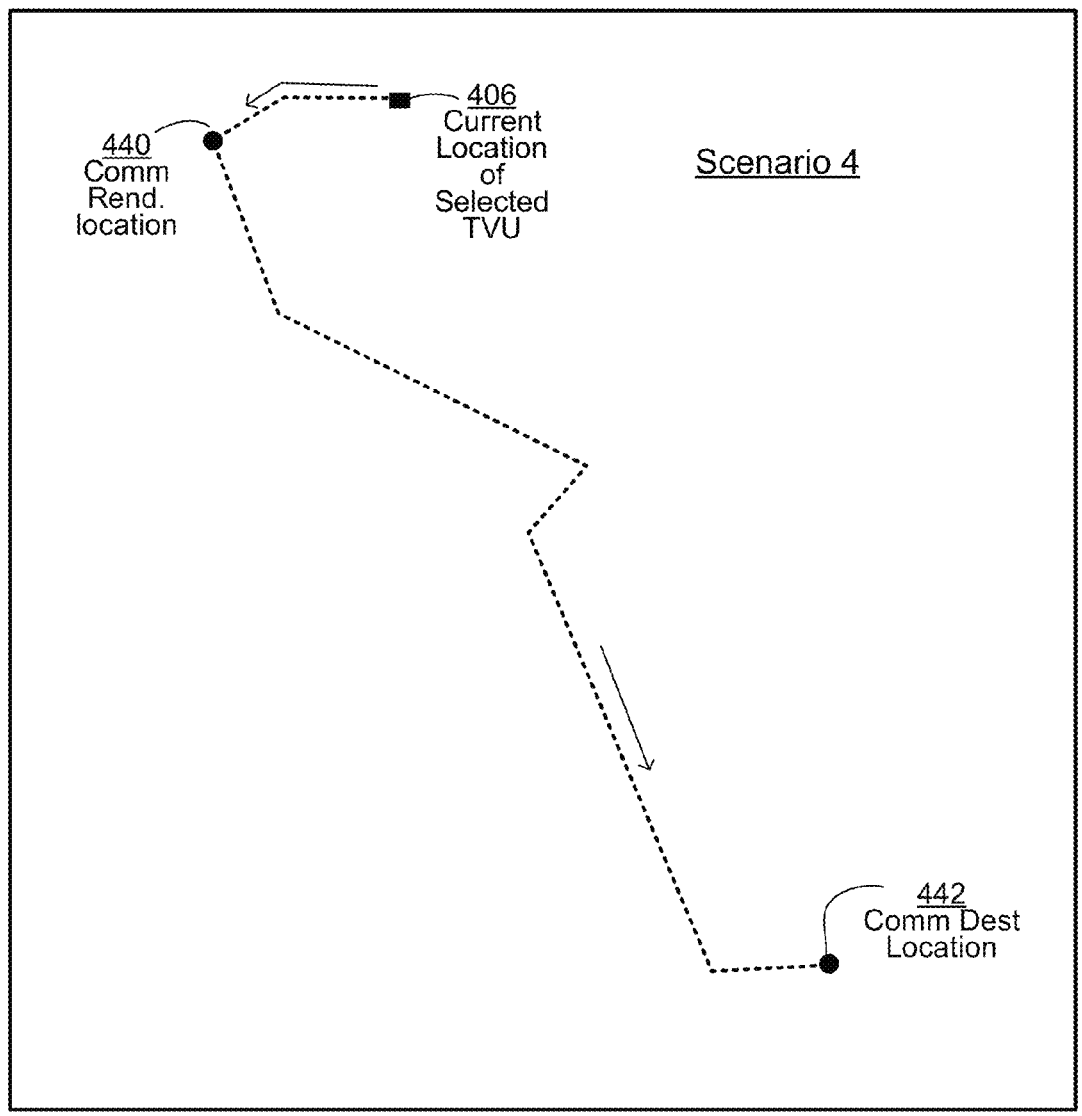
FIG. 4D illustrates another exemplary route that the example transportation vehicle unit 20a of FIG. 1 may use in order to transport carpooling passengers.

FIG. 4D illustrates a scenario 4 in which the selected transportation vehicle unit 20a is to rendezvous with the first end user 12a and the second end user 12b at a common rendezvous location 440 and to transport the first end user 12a and the second end user 12b to a common destination location 442. Because there are no detours, there is little or no delay to transport the second end user 12b to his/her destination (e.g., common destination location 442) except for any extended time that the transportation vehicle unit 20a may have to stay at the common rendezvous location 440 in order to wait for the arrival of the first end user 12a. There are several real life situations in which this scenario can occur. For example, at the end of a sporting event such as at a football game and a number of the spectators leaving the stadium with the intent to go to a popular bar/nightclub.

Figure 2A:
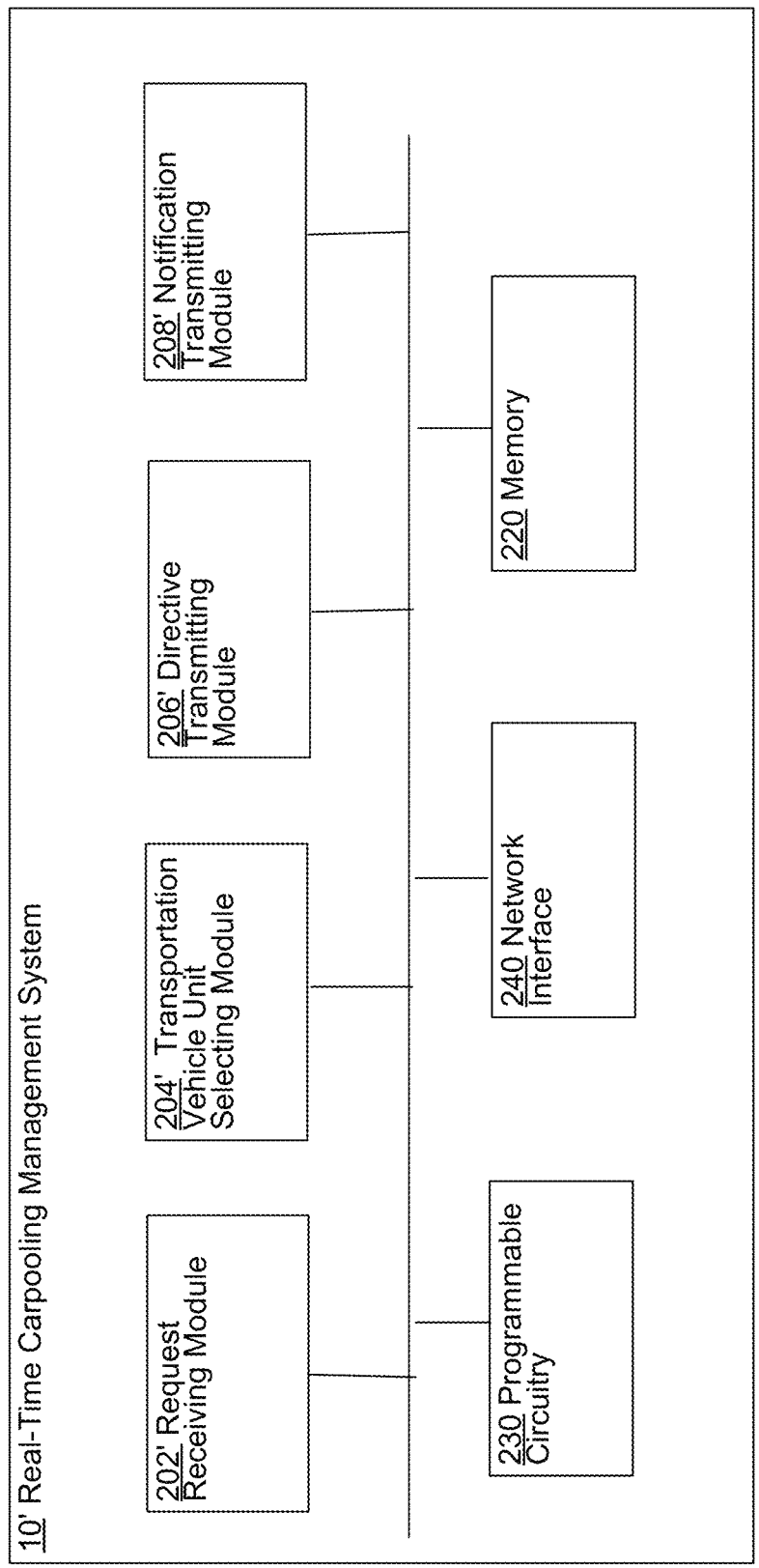
FIG. 2A shows a high-level block diagram of a particular implementation of the real-time carpooling management system 10* of FIG. 1.
Figure 2B:
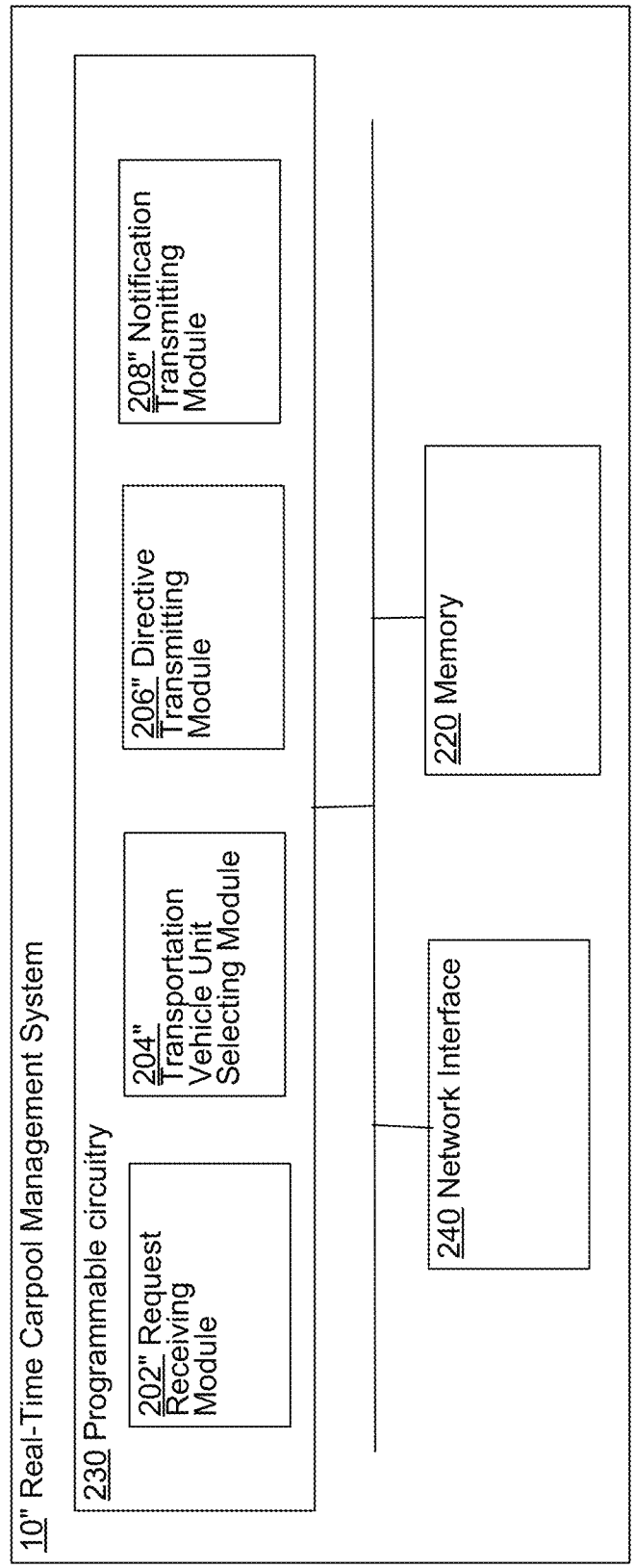
FIG. 2B shows another high-level block diagram of another implementation of the real-time carpooling management system 10* of FIG. 1.

Referring now to FIGS. 2A and 2B, which illustrate two block diagrams representing two different implementations of the real-time carpooling management system 10* of FIG. 1. In particular, and as will be further described herein, FIG. 2A illustrates a real-time carpooling management system 10' that is the "hardwired" or "hard" implementation of the real-time carpooling management system 10* that can implement the operations and processes to be described herein. The real-time carpooling management system 10' includes certain logic modules including a request receiving module 202', a transportation vehicle unit selecting module 204', a directive transmitting module 206', and a notification transmitting module 208' that are implemented using purely hardware or circuitry components (e.g., application specific integrated circuit (or ASIC). In contrast, FIG. 2B illustrates a real-time carpooling management system 10" that is the "soft" implementation of the real-time carpooling management system 10' of FIG. 2A in which certain logic modules including a request receiving module 202", a transportation vehicle unit selecting module 204", a directive transmitting module 206", and a notification transmitting module 208" are implemented using programmable circuitry 230 (e.g., one or more processors such as one or more microprocessors, controllers, CPUs, GPUs, etc.) executing one or more programming instructions (e.g., software).

The embodiments of the real-time carpooling management system 10* illustrated in FIGS. 2A and 2B (e.g., the real-time carpooling management system 10' of FIG. 2A and the real-time carpooling management system 10" of FIG. 2B) are two extreme implementations of the real-time carpooling management system 10* in which all of the logic modules (e.g., the request receiving module 202', the transportation vehicle unit selecting module 204', the directive transmitting module 206', and the notification transmitting module 208') are implemented using purely hardware solutions (e.g., circuitry such as ASIC) as illustrated in FIG. 2A or in which all of the logic modules (e.g., the request receiving module 202", the transportation vehicle unit selecting module 204", the directive transmitting module 206", and the notification transmitting module 208") are implemented using software solutions (e.g., programmable instructions being executed by programmable circuitry 230 such as field programmable gate array (FPGA) or one or more processors) as illustrated in FIG. 2B. Since there are many ways of combining hardware, software, and/or firmware in order to implement the various logic modules (e.g., the request receiving module 202*, the transportation vehicle unit selecting module 204*, the directive transmitting module 206*, and the notification transmitting module 208*), only the two extreme implementations (e.g., the purely hardware solution as illustrated in FIG. 2A and the software solution of FIG. 2B) are illustrated here. It should be noted here that with respect to the "soft" implementation illustrated in FIG. 2B, hardware in the form of programmable circuitry 230 such as one or more processors (or FPGAs) are still needed in order to execute the software. Further details related to the two implementations of real-time carpooling management system 10* illustrated in FIGS. 2A and 2B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 2A, which illustrates that the real-time carpooling management system 10', in addition to the request receiving module 202', the transportation vehicle unit selecting module 204', the directive transmitting module 206', and the notification transmitting module 208' may further include programmable circuitry 230 (e.g., microprocessors, controllers, and so forth), a network interface 240 (network interface card or NIC), and/or memory 220. In various embodiments, memory 220 may comprise of volatile and/or non-volatile memory. In some embodiments, memory 220 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, the memory 220 may be employed to store a variety of programming instructions (e.g., software) and data including data indicating end user preferences, vehicle characteristics including whether a particular vehicle is designated as a carpooling or non-carpooling vehicle, transport rates, vehicle statuses (e.g., whether a particular transportation vehicle unit 20* is currently on a run or is available for new pickups), and so forth.

Turning now to FIG. 2B, which illustrates a real-time carpooling management system 10" in which certain logic modules (the request receiving module 202", the transportation vehicle unit selecting module 204", the directive transmitting module 206", and the notification transmitting module 208") are implemented using programmable circuitry 230. In addition, the real-time carpooling management system 10" may further include a memory 220 (which may include programming instructions to execute the various logic modules) and a network interface 240 similar to the real-time carpooling management system 10' of FIG. 2A.

In various embodiments the request receiving module 202* of FIG. 2A or 2B (e.g., the request receiving module 202' of FIG. 2A or the request receiving module 202" of FIG. 2B) may be configured to, among other things, receive a request for transport of a first end user 12a. In contrast, the transportation vehicle unit selecting module 204* of FIG. 2A or 2B (e.g., the transportation vehicle unit selecting module 204' of FIG. 2A or the transportation vehicle unit selecting module 204" of FIG. 2B) may be configured to, among other things, select, in response to receiving the request for transport of a first end user 12a, a transportation vehicle unit 20a that is currently en route to or is currently transporting a second end user 12b for transporting the first end user 12a, the selection of the transportation vehicle unit 20a being based, at least in part, on ascertaining that the transportation vehicle unit 20a is able to accommodate transport of the first end user 12a while transporting the second end user 12b. Meanwhile, the directive transmitting module 206* of FIG. 2A or 2B (e.g., the directive transmitting module 206' of FIG. 2A or the directive transmitting module 206" of FIG. 2B) may be configured to, among other things, transmit one or more directives that direct the selected transportation vehicle unit 20a to transport the first end user 12a. On the other hand, the notification transmitting module 208* (e.g., the notification transmitting module 208' of FIG. 2A or the notification transmitting module 208" of FIG. 2B) may be configured to, among other things, transmit one or more notifications that provide notification that the selected transportation vehicle unit 20a has been selected to transport the first end user 12a.

Referring now to FIG. 3A illustrating a particular implementation of the request receiving module 202* (e.g., the request receiving module 202' or the request receiving module 202") of FIG. 2A or 2B. As illustrated, the request receiving module 202* may include one or more sub-logic modules in various alternative implementations. For example, in various embodiments, the request receiving module 202* may further include a location data receiving module 302, a preference data receiving module 304, and/or an image data receiving module 306. Specific details related to the request receiving module 202* as well as the above-described sub-modules of the request receiving module 202* will be provided below with respect to the operations and processes to be described herein.

FIG. 3B illustrates a particular implementation of the transportation vehicle unit selecting module 204* (e.g., the transportation vehicle unit selecting module 204' or the transportation vehicle unit selecting module 204") of FIG. 2A or 2B. As illustrated, the transportation vehicle unit selecting module 204* may include one or more sub-logic modules in various alternative implementations. For example, in various embodiments, the transportation vehicle unit selecting module 204* may further include an identity ascertaining module 308, a location ascertaining module 310, an en route ascertaining module 312, a currently transporting ascertaining module 314, a vehicle location compatibility ascertaining module 316, a rendezvous location compatibility ascertaining module 318, a destination location compatibility ascertaining module 320, a spatial accommodation ascertaining module 322, a delay compatibility ascertaining module 324, a passenger drop off compatibility ascertaining module 326, a candidate vehicle ranking module 328, and/or a transport rate providing module 330. Specific details related to the transportation vehicle unit selecting module 204* as well as the above-described sub-modules of the transportation vehicle unit selecting module 204* will be provided below with respect to the operations and processes to be described herein.

Referring now to FIG. 3C illustrating a particular implementation of the directive transmitting module 206* (e.g., the directive transmitting module 206' or the directive transmitting module 206") of FIG. 2A or 2B. As illustrated, the directive transmitting module 206* may include one or more sub-logic modules in various alternative implementations. For example, in various embodiments, the directive transmitting module 206* may further include a transport rate data transmitting module 332. Specific details related to the directive transmitting module 206* as well as the above-described sub-module of the directive transmitting module 206* will be provided below with respect to the operations and processes to be described herein.

Referring now to FIG. 3D illustrating a particular implementation of the notification transmitting module 208* (e.g., the notification transmitting module 208' or the notification transmitting module 208") of FIG. 2A or 2B. As illustrated, the notification transmitting module 208* may include one or more sub-logic modules in various alternative implementations. For example, in various embodiments, the notification transmitting module 208* may further include a transport rate data transmitting module 334 (which in some cases, may be the same as the transport rate data transmitting module 332 of FIG. 3C). Specific details related to the notification transmitting module 208* as well as the above-described sub-module of the notification transmitting module 208* will be provided below with respect to the operations and processes to be described herein.

Figure 5:
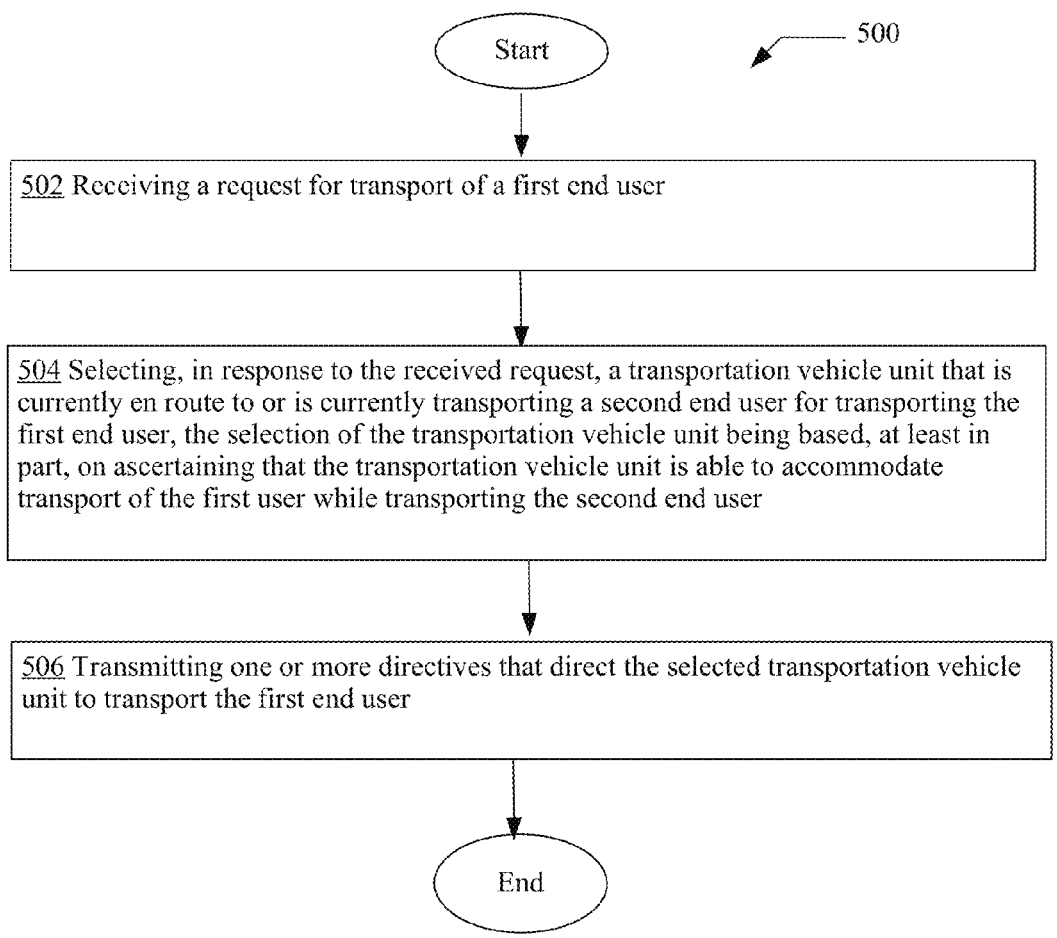
FIG. 5 is a high-level logic flowchart of a process, e.g., operational flow 500, according to some embodiments.

In the following, various operations associated with the above described real-time carpooling management system 10* (e.g., the real-time carpooling management system 10' of FIG. 2A or the real-time carpooling management system 10" of FIG. 2B) will be presented in accordance with various alternative embodiments. FIG. 5, for example, illustrates an operational flow 500 representing example computationally-implemented operations that may be implemented for, among other things, selecting a transportation vehicle unit for transporting a first end user that is currently en route to or is currently transporting a second end user, the selection of the transportation vehicle unit being based, at least in part, on ascertaining that the transportation vehicle unit is able to accommodate transport of the first user while transporting the second end user.

In FIG. 5 and in the following figures that include various examples of operational flows, discussions and explanations will be provided with respect to the real-time carpooling management system 10* described above and as illustrated in FIGS. 2A, 2B, 3A, 3B, 3C, and 3D, and/or with respect to other examples (e.g., as provided in FIGS. 1, 4A, 4B, 4C, and 4D) and contexts. However, it should be understood that the operational flows may be executed in a number of other environments and contexts, and/or in modified versions of FIGS. 1, 2A, 2B, 3A, 3B, 3C, 3D, 4A, 4B, 4C, and/or 4D. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a request receiving operation 502 for receiving a request for transport of a first end user. For instance, and as illustration, the request receiving module 202* of the real-time carpooling management system 10* of FIG. 2A or 2B (e.g., the request receiving module 202' of FIG. 2A or the request receiving module 202" of FIG. 2B) receiving a request (e.g., a request for a transportation vehicle unit 20*) for transport of a first end user 12a. In various implementations, the request may be received from an end user device 14 (e.g., a PC or a mobile computing device such as a Smartphone) or from a passenger/vehicle coordinating network system 16 (e.g., a network device such as a workstation or a server associated with a third party).

Operational flow 500 may also include a transportation vehicle unit selecting operation 504 for selecting, in response to the received request, a transportation vehicle unit that is currently en route to or is currently transporting a second end user for transporting the first end user, the selection of the transportation vehicle unit being based, at least in part, on ascertaining that the transportation vehicle unit is able to accommodate transport of the first end user while transporting the second end user. For instance, the transportation vehicle unit selecting module 204* (e.g., the transportation vehicle unit selecting module 204' of FIG. 2A or the transportation vehicle unit selecting module 204" of FIG. 2B) of the real-time carpooling management system 10* of FIG. 2A or 2B selecting from one or more transportation vehicle units 20* determined to be near the current location of the first end user 12a and in response to the received request a transportation vehicle unit 20a that is currently en route to (e.g., traveling to) or is currently transporting a second end user 12b for transporting the first end user 12a, the selection of the transportation vehicle unit 20a being based, at least in part, on ascertaining that the transportation vehicle unit 20a is able to accommodate (e.g., having sufficient space, is in the proximate vicinity of the first end user 12a, is already assigned to transport the second end user 12b to a destination near the destination of the first end user 12a) transport of the first end user 12a while transporting the second end user 12b. Note that in various embodiments, the use of the word "currently" may be in reference to the point in time when the request for transport of the first end user 12a is received.

As further illustrated in FIG. 5, operational flow 500 may further include a directive transmitting operation 506 for transmitting one or more directives that direct the selected transportation vehicle unit to transport the first end user. For instance, the directive transmitting module 206* (e.g., the directive transmitting module 206' of FIG. 2A or the directive transmitting module 206" of FIG. 2B) of the real-time carpooling management system 10* of FIG. 2A or 2B transmitting one or more directives that direct (e.g., electronically instruct) the selected transportation vehicle unit 20a to transport the first end user 12a.

Figure 6A:
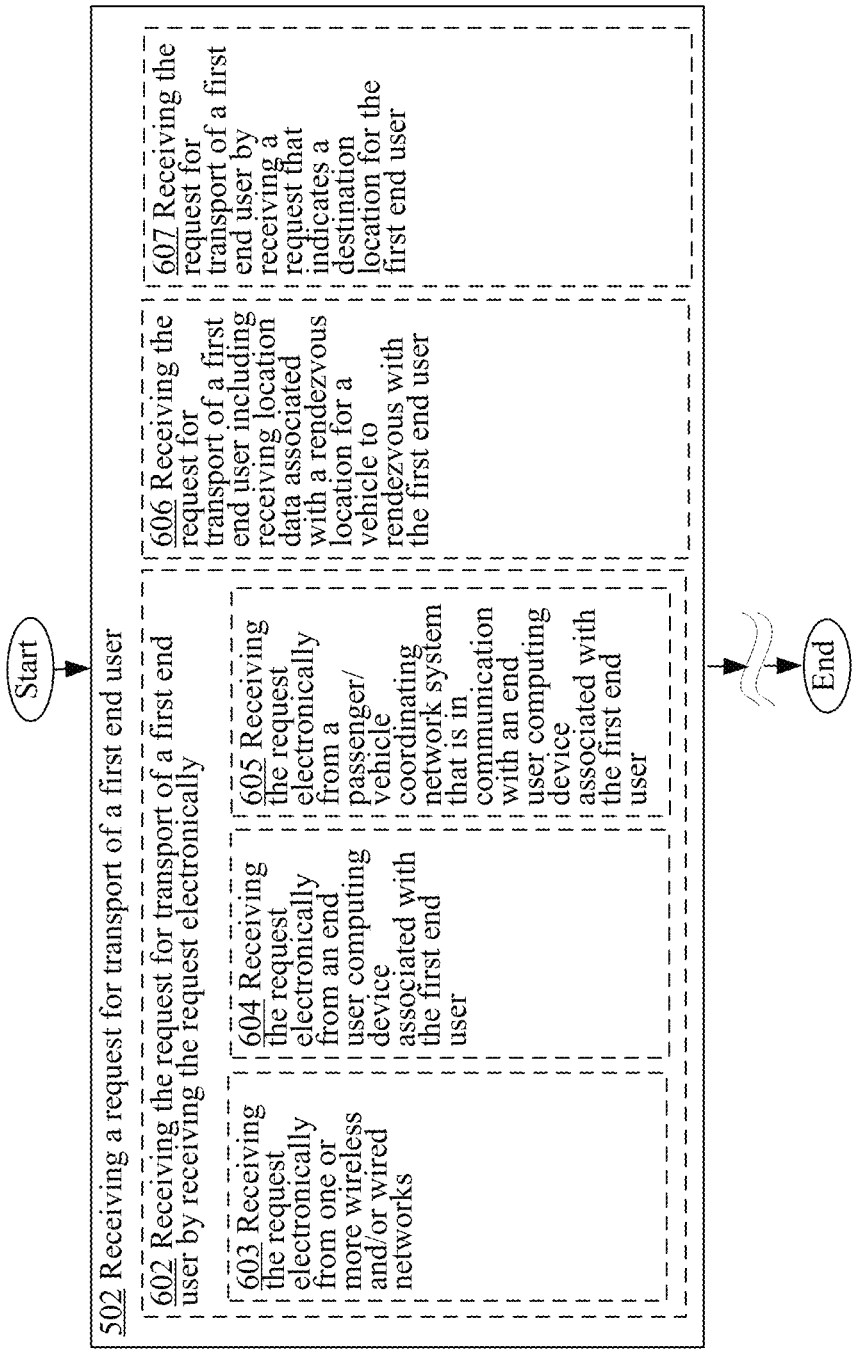
FIG. 6A is a high-level logic flowchart of a process depicting alternate implementations of the request receiving operation 502 of FIG. 5.
Figure 6B:
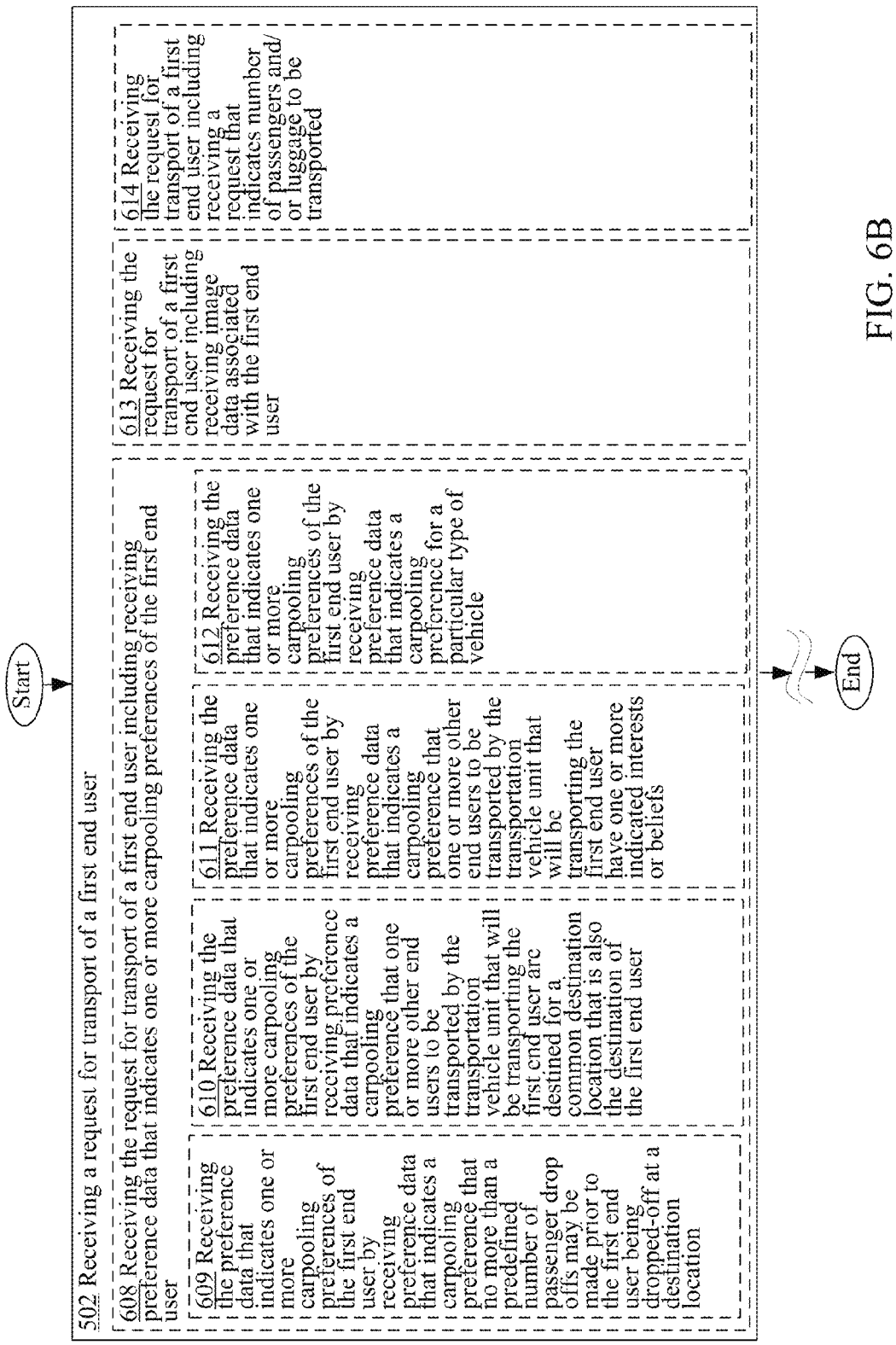
FIG. 6B is a high-level logic flowchart of a process depicting alternate implementations of the request receiving operation 502 of FIG. 5.
Figure 6C:
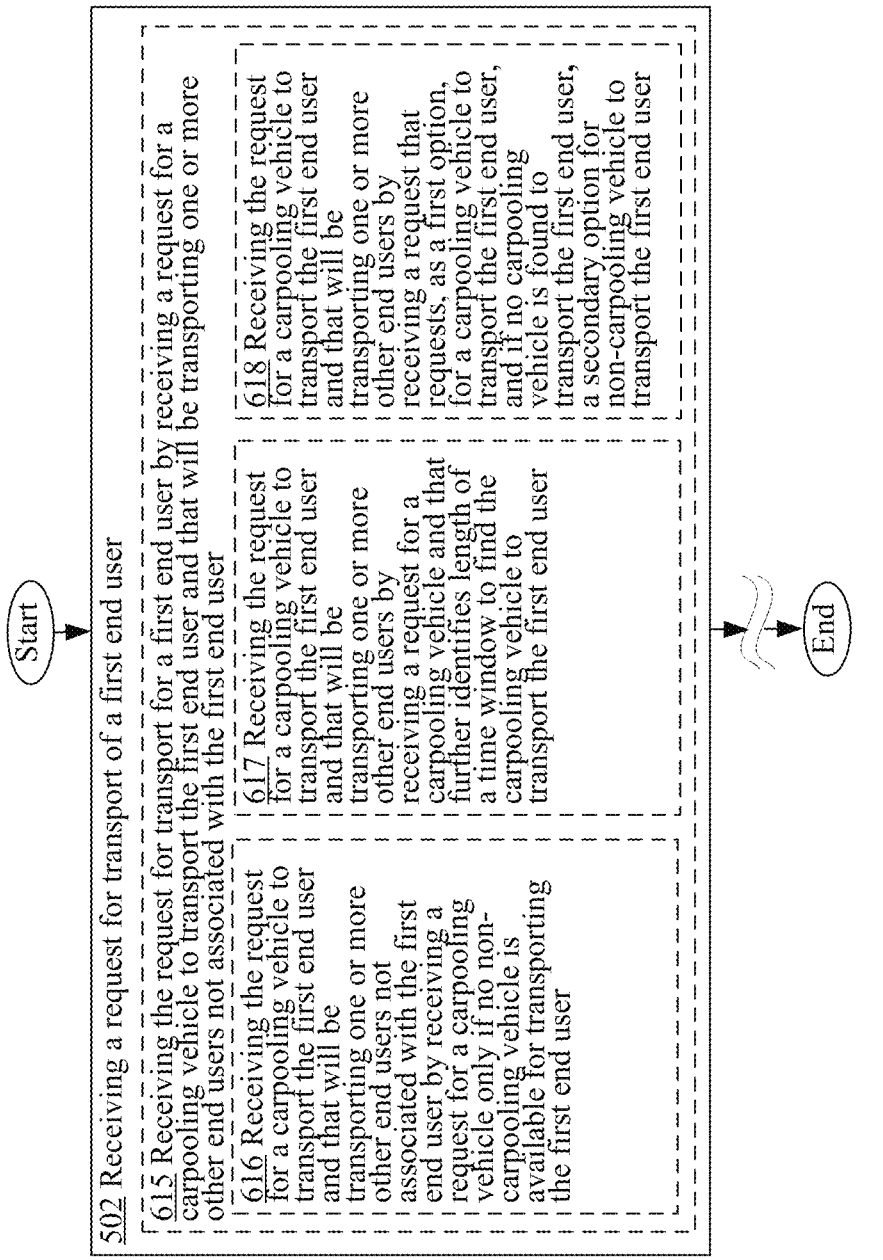
FIG. 6C is a high-level logic flowchart of a process depicting alternate implementations of the request receiving operation 502 of FIG. 5.

As will be described below, the request receiving operation 502, the transportation vehicle unit selecting operation 504, and the directive transmitting operation 506 may be executed in a variety of different ways in various alternative implementations. FIGS. 6A, 6B, and 6C, for example, illustrate at least some of the alternative ways that the request receiving operation 502 of FIG. 5 may be executed in various alternative implementations. In some cases, for example, the request receiving operation 502 may include an operation 602 for receiving the request for transport of a first end user by receiving the request electronically as illustrated in FIG. 6A. For instance, the request receiving module 202* of the real-time carpooling management system 10* (e.g., the real-time carpooling management system 10' of FIG. 2A or the real-time carpooling management system 10" of FIG. 2B) receiving the request for transport of a first end user 12a by receiving the request electronically via, for example, the Internet.

In various implementations, operation 602 may include an operation 603 for receiving the request electronically from one or more wireless and/or wired networks. For instance, the request receiving module 202* of the real-time carpooling management system 10* of FIG. 2A or 2B receiving the request electronically (e.g., via the network interface 240 of FIG. 2A or 2B) from one or more wireless and/or wired networks 18 (e.g., cellular data network, WLAN, WAN, MAN (metropolitan area network, Ethernet, etc.).

In the same or alternative implementations, operation 602 may alternatively or additionally include an operation 604 for receiving the request electronically from an end user computing device associated with the first end user. For instance, the request receiving module 202* of the real-time carpooling management system 10* of FIG. 2A or 2B receiving the request electronically from an end user computing device 14 (e.g., a desktop computer or a mobile computing device such as a Smartphone or tablet computer) associated with the first end user 12a.

In the same or alternative implementations operation 602 may alternatively or additionally include an operation 605 for receiving the request electronically from a passenger/ vehicle coordinating network system that is in communication with an end user computing device associated with the first end user. For instance, the request receiving module 202* of the real-time carpooling management system 10* of FIG. 2A or 2B receiving the request electronically from a passenger/vehicle coordinating network system 16 (e.g., a network server) that is in communication with an end user computing device 14 associated with the first end user 12a.

In the same or alternative implementations, the request receiving operation 502 may alternatively or additionally include an operation 606 for receiving the request for transport of a first end user including receiving location data associated with a rendezvous location for a vehicle to rendezvous with the first end user. For instance, the request receiving module 202* including the location data receiving module 302 (see FIG. 3A) of the real-time carpooling management system 10* of FIG. 2A or 2B receiving the request for transport of a first end user 12a including receiving, by the location data receiving module 302, location data associated with a rendezvous location (e.g., GPS data that indicates current location of the end user, which may or may not be the rendezvous location) for a transport vehicle to rendezvous with the first end user 12a. In some cases, the location data that is received may indicate a request for pickup at a particular location (e.g., a rendezvous location) of the first end user 12a or the current location of the first end user 12a which may be used in order to determine a rendezvous location (e.g., nearest street location to the current location of the first end user 12a).

In the same or alternative implementations, the request receiving operation 502 may alternatively or additionally include or involve an operation 607 for receiving the request for transport of a first end user by receiving a request that indicates a destination location for the first end user. For instance, the request receiving module 202* of the real-time carpooling management system 10* of FIG. 2A or 2B receiving the request for transport of a first end user 12a by receiving a request that indicates a destination location (e.g., a destination address or a name of a building or facility such as Sam's Bar or Yankee stadium) for the first end user 12a.

Referring to FIG. 6B, in the same or alternative implementations, the request receiving operation 502 may alternatively or additionally include an operation 608 for receiving the request for transport of a first end user including receiving preference data that indicates one or more carpooling preferences of the first end user. For instance, the request receiving module 202* including the preference data receiving module 304 (see FIG. 3A) of the real-time carpooling management system 10* of FIG. 2A or 2B receiving the request for transport of a first end user 12a including receiving, by the preference data receiving module 304, preference data that indicates one or more carpooling preferences for transporting of the first end user 12a and which may be received from the first end user 12a via the end user device 14 or from a third party (e.g., employer or assistant for the first end user 12a). Note that in some cases, the preference data may be received prior to the reception of the request.

As further illustrated in FIG. 6B, operation 608 may further include one or more additional operations including, in some cases, an operation 609 for receiving the preference data that indicates one or more carpooling preferences of the first end user by receiving preference data that indicates a carpooling preference that no more than a predefined number of passenger drop offs may be made prior to the first end user being dropped-off at a destination location. For instance, the preference data receiving module 304 of the real-time carpooling management system 10* of FIG. 2A or 2B receiving the preference data that indicates one or more carpooling preferences of the first end user by receiving preference data that indicates a carpooling preference that no more than a predefined number of passenger drop offs (e.g., passenger stops) may be made by a transportation vehicle unit 20* that will be transporting the first end user 12*a* prior to the first end user 12*a* being dropped-off at a destination location (e.g., no more than one or two passenger drop offs permitted before drop off of the first end user 12*a* at his or her destination location).

In the same or alternative implementations, operation 608 may alternatively or additionally include an operation 610 for receiving the preference data that indicates one or more carpooling preferences of the first end user by receiving preference data that indicates a carpooling preference that one or more other end users to be transported by the transportation vehicle unit that will be transporting the first end user are destined for a common destination location that is also the destination of the first end user. For instance, the preference data receiving module 304 of the real-time carpooling management system 10* of FIG. 2A or 2B receiving the preference data that indicates one or more carpooling preferences of the first end user 12*a* by receiving preference data that indicates a carpooling preference that one or more other end users (e.g., all of the other end users) to be transported by the transportation vehicle unit 20* that will be transporting the first end user 12*a* are destined for a common destination location that is also the destination of the first end user 12*a*.

In the same or alternative implementations, operation 608 may alternatively or additionally include an operation 611 for receiving the preference data that indicates one or more carpooling preferences of the first end user by receiving preference data that indicates a carpooling preference that one or more other end users to be transported by the transportation vehicle unit that will be transporting the first end user have one or more indicated interests or beliefs. For instance, the preference data receiving module 304 of the real-time carpooling management system 10* of FIG. 2A or 2B receiving the preference data that indicates one or more carpooling preferences of the first end user 12*a* by receiving preference data that indicates a carpooling preference that one or more other end users (e.g., second end user 12*b*) to be transported by the transportation vehicle unit 20* that will be transporting the first end user 12*a* have one or more indicated interests or beliefs (e.g., the other passengers to be transported by the transportation vehicle unit 20* that will be transporting the first end user 12*a* are all Yankees fans).

In the same or alternative implementations, operation 608 may alternatively or additionally include an operation 612 for receiving the preference data that indicates one or more carpooling preferences of the first end user by receiving preference data that indicates a carpooling preference for a particular type of vehicle. For instance, the preference data receiving module 304 of the real-time carpooling management system 10* of FIG. 2A or 2B receiving the preference data that indicates one or more carpooling preferences of the first end user 12*a* by receiving preference data that indicates a carpooling preference for a particular type of vehicle 21 (e.g., a sedan, a van, a smoke-free vehicle that does not allow smoking, and so forth).

In the same or different implementations, the request receiving operation 502 may additionally or alternatively include an operation 613 for receiving the request for transport of a first end user including receiving image data associated with the first end user. For instance, the request receiving module 202* including the image data receiving module 306 (see FIG. 3A) of the real-time carpooling management system 10* of FIG. 2A or 2B receiving the request for transport of a first end user 12*a* including receiving, by the image data receiving module 306, image data (e.g., facial image data) associated with the first end user 12*a*. Such an image may be used by a human driver in order to be able to quickly recognize the first end user 12*a* in a congested environment such as outside a stadium after a football game.

In the same or different implementations, the request receiving operation 502 may additionally or alternatively include an operation 614 for receiving the request for transport of a first end user including receiving a request that indicates number of passengers and/or luggage to be transported. For instance, the request receiving module 202* of the real-time carpooling management system 10* of FIG. 2A or 2B receiving the request for transport of a first end user 12*a* including receiving a request that indicates number of passengers (including the first end user 12*a*) and/or number of luggage to be transported.

Turning to FIG. 6C, in various implementations, the request receiving operation 502 may include an operation 615 for receiving the request for transport for a first end user by receiving a request for a carpooling vehicle to transport the first end user and that will be transporting one or more other end users not associated with the first end user. For instance, the request receiving module 202* of the real-time carpooling management system 10* of FIG. 2A or 2B receiving the request for transport for a first end user by receiving a request for a carpooling vehicle to transport the first end user 12*a* and that will be transporting one or more other end users not associated (e.g., unrelated or unaffiliated) with the first end user 12*a*.

As further illustrated in FIG. 6C, in various implementations, operation 615 may include one or more additional operations including, in some cases, an operation 616 for receiving the request for a carpooling vehicle to transport the first end user and that will be transporting one or more other end users not associated with the first end user by receiving a request for a carpooling vehicle only if no non-carpooling vehicle is available for transporting the first end user. For instance, the request receiving module 202* of the real-time carpooling management system 10* of FIG. 2A or 2B receiving the request for a carpooling vehicle to transport the first end user 12 and that will be transporting one or more other end users (e.g., other passengers) not associated with the first end user 12*a* by receiving a request for a carpooling vehicle only if no non-carpooling vehicle (e.g., a vehicle not designated to carry unassociated passengers) is determined to be available for transporting the first end user 12*a*. Thus, in this implementation, the first end user 12*a* may only want to be transported by a carpooling vehicle as a second option.

In the same or alternative implementations, operation 615 may additionally or alternatively include an operation 617 for receiving the request for a carpooling vehicle to transport the first end user and that will be transporting one or more other end users by receiving a request for a carpooling vehicle and that further identifies length of a time window to find the carpooling vehicle to transport the first end user. For instance, the request receiving module 202* of the real-time carpooling management system 10* of FIG. 2A or 2B receiving the request for a carpooling vehicle to transport the first end user 12*a* and that will be transporting one or more other end users by receiving a request for a carpooling vehicle and that further identifies length of a time window (e.g., 15 minutes) to find the carpooling vehicle to transport the first end user 12a, the time window to start, for example, from when the request is received.

In the same or alternative implementations, operation 615 may additionally or alternatively include an operation 618 for receiving the request for a carpooling vehicle to transport the first end user and that will be transporting one or more other end users by receiving a request that requests, as a first option, for a carpooling vehicle to transport the first end user, and if no carpooling vehicle is found to transport the first end user, a secondary option for non-carpooling vehicle to transport the first end user. For instance, the request receiving module 202* of the real-time carpooling management system 10* of FIG. 2A or 2B receiving the request for a carpooling vehicle to transport the first end user 12a and that will be transporting one or more other end users 12a by receiving a request that requests, as a first option, for a carpooling vehicle to transport the first end user 12 with other passengers, and if no carpooling vehicle is found to transport the first end user 12a (e.g., no carpooling vehicle available to pick-up the first end user 12a within the next 15 minutes), a secondary option for non-carpooling vehicle to transport the first end user 12a. For this implementation, the first end user 12a may prefer to use a carpooling vehicle rather than a non-carpooling vehicle in order to, for example, save costs. Thus, the first end user 12a may request as a first option a carpooling vehicle and then a secondary option for a non-carpooling vehicle.

Referring back to the transportation vehicle unit selecting operation 504 of FIG. 5, the transportation vehicle unit selecting operation 504 similar to the request receiving operation 502 of FIG. 5 may be executed in a number of different ways in various alternative embodiments as illustrated, for example, in FIGS. 7A, 7B, 7C, 7D, 7E, 7F, 7G, 7H, 7I, and 7J. In some cases, for example, the transportation vehicle unit selecting operation 504 may actually include an operation 719 for selecting the transportation vehicle unit including ascertaining an identity linked to the transportation vehicle unit. For instance, the transportation vehicle unit selecting module 204* including the identity ascertaining module 308 (see FIG. 3B) of the real-time carpooling management system 10* of FIG. 2A or 2B selecting the transportation vehicle unit 20a including ascertaining an identity (e.g., vehicle ID, driver ID, IP address, and so forth) linked to the transportation vehicle unit 20a.

In the same or alternative implementations, the transportation vehicle unit selecting operation 504 may additionally or alternative include an operation 720 for selecting the transportation vehicle unit by ascertaining current location of the transportation vehicle unit. For instance, the transportation vehicle unit selecting module 204* including the location ascertaining module 310 (see FIG. 3B) of the real-time carpooling management system 10* of FIG. 2A or 2B selecting the transportation vehicle unit 20a by having the location ascertaining module 310 ascertain the current location of the transportation vehicle unit 20a based, for example, on GPS data provided by the transportation vehicle unit 20a.

In the same or alternative implementations, the transportation vehicle unit selecting operation 504 may include an operation 721 for selecting the transportation vehicle unit that is currently en route to or is currently transporting a second end user for transporting the first end user by selecting the transportation vehicle unit within a small time window that starts at a point in time when a request is received for transporting the second end user or when the second end user has been secured by the transportation vehicle unit. For instance, the transportation vehicle unit selecting module 204* of the real-time carpooling management system 10* of FIG. 2A or 2B selecting the transportation vehicle unit 20a that is currently en route to or is currently transporting a second end user 12b for transporting the first end user 12a by selecting the transportation vehicle unit 20a within a small time window (e.g., the selection being made within 15 minutes) that starts at a point in time when a request is received for transporting the second end user 12b or when the second end user 12b has been secured by the transportation vehicle unit 20a. By having such a requirement, the second end user 12b is ensured that he or she will not have to wait too long to have the carpooling transportation vehicle unit 20a depart for his or her destination. In some cases, if no carpooling transportation vehicle unit (e.g., transportation vehicle unit 20a that is en route to or is currently transporting the second end user 12b) is found within the time window, the real-time carpooling management system 10* may find a non-carpooling transportation vehicle unit to transport the first end user 12a.

Figure 7A:
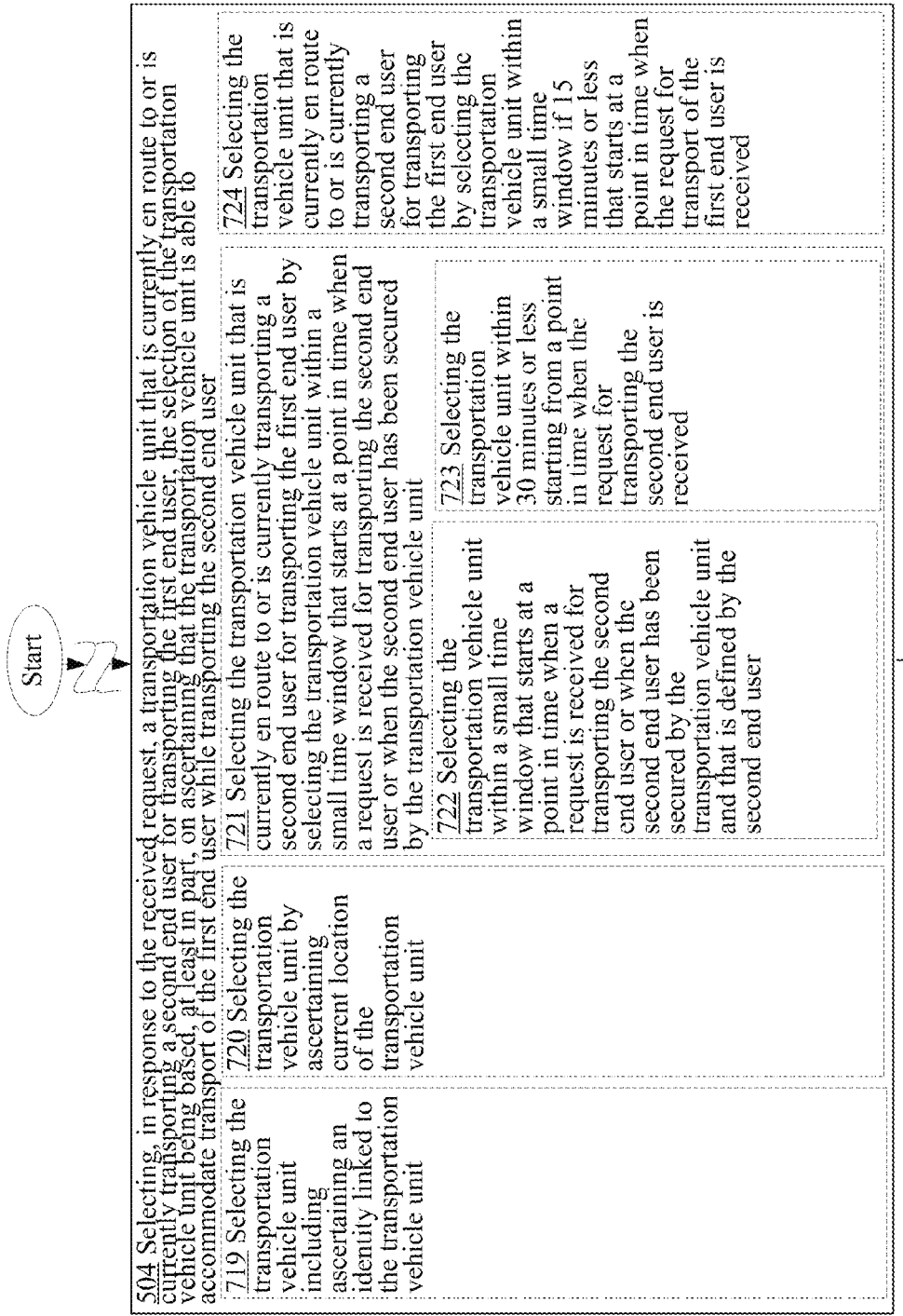
FIG. 7A is a high-level logic flowchart of a process depicting alternate implementations of the transportation vehicle unit selecting operation 504 of FIG. 5.

As further illustrated in FIG. 7A, in various implementations operation 721 may further include one or more additional operations including, in some cases, an operation 722 for selecting the transportation vehicle unit within a small time window that starts at a point in time when a request is received for transporting the second end user or when the second end user has been secured by the transportation vehicle unit and that is defined by the second end user. For instance, the transportation vehicle unit selecting module 204* of the real-time carpooling management system 10* of FIG. 2A or 2B selecting the transportation vehicle unit 20a within a small time window that starts at a point in time when a request is received by the real-time carpooling management system 10* for transporting the second end user 12b or when the second end user 12b has been secured by the transportation vehicle unit 20a and that is defined by the second end user 12b. For this implementation, the second end user 12b may choose how long the transportation vehicle unit 20a should be on standby to find other passengers. The second end user 12b may, in exchange for a longer wait, be charged with a lower transport rate.

In the same or alternative implementations, operation 721 may additionally or alternatively include an operation 723 for selecting the transportation vehicle unit within a small time window of 30 minutes or less starting from a point in time when the request for transporting the second end user is received. For instance, the transportation vehicle unit selecting module 204* of the real-time carpooling management system 10* of FIG. 2A or 2B selecting the transportation vehicle unit 20a within a small time window of 30 minutes or less starting from a point in time when the request for transporting the second end user 12b is received by, for example, the real-time carpooling management system 10*.

In some implementations, operation 504 may actually involve an operation 724 for selecting the transportation vehicle unit that is currently en route to or is currently transporting a second end user for transporting the first end user by selecting the transportation vehicle unit within a small time window of 15 minutes or less that starts at a point in time when the request for transport of the first end user is received. For instance, the transportation vehicle unit selecting module 204* of the real-time carpooling management system 10* of FIG. 2A or 2B selecting the transportation vehicle unit 20a that is currently en route to or is currently transporting a second end user 12b for transporting the first end user 12a by selecting the transportation vehicle unit 20a within a small time window of 15 minutes or less that starts at a point in time when the request for transport of the first end user 12a is received by, for example, the real-time carpooling management system 10*.

Figure 7B:
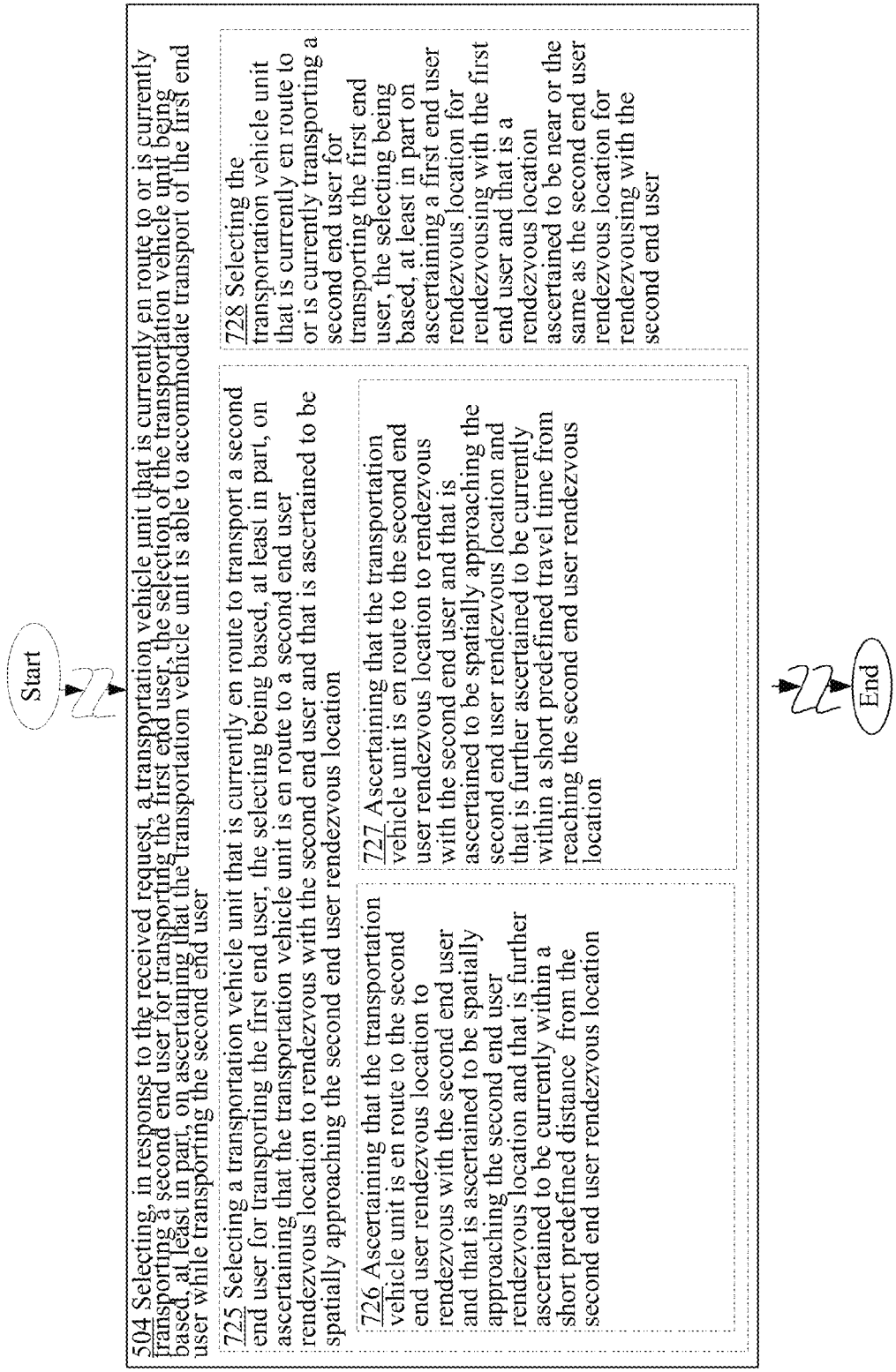
FIG. 7B is a high-level logic flowchart of a process depicting alternate implementations of the transportation vehicle unit selecting operation 504 of FIG. 5.

Turning now to FIG. 7B, in the same or alternative implementations, the transportation vehicle unit selecting operation 504 may include an operation 725 for selecting a transportation vehicle unit that is currently en route to transport a second end user for transporting the first end user, the selecting being based, at least in part, on ascertaining that the transportation vehicle unit is en route to a second end user rendezvous location to rendezvous with the second end user and that is ascertained to be spatially approaching the second end user rendezvous location. For instance, the transportation vehicle unit selecting module 204* including the en route ascertaining module 312 (see FIG. 3B) of the real-time carpooling management system 10* of FIG. 2A or 2B selecting a transportation vehicle unit 20a that is currently en route to transport a second end user 12b for transporting the first end user 12a, the selecting being based, at least in part, on ascertaining by the en route ascertaining module 312 that the transportation vehicle unit 20a is en route to a second end user rendezvous location to rendezvous with the second end user 12b and that is ascertained to be spatially approaching (e.g., spatially nearing) the second end user rendezvous location.

In some cases, operation 725 may further include an operation 726 for ascertaining that the transportation vehicle unit is en route to the second end user rendezvous location to rendezvous with the second end user and that is ascertained to be spatially approaching the second end user rendezvous location and that is further ascertained to be currently within a short predefined distance from the second end user rendezvous location. For instance, the en route ascertaining module 312 of the real-time carpooling management system 10* of FIG. 2A or 2B ascertaining that the transportation vehicle unit 20a is en route to the second end user rendezvous location to rendezvous with the second end user 12b and that is ascertained to be spatially approaching the second end user rendezvous location and that is further ascertained to be currently within a short predefined distance (e.g., within 3 miles) from the second end user rendezvous location. For example, ascertaining that the transportation vehicle unit 20a is approaching the second end user rendezvous location and is determined to be currently only 1 mile from the second end user rendezvous location.

In the same or alternative implementations, the operation 725 may additionally or alternatively include an operation 727 for ascertaining that the transportation vehicle unit is en route to the second end user rendezvous location to rendezvous with the second end user and that is ascertained to be spatially approaching the second end user rendezvous location and that is further ascertained to be currently within a short predefined travel time from reaching the second end user rendezvous location. For instance, the en route ascertaining module 312 of the real-time carpooling management system 10* of FIG. 2A or 2B ascertaining that the transportation vehicle unit 20a is en route to the second end user rendezvous location to rendezvous with the second end user 12b and that is ascertained to be spatially approaching the second end user rendezvous location and that is further ascertained to be currently within a short predefined travel time (e.g., 15 minutes) from reaching the second end user rendezvous location. For example, ascertaining that the transportation vehicle unit 20a is approaching the second end user rendezvous location and is determined to be currently 10 minutes from reaching the second end user rendezvous location.

In the same or alternative implementations, the transportation vehicle unit selecting operation 504 may include an operation 728 for selecting the transportation vehicle unit that is currently en route to or is currently transporting a second end user for transporting the first end user, the selecting being based, at least in part on ascertaining a first end user rendezvous location for rendezvousing with the first end user and that is a rendezvous location ascertained to be near or the same as the second end user rendezvous location for rendezvousing with the second end user. For instance, the transportation vehicle unit selecting module 204* including the location ascertaining module 310 and the rendezvous location ascertaining nodule 312 (see FIG. 3B) of the real-time carpooling management system 10* of FIG. 2A or 2B selecting the transportation vehicle unit 20a that is currently en route to or is currently transporting a second end user 12b for transporting the first end user 12a, the selecting being based, at least in part on the rendezvous location ascertaining nodule 312 ascertaining a first end user rendezvous location for rendezvousing with the first end user 12a and that is a rendezvous location ascertained (by the location ascertaining module 310) to be near or the same as the second end user rendezvous location for rendezvousing with the second end user 12b. Note that there may be many situations when the rendezvous location for rendezvousing with the first end user 12a may have to be determined. For example, if the first end user 12a requests transportation while inside a sports stadium, then a determination may be made as to the nearest street location outside of the stadium that the transportation vehicle unit 20a may rendezvous with the first end user 12a.

Figure 7C:
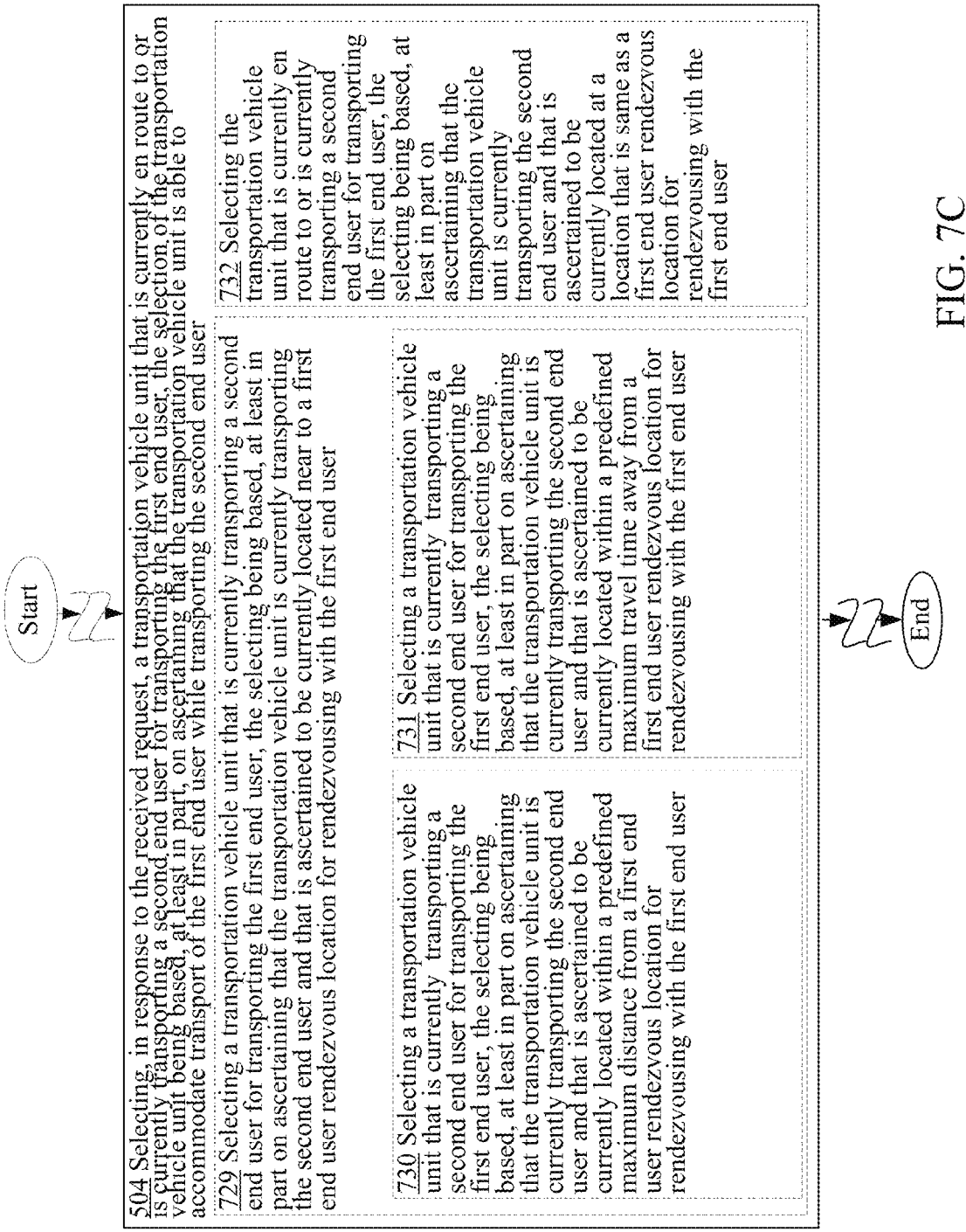
FIG. 7C is a high-level logic flowchart of a process depicting alternate implementations of the transportation vehicle unit selecting operation 504 of FIG. 5.

Referring now to FIG. 7C, in the same or alternative implementations, the transportation vehicle unit selecting operation 504 may include an operation 729 for selecting a transportation vehicle unit that is currently transporting a second end user for transporting the first end user, the selecting being based, at least in part on ascertaining that the transportation vehicle unit is currently transporting the second end user and that is ascertained to be currently located near to a first end user rendezvous location for rendezvousing with the first end user. For instance, the transportation vehicle unit selecting module 204* including the currently transporting ascertaining module 314 (see FIG. 3B) of the real-time carpooling management system 10* of FIG. 2A or 2B selecting a transportation vehicle unit 20a that is currently transporting a second end user 12b for transporting the first end user 12a, the selecting being based, at least in part on the currently transporting ascertaining module 314 ascertaining that the transportation vehicle unit 20a is currently transporting the second end user 12b and that is ascertained to be currently located near (e.g., within 2 miles) to a first end user rendezvous location for rendezvousing with the first end user 12a.

In various implementations, operation 729 may further include an operation 730 for selecting a transportation vehicle unit that is currently transporting a second end user for transporting the first end user, the selecting being based, at least in part on ascertaining that the transportation vehicle unit is currently transporting the second end user and that is ascertained to be currently located within a predefined maximum distance from a first end user rendezvous location for rendezvousing with the first end user. For instance, the transportation vehicle unit selecting module 204* including the currently transporting ascertaining module 314 of the real-time carpooling management system 10* of FIG. 2A or 2B selecting a transportation vehicle unit 20a that is transporting a second end user 12b for transporting the first end user 12a, the selecting being based, at least in part on the currently transporting ascertaining module 314 ascertaining that the transportation vehicle unit 20a is currently transporting the second end user 12b and that is ascertained to be currently located within a predefined maximum distance (e.g., within 2 miles) from a first end user rendezvous location for rendezvousing with the first end user 12a.

In the same or alternative implementations, operation 729 may include an operation 731 for selecting a transportation vehicle unit that is currently transporting a second end user for transporting the first end user, the selecting being based, at least in part on ascertaining that the transportation vehicle unit is currently transporting the second end user and that is ascertained to be currently located within a predefined maximum travel time away from a first end user rendezvous location for rendezvousing with the first end user. For instance, the transportation vehicle unit selecting module 204* including the currently transporting ascertaining module 314 of the real-time carpooling management system 10* of FIG. 2A or 2B selecting a transportation vehicle unit 20a that is currently transporting a second end user 12b for transporting the first end user 12a, the selecting being based, at least in part on the currently transporting ascertaining module 314 ascertaining that the transportation vehicle unit 20a is currently transporting the second end user 12b and that is ascertained to be currently located within a predefined maximum travel time (e.g., 10 minutes) away from a first end user rendezvous location for rendezvousing with the first end user 12a.

In various implementations, the transportation vehicle unit selecting operation 504 may include an operation 732 for selecting the transportation vehicle unit that is currently en route to or is currently transporting a second end user for transporting the first end user, the selecting being based, at least in part on ascertaining that the transportation vehicle unit is currently transporting the second end user and that is ascertained to be currently located at a location that is same as a first end user rendezvous location for rendezvousing with the first end user. For instance, the transportation vehicle unit selecting module 204* including the vehicle location compatibility ascertaining module 316 (see FIG. 3B) of the real-time carpooling management system 10* of FIG. 2A or 2B selecting the transportation vehicle unit 20a that is currently en route to or is currently transporting a second end user 12b for transporting the first end user 12a, the selecting being based, at least in part on the vehicle location compatibility ascertaining module 316 ascertaining that the transportation vehicle unit 20a is currently transporting the second end user 12b and that is ascertained to be currently located at a location that is same as a first end user rendezvous location for rendezvousing with the first end user 12a.

Figure 7D:
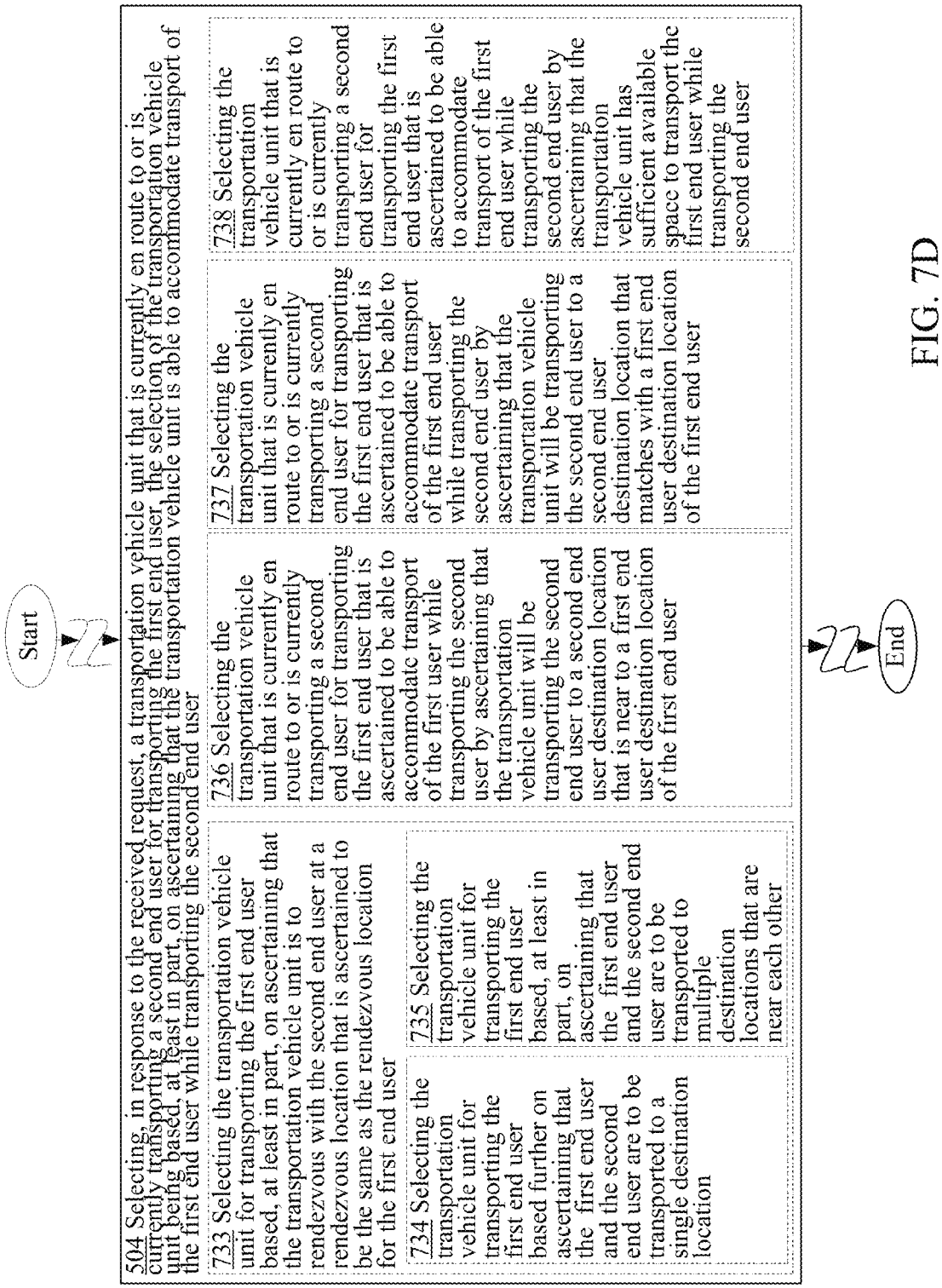
FIG. 7D is a high-level logic flowchart of a process depicting alternate implementations of the transportation vehicle unit selecting operation 504 of FIG. 5.

Turning now to FIG. 7D, in various implementations, the transportation vehicle unit selecting operation 504 may include an operation 733 for selecting the transportation vehicle unit for transporting the first end user based, at least in part, on ascertaining that the transportation vehicle unit is to rendezvous with the second end user at a rendezvous location that is ascertained to be the same as the rendezvous location for the first end user. For instance, the transportation vehicle unit selecting module 204* including the rendezvous location compatibility ascertaining module 318 (see FIG. 3B) of the real-time carpooling management system 10* of FIG. 2A or 2B selecting the transportation vehicle unit 20a for transporting the first end user 12a based, at least in part, on ascertaining that the transportation vehicle unit 20a is to rendezvous with the second end user 12b at a rendezvous location that is ascertained to be the same as the rendezvous location for the first end user 12a (see, for example, the exemplary scenario illustrated in FIG. 4D in which both the first end user 12a and the second end user 12b rendezvous with the transportation vehicle unit 20a at a common rendezvous location 420).

In some implementations, operation 733 may further include an operation 734 for selecting the transportation vehicle unit for transporting the first end user based further on ascertaining that the first end user and the second end user are to be transported to a single destination location. For instance, the transportation vehicle unit selecting module 204* including the destination location compatibility ascertaining module 320 (see FIG. 3B) of the real-time carpooling management system 10* of FIG. 2A or 2B selecting the transportation vehicle unit 20a for transporting the first end user 12a based further on including the destination location compatibility ascertaining module 320 ascertaining that the first end user 12a and the second end user 12b are to be transported to a single destination location (see, for example, the exemplary scenario illustrated in FIGS. 4B and 4D).

In some alternative implementations, operation 733 may additionally include an operation 735 for selecting the transportation vehicle unit for transporting the first end user based, at least in part, on ascertaining that the first end user and the second end user are to be transported to multiple destination locations that are near each other. For instance, the transportation vehicle unit selecting module 204* including the destination location compatibility ascertaining module 320 of the real-time carpooling management system 10* of FIG. 2A or 2B selecting the transportation vehicle unit 20a for transporting the first end user 12a based, at least in part, on the destination location compatibility ascertaining module 320 ascertaining that the first end user 12a and the second end user 12b are to be transported to multiple destination locations that are near each other (e.g., see the exemplary scenario of FIG. 4A).

In some implementations, the transportation vehicle unit selecting operation 504 may include an operation 736 for selecting the transportation vehicle unit that is currently en route to or is currently transporting a second user for transporting the first end user that is ascertained to be able to accommodate transport of the first user while transporting the second end user by ascertaining that the transportation vehicle unit will be transporting the second end user to a second end user destination location that is near to a first end user destination location of the first end user. For instance, the transportation vehicle unit selecting module 204* including the destination location compatibility ascertaining module 320 of the real-time carpooling management system 10* of FIG. 2A or 2B selecting the transportation vehicle unit 20a that is currently en route to or is currently transporting a second user 12b for transporting the first end user 12a that is ascertained to be able to accommodate transport of the first user 12a while transporting the second end user 12b when the destination location compatibility ascertaining module 320 ascertains that the transportation vehicle unit 20a will be transporting the second end user 12b to a second end user destination location that is near (e.g., within 3 miles) to a first end user destination location of the first end user 12a (note that this operation 736 is different from operations 734 and 735 because operation 736 does not provide for, for example, the first end user 12a and the second end user 12b to rendezvous with the transportation vehicle unit 12a at the same rendezvous location).

In some implementations, the transportation vehicle unit selecting operation 504 may include an operation 737 for selecting the transportation vehicle unit that is currently en route to or is currently transporting a second end user for transporting the first end user that is ascertained to be able to accommodate transport of the first end user while transporting the second end user by ascertaining that the transportation vehicle unit will be transporting the second end user to a second end user destination location that matches with a first end user destination location of the first end user. For instance, the transportation vehicle unit selecting module 204* including the destination location compatibility ascertaining module 320 of the real-time carpooling management system 10* of FIG. 2A or 2B selecting the transportation vehicle 20a unit that is currently en route to or is currently transporting a second end user 12b for transporting the first end user 12a that is ascertained to be able to accommodate transport of the first end user 12a while transporting the second end user 12b when the destination location compatibility ascertaining module 320 ascertains that the transportation vehicle unit 20a will be transporting the second end user 12b to a second end user destination location that exactly matches with a first end user destination location of the first end user 12a. For example, several independent and non-affiliated passengers looking for a ride from the airport to the same hotel may be picked up at several different locations (e.g., different baggage claim areas) by the same vehicle (e.g., transportation vehicle unit 20a).

In some implementations, the transportation vehicle unit selecting operation 504 may include an operation 738 for selecting the transportation vehicle unit that is currently en route to or is currently transporting a second end user for transporting the first end user that is ascertained to be able to accommodate transport of the first end user while transporting the second end user by ascertaining that the transportation vehicle unit has sufficient available space to transport the first end user while transporting the second end user. For instance, the transportation vehicle unit selecting module 204* including the spatial accommodation ascertaining module 322 (see FIG. 3B) of the real-time carpooling management system 10* of FIG. 2A or 2B selecting the transportation vehicle unit 20a that is currently en route to or is currently transporting a second end user 12b for transporting the first end user 12a that is ascertained by the spatial accommodation ascertaining module 322 to be able to accommodate transport of the first end user 12a while transporting the second end user 12b when the spatial accommodation ascertaining module 322 ascertains that the transportation vehicle unit 20a has sufficient available space (e.g., cabin and/or luggage space) to transport the first end user 12a while transporting the second end user 12b.

Figure 7E:
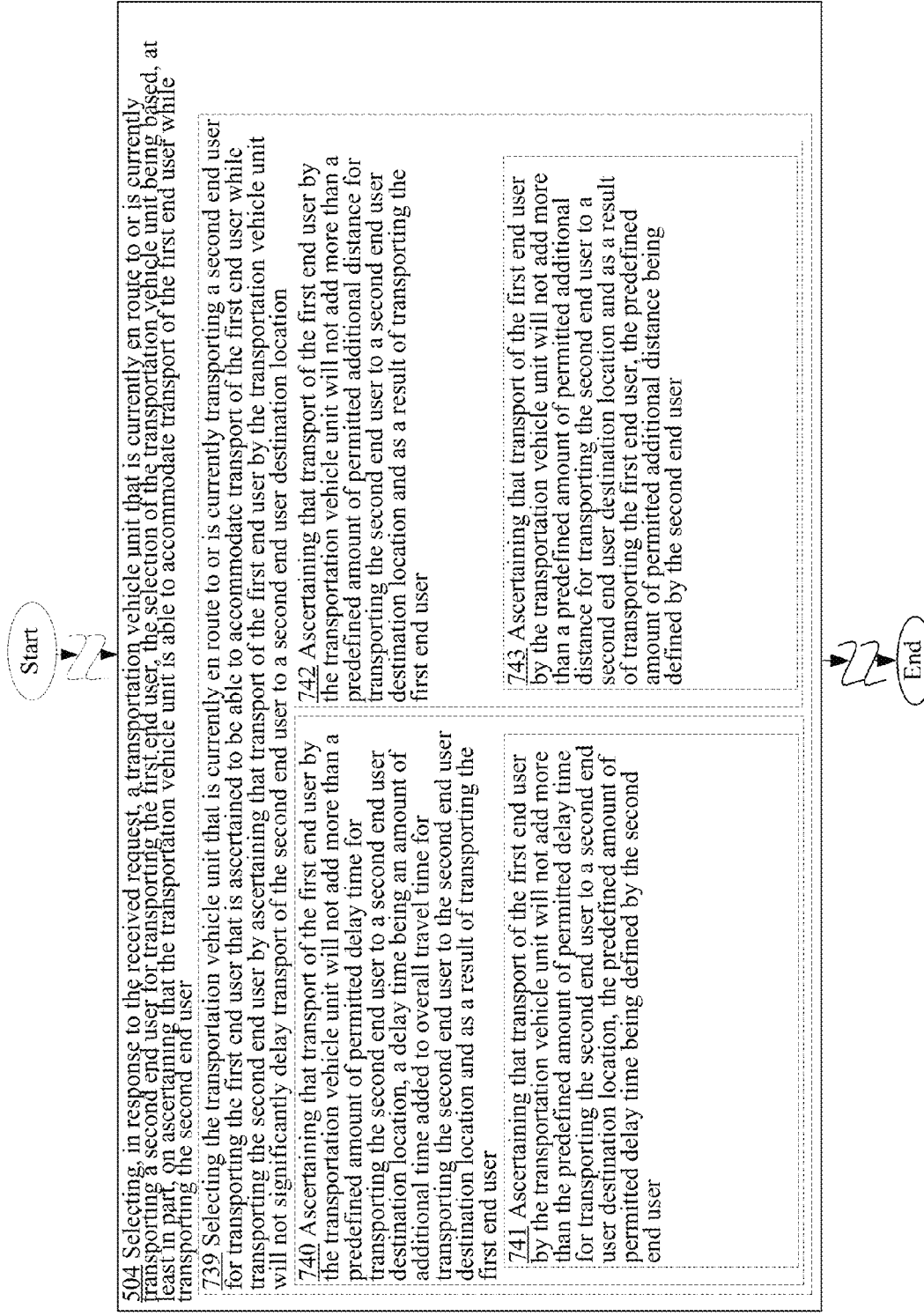
FIG. 7E is a high-level logic flowchart of a process depicting alternate implementations of the transportation vehicle unit selecting operation 504 of FIG. 5.

In some implementations, the transportation vehicle unit selecting operation 504 may alternatively or additionally include an operation 739 for selecting the transportation vehicle unit that is currently en route to or is currently transporting a second end user for transporting the first end user that is ascertained to be able to accommodate transport of the first end user while transporting the second end user by ascertaining that transport of the first end user by the transportation vehicle unit will not significantly delay transport of the second end user to a second end user destination location as illustrated in FIG. 7E. For instance, the transportation vehicle unit selecting module 204* including the delay compatibility ascertaining module 324 (see FIG. 3B) of the real-time carpooling management system 10* of FIG. 2A or 2B selecting the transportation vehicle unit 20a that is currently en route to or is currently transporting a second end user 12b for transporting the first end user 12a that is ascertained to be able to accommodate transport of the first end user 12a while transporting the second end user 12b when the delay compatibility ascertaining module 324 ascertains that transport of the first end user 12a by the transportation vehicle unit 20a will not significantly delay (e.g., more than 15 minutes) transport of the second end user 12b to a second end user destination location.

As further illustrated in FIG. 7E, in various implementations, operation 739 may include one or more additional operations including, in some cases, an operation 740 for ascertaining that transport of the first end user by the transportation vehicle unit will not add more than a predefined amount of permitted delay time for transporting the second end user to a second end user destination location, a delay time being an amount of additional time added to overall travel time for transporting the second end user to the second end user destination location and as a result of transporting the first end user. For instance, the delay compatibility ascertaining module 324 of the real-time carpooling management system 10* of FIG. 2A or 2B ascertaining that transport of the first end user 12a by the transportation vehicle unit 20a will not add more than a predefined amount of permitted delay time for transporting the second end user 12b to a second end user destination location, a delay time being an amount of estimated additional time that may be added to overall travel time for transporting by the transportation vehicle unit 20a of the second end user 12b to the second end user destination location and as a result of the transportation vehicle unit 20a transporting the first end user 12a while transporting the second end user 12b.

In some cases, operation 740 may further include an operation 741 for ascertaining that transport of the first end user by the transportation vehicle unit will not add more than the predefined amount of permitted delay time for transporting the second end user to a second end user destination location, the predefined amount of permitted delay time being defined by the second end user. For instance, the delay compatibility ascertaining module 324 of the real-time carpooling management system 10* of FIG. 2A or 2B ascertaining that transport of the first end user 12a by the transportation vehicle unit 20a will not add more than the predefined amount of permitted delay time (e.g., up to 15 minutes of delay time) for transporting the second end user 12b to a second end user destination location, the predefined amount of permitted delay time being defined by the second end user 12b. Alternatively, the predefined amount of permitted delay time may be set by a third party such as by a ridesharing company.

In the same or alternative implementations, operation 739 may additional or alternative include an operation 742 for ascertaining that transport of the first end user by the transportation vehicle unit will not add more than a predefined amount of permitted additional distance for transporting the second end user to a second end user destination location and as a result of transporting the first end user. For instance, the delay compatibility ascertaining module 324 of the real-time carpooling management system 10* of FIG. 2A or 2B ascertaining that transport of the first end user 12a by the transportation vehicle unit 20a will not add more than a predefined amount of permitted additional distance (e.g., 2 miles) for transporting by the transportation vehicle unit 20a of the second end user 12b to a second end user destination location and as a result of the transportation vehicle unit 20a transporting the first end user 12a while transporting the second end user 12b.

In some implementations, operation 742 may include an operation 743 for ascertaining that transport of the first end user by the transportation vehicle unit will not add more than a predefined amount of permitted additional distance for transporting the second end user to a second end user destination location and as a result of transporting the first end user, the predefined amount of permitted additional distance being defined by the second end user. For instance, the delay compatibility ascertaining module 324 of the real-time carpooling management system 10* of FIG. 2A or 2B ascertaining that transport of the first end user 12a by the transportation vehicle unit 20a will not add more than a predefined amount of permitted additional distance for transporting the second end user 12b to a second end user destination location and as a result of transporting the first end user 12a, the predefined amount of permitted additional distance being defined by the second end user 12b. Alternatively, the predefined amount of permitted additional distance may be set by a third party such as by a ridesharing company.

Figure 7F:
FIG. 7F is a high-level logic flowchart of a process depicting alternate implementations of the transportation vehicle unit selecting operation 504 of FIG. 5.

Turning now to FIG. 7F, in various implementations, the transportation vehicle unit selecting operation 504 may include an operation 744 for selecting the transportation vehicle unit that is currently en route to or is currently transporting a second end user for transporting the first end user that is ascertained to be able to accommodate transport of the first end user while transporting the second end user by ascertaining that transport of the first end user to a first end user destination location by the transportation vehicle unit will not result in the transportation vehicle unit to have a total number of passenger drop offs that exceed a predefined number of maximum passenger drop offs allowed for the transportation vehicle unit during one trip transporting a group of end users to one or more end user destination locations. For instance, the transportation vehicle unit selecting module 204* including the passenger drop-off compatibility ascertaining module 326 (see FIG. 3B) of the real-time carpooling management system 10* of FIG. 2A or 2B selecting the transportation vehicle unit 20a that is currently en route to or is currently transporting a second end user 12b for transporting the first end user 12a that is ascertained to be able to accommodate transport of the first end user 12a while transporting the second end user 12b when the passenger drop-off compatibility ascertaining module 326 ascertains that transport of the first end user 12a to a first end user destination location by the transportation vehicle unit 20a will not result in the transportation vehicle unit 20a to have a total number of passenger drop offs (e.g., passenger destination stops) that exceed a predefined number of maximum passenger drop offs (e.g., as predefined by a third party or one of the end users) allowed for the transportation vehicle unit 20a during one trip transporting a group of end users (e.g., first end user 12a, second end user 12b, and so forth) to one or more end user destination locations.

In some implementations, the transportation vehicle unit selecting operation 504 may include an operation 745 for selecting the transportation vehicle unit that is currently en route to or is currently transporting a second end user for transporting the first end user that is ascertained to be able to accommodate transport of the first end user while transporting the second end user by ascertaining that transport of the first end user to a first end user destination location by the transportation vehicle unit will not result in the transportation vehicle unit to have an amount of passenger drop offs that exceed a predefined number of maximum passenger drop offs allowed for the transportation vehicle unit prior to drop off of the second end user at a second end user destination location. For instance, the transportation vehicle unit selecting module 204* including the passenger drop-off compatibility ascertaining module 326 of the real-time carpooling management system 10* of FIG. 2A or 2B selecting the transportation vehicle unit 20a that is currently en route to or is currently transporting a second end user 12b for transporting the first end user 12a that is ascertained to be able to accommodate transport of the first end user 12a while transporting the second end user 12b when the passenger drop-off compatibility ascertaining module 326 ascertains that transport of the first end user 12a to a first end user destination location by the transportation vehicle unit 20a will not result in the transportation vehicle unit 20a to have an amount of passenger drop offs (e.g., destination stops) that exceed a predefined number of maximum passenger drop offs (e.g., one prior drop off permitted as defined by a third party such as a ridesharing company or by the second end user 12b) allowed for the transportation vehicle unit 20a prior to drop off of the second end user 12b at a second end user destination location.

As further illustrated in FIG. 7F, in some cases, operation 745 may further include an operation 746 for ascertaining that the transport of the first end user to a first end user destination location by the transportation vehicle unit will not result in the transportation vehicle unit to have an amount of passenger drop offs that exceed a predefined number of maximum passenger drop offs allowed for the transportation vehicle unit prior to drop off of the second end user at a second end user destination location, the predefined number of maximum passenger drop offs being defined by the second end user. For instance, the passenger drop-off compatibility ascertaining module 326 of the real-time carpooling management system 10* of FIG. 2A or 2B ascertaining that the transport of the first end user 12a to a first end user destination location by the transportation vehicle unit 20a will not result in the transportation vehicle unit 20a to have an amount of passenger drop offs that exceed a predefined number of maximum passenger drop offs (e.g., two passenger drop offs) allowed for the transportation vehicle unit 20a prior to drop off of the second end user 12b at a second end user destination location, the predefined number of maximum passenger drop offs being defined by the second end user 12b. Note that in some cases, the transportation vehicle unit 20a may be transporting one or more other end users other than the second end user 12b and the first end user 12a.

In some implementations, the transportation vehicle unit selecting operation 504 may include an operation 747 for selecting the transportation vehicle unit that is currently en route to or is currently transporting a second end user for transporting the first end user that is ascertained to be able to accommodate transport of the first end user while transporting the second end user by ascertaining that transport of the first end user and at least the second end user by the transportation vehicle unit will not result in the transportation vehicle unit to have an amount of passenger drop offs that exceed a predefined number of maximum passenger drop offs allowed for the transportation vehicle unit prior to drop off of the first end user at a first end user destination location. For instance, the transportation vehicle unit selecting module 204* including the passenger drop-off compatibility ascertaining module 326 of the real-time carpooling management system 10* of FIG. 2A or 2B selecting the transportation vehicle unit 20a that is currently en route to or is currently transporting a second end user 12b for transporting the first end user 12a that is ascertained to be able to accommodate transport of the first end user 12a while transporting the second end user 12b when the passenger drop-off compatibility ascertaining module 326 ascertains that transport of the first end user 12a and at least the second end user 12b (as well as, in some cases, other additional passengers) by the transportation vehicle unit 20a will not result in the transportation vehicle unit 20a to have an amount of passenger drop offs that exceed a predefined number of maximum passenger drop offs (e.g., one prior drop off permitted) allowed for the transportation vehicle unit 20a prior to drop off of the first end user 12a at a first end user destination location.

In some cases, operation 747 may actually include an operation 748 for ascertaining that transport of the first end user and at least the second end user by the transportation vehicle unit will not result in the transportation vehicle unit to have an amount of passenger drop offs that exceed a predefined number of maximum passenger drop offs allowed for the transportation vehicle unit prior to drop off of the first end user at a first end user destination location, the predefined number of maximum passenger drop offs being defined by the second end user. For instance, the passenger drop-off compatibility ascertaining module 326 of the real-time carpooling management system 10* of FIG. 2A or 2B ascertaining that transport of the first end user 12a and at least the second end user 12b (there may be other additional passengers in some cases) by the transportation vehicle unit 20a will not result in the transportation vehicle unit 20a to have an amount of passenger drop offs that exceed a predefined number of maximum passenger drop offs (e.g., one prior drop off permitted) allowed for the transportation vehicle unit 20a prior to drop off of the first end user 12a at a first end user destination location, the predefined number of maximum passenger drop offs being defined by the second end user 12b.

Figure 7G:
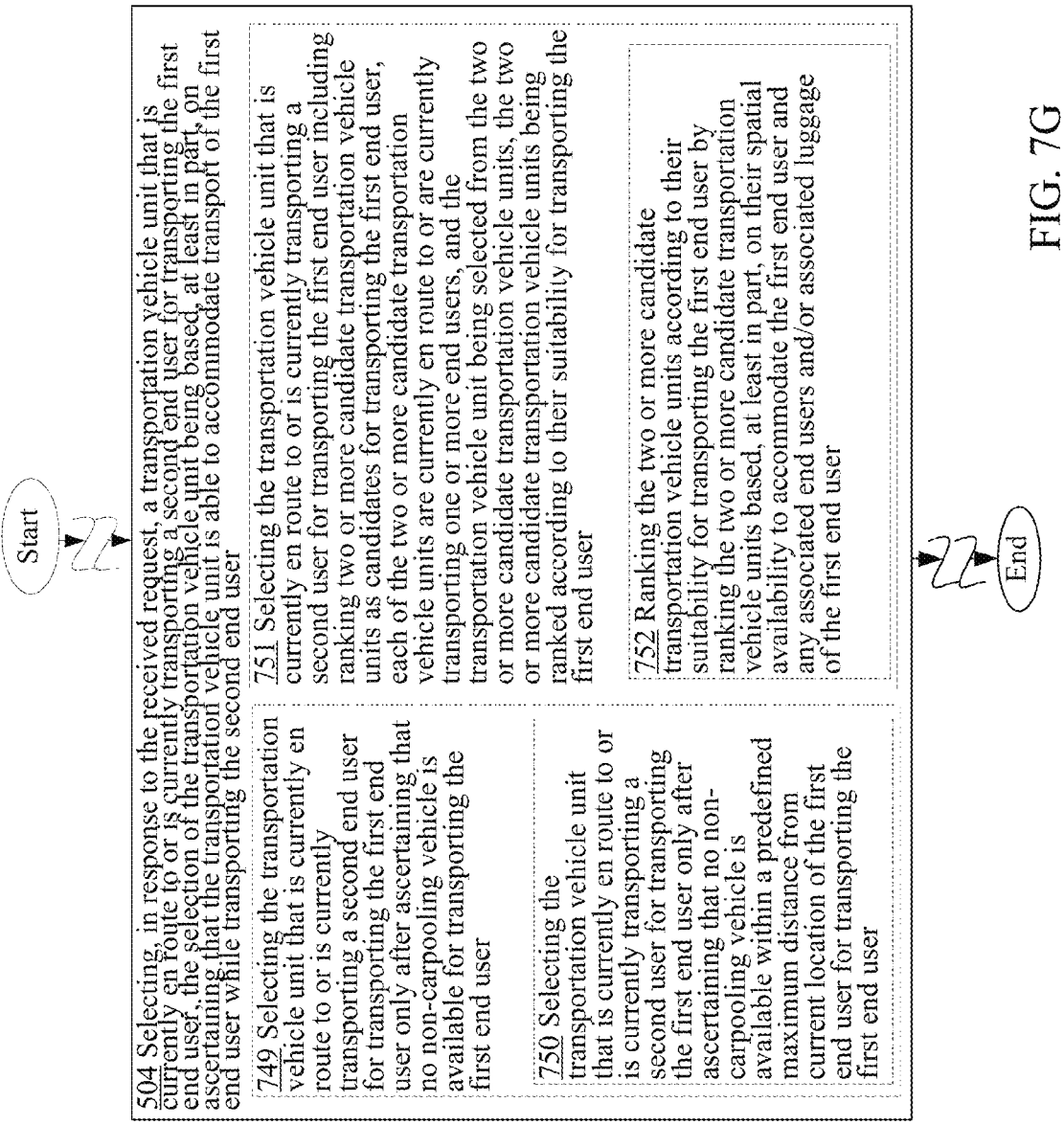
FIG. 7G is a high-level logic flowchart of a process depicting alternate implementations of the transportation vehicle unit selecting operation 504 of FIG. 5.

Turning to FIG. 7G, in various implementations, the transportation vehicle unit selecting operation 504 may include an operation 749 for selecting the transportation vehicle unit that is currently en route to or is currently transporting a second end user for transporting the first end user only after ascertaining that no non-carpooling vehicle is available for transporting the first end user. For instance, the transportation vehicle unit selecting module 204* of the real-time carpooling management system 10* of FIG. 2A or 2B selecting the transportation vehicle unit 20a that is currently en route to or is currently transporting a second end user 12b for transporting the first end user 12a only after ascertaining by the transportation vehicle unit selecting module 204* that no non-carpooling vehicle (e.g., a vehicle that is not designated for car-carpooling) is available for transporting the first end user 12a.

In some implementations, operation 749 may, in turn, further include an operation 750 for selecting the transportation vehicle unit that is currently en route to or is currently transporting a second end user for transporting the first end user only after ascertaining that no non-carpooling vehicle is available within a predefined maximum distance from current location of the first end user for transporting the first end user. For instance, the transportation vehicle unit selecting module 204* of the real-time carpooling management system 10* of FIG. 2A or 2B selecting the transportation vehicle unit 20a that is currently en route to or is currently transporting a second end user 12b for transporting the first end user 12a only after ascertaining that no non-carpooling vehicle is available within a predefined maximum distance (e.g., within a maximum distance of 3 miles) from current location of the first end user 12a for transporting the first end user 12a.

In various implementations, the transportation vehicle unit selecting operation 504 may actually include an operation 751 for selecting the transportation vehicle unit that is currently en route to or is currently transporting a second end user for transporting the first end user including ranking two or more candidate transportation vehicle units as candidates for transporting the first end user, each of the two or more candidate transportation vehicle units are currently en route to or are currently transporting one or more end users, and the transportation vehicle unit being selected from the two or more candidate transportation vehicle units, the two or more candidate transportation vehicle units being ranked according to their suitability for transporting the first end user. For instance, the transportation vehicle unit selecting module 204* including the candidate vehicle ranking module 328 (see FIG. 3B) of the real-time carpooling management system 10* of FIG. 2A or 2B selecting the transportation vehicle unit 20a that is currently en route to or is currently transporting a second end user 12b for transporting the first end user 12a including the candidate vehicle ranking module 328 ranking two or more candidate transportation vehicle units (e.g., the transportation vehicle units 20* of FIG. 1) as candidates for transporting the first end user 12a, each of the two or more candidate transportation vehicle units (e.g., transportation vehicle units 20*) are currently en route to or are currently transporting one or more end users, and the transportation vehicle unit 20a being selected from the two or more candidate transportation vehicle units (e.g., transportation vehicle units 20*), the two or more candidate transportation vehicle units being ranked according to their suitability (e.g., to place in order or classify according to, for example, spatial availability, proximity of destination locations, temporally availability, and so forth) for transporting the first end user 12a. Note that in some cases, the transportation vehicle unit 20a that is eventually selected may not be the best suited to transport the first end user 12a if, for example, the top ranked candidate vehicle is unable to transport the first end user 12a for some reason (e.g., if the top ranked candidate vehicle is redirected away from the current location of the first end user 12a).

In some cases, operation 751 may further include an operation 752 for ranking the two or more candidate transportation vehicle units according to their suitability for transporting the first end user by ranking the two or more candidate transportation vehicle units based, at least in part, on their spatial availability to accommodate the first end user and any associated end users and/or associated luggage of the first end user. For instance, the candidate vehicle ranking module 328 of the real-time carpooling management system 10* of FIG. 2A or 2B ranking the two or more candidate transportation vehicle units (e.g., the transportation vehicle units 20* of FIG. 1) based, at least in part, on their suitability for transporting the first end user 12a by ranking the two or more candidate transportation vehicle units (e.g., the transportation vehicle units 20* of FIG. 1) according to their spatial availability to accommodate the first end user 12 and any associated end users and/or associated luggage of the first end user 12a.

Figure 7H:
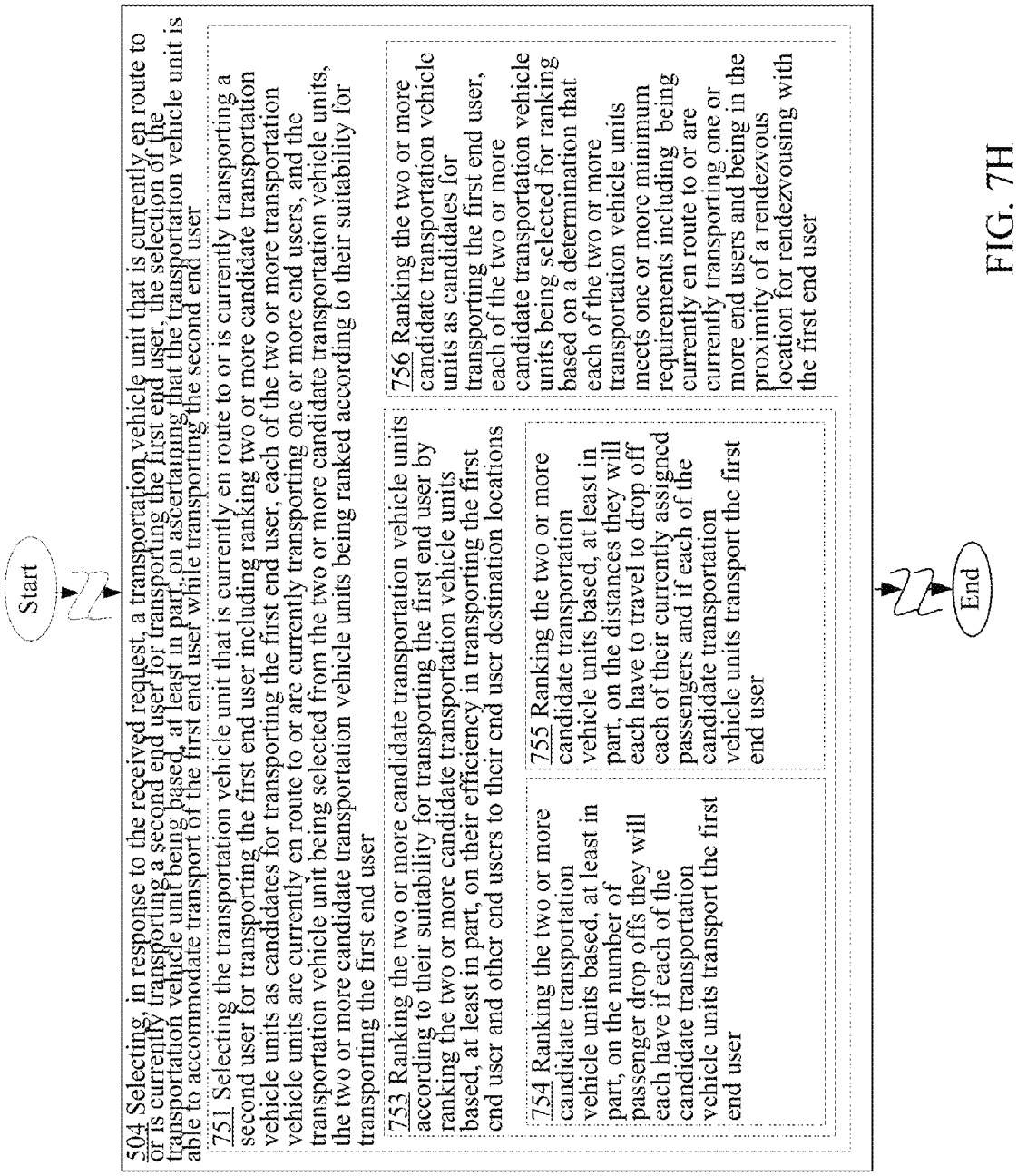
FIG. 7H is a high-level logic flowchart of a process depicting alternate implementations of the transportation vehicle unit selecting operation 504 of FIG. 5.

In the same or different implementations, the operation 751 may additionally or alternatively include an operation 753 for ranking the two or more candidate transportation vehicle units according to their suitability for transporting the first end user by ranking the two or more candidate transportation vehicle units based, at least in part, on their efficiency in transporting the first end user and other end users to their end user destination locations as illustrated in FIG. 7H. For instance, the candidate vehicle ranking module 328 of the real-time carpooling management system 10* of FIG. 2A or 2B ranking the two or more candidate transportation vehicle units (e.g., the transportation vehicle units 20* of FIG. 1) according to their suitability for transporting the first end user 12a by ranking the two or more candidate transportation vehicle units according to their efficiency (e.g., time or travel distance efficiency) in transporting the first end user 12a and other end users (e.g., the second end user 12b as well as, in some cases, one or more other end users) to their end user destination locations.

In some cases, operation 753 may include an operation 754 for ranking the two or more candidate transportation vehicle units based, at least in part, on the number of passenger drop offs they will each have if each of the candidate transportation vehicle units transport the first end user. For instance, the candidate vehicle ranking module 328 of the real-time carpooling management system 10* of FIG. 2A or 2B ranking the two or more candidate transportation vehicle units (e.g., the transportation vehicle units 20* of FIG. 1) based, at least in part, on the number of passenger drop offs they will each have if each of the candidate transportation vehicle units transport the first end user 12a.

In the same or different implementations, operation 753 may additionally or alternatively include an operation 755 for ranking the two or more candidate transportation vehicle units based, at least in part, on the distances they will each have to travel to drop off each of their currently assigned passengers and if each of the candidate transportation vehicle units transport the first end user. For instance, the candidate vehicle ranking module 328 of the real-time carpooling management system 10* of FIG. 2A or 2B ranking the two or more candidate transportation vehicle units (e.g., the transportation vehicle units 20* of FIG. 1) based, at least in part, on the distances they will each have to travel to drop off each of their currently assigned passengers (e.g., end users) and if each of the candidate transportation vehicle units transport the first end user 12a.

In some implementations, operation 751 may include an operation 756 for ranking the two or more candidate transportation vehicle units as candidates for transporting the first end user, each of the two or more candidate transportation vehicle units being selected for ranking based on a determination that each of the two or more transportation vehicle units meets one or more minimum requirements including being currently en route to or are currently transporting one or more end users and being in the proximity of a rendezvous location for rendezvousing with the first end user. For instance, the candidate vehicle ranking module 328 of the real-time carpooling management system 10* of FIG. 2A or 2B ranking the two or more candidate transportation vehicle units (e.g., the transportation vehicle units 20* of FIG. 1) as candidates for transporting the first end user 12a, each of the two or more candidate transportation vehicle units being selected for ranking based on a determination that each of the two or more transportation vehicle units 20* meets one or more minimum requirements including being currently en route to or are currently transporting one or more end users and being in the proximity of a rendezvous location (e.g., current location of the first end user) for rendezvousing with the first end user 12a.

Figure 7I:
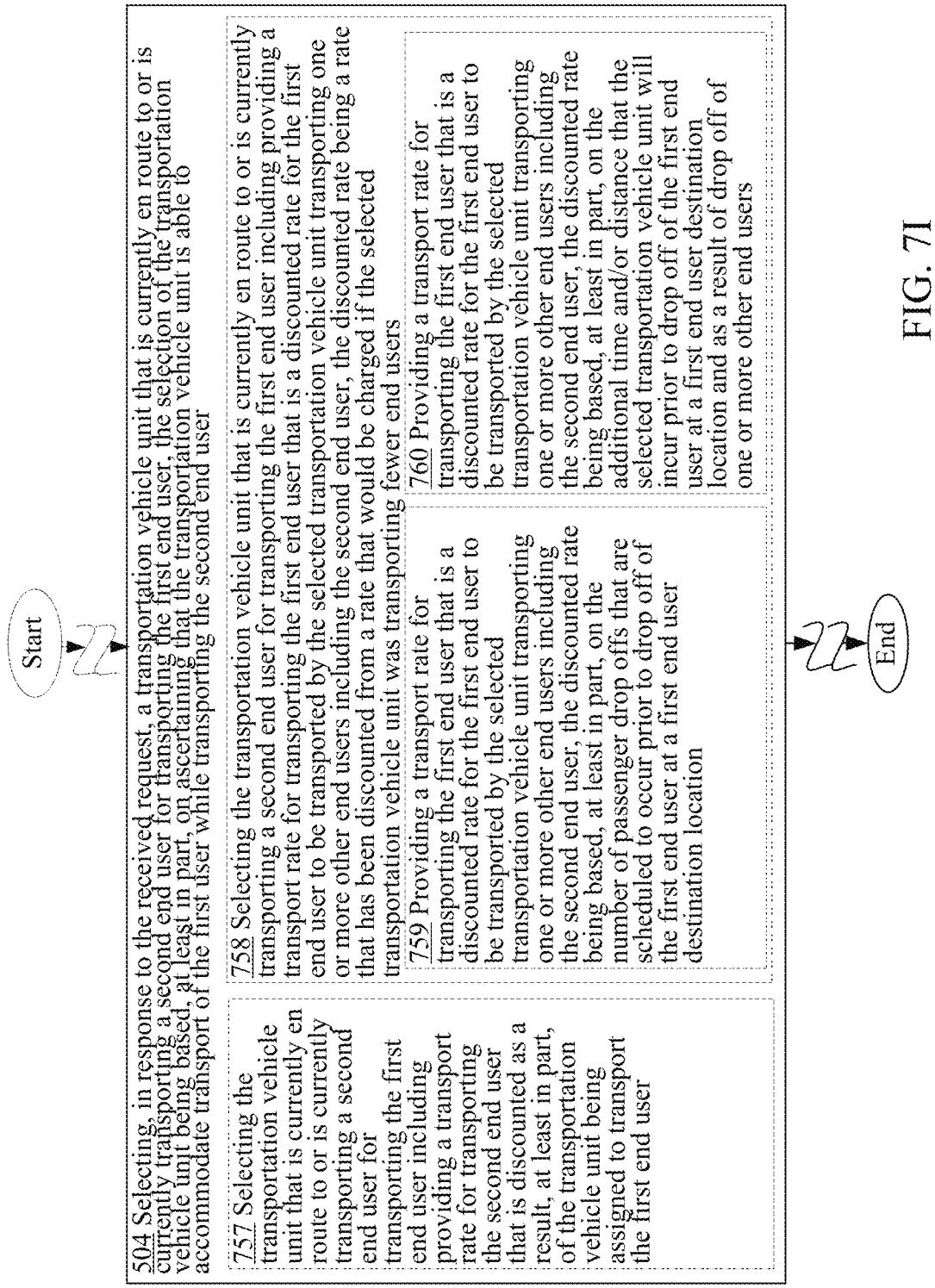
FIG. 7I is a high-level logic flowchart of a process depicting alternate implementations of the transportation vehicle unit selecting operation 504 of FIG. 5.

In various implementations, the transportation vehicle unit selecting operation 504 may include an operation 757 for selecting the transportation vehicle unit that is currently en route to or is currently transporting a second end user for transporting the first end user including providing a transport rate for transporting the second end user that is discounted as a result, at least in part, of the transportation vehicle unit being assigned to transport the first end user as illustrated in FIG. 7I. For instance, the transportation vehicle unit selecting module 204* including the transport rate providing module 330 (see FIG. 3B) of the real-time carpooling management system 10* of FIG. 2A or 2B selecting the transportation vehicle unit 20a that is currently en route to or is currently transporting a second end user 12b for transporting the first end user 12a including the transport rate providing module 330 providing (e.g., calculating, generating, or retrieving from a memory) a transport rate (e.g., a time and/or mileage charge, a flat fee, etc.) for transporting the second end user 12b that is discounted as a result, at least in part, of the transportation vehicle unit 20a being assigned (e.g., selected) to transport the first end user 12a. In some cases, the transport rate that is provided for the second end user 12b may be discounted from a nominal fee that would have been charged if the transportation vehicle unit 20a had not been assigned/selected to transport the first end user 12a.

In some implementations, the transportation vehicle unit selecting operation 504 may an operation 758 for selecting the transportation vehicle unit that is currently en route to or is currently transporting a second end user for transporting the first end user including providing a transport rate for transporting the first end user that is a discounted rate for the first end user to be transported by the selected transportation vehicle unit transporting one or more other end users including the second end user, the discounted rate being a rate that has been discounted from a rate that would be charged if the selected transportation vehicle unit was transporting fewer end users. For instance, the transportation vehicle unit selecting module 204* including the transport rate providing module 330 of the real-time carpooling management system 10* of FIG. 2A or 2B selecting the transportation vehicle unit 20a that is currently en route to or is currently transporting a second end user 12b for transporting the first end user 12a including the transport rate providing module 330 providing (e.g., calculating, generating, or retrieving) a transport rate for transporting the first end user 12a that is a discounted rate for the first end user 12a to be transported by the selected transportation vehicle unit 20a transporting one or more other end users including the second end user 12b, the discounted rate being a rate that has been discounted from a rate that would be charged if the selected transportation vehicle unit 20a was transporting fewer end users (e.g., without the first end user 12a).

In some implementations, operation 758 may further include an operation 759 for providing a transport rate for transporting the first end user that is a discounted rate for the first end user to be transported by the selected transportation vehicle unit transporting one or more other end users including the second end user, the discounted rate being based, at least in part, on the number of passenger drop offs that are scheduled to occur prior to drop off of the first end user at a first end user destination location. For instance, the transport rate providing module 330 of the real-time carpooling management system 10* of FIG. 2A or 2B providing a transport rate for transporting the first end user 12a that is a discounted rate for the first end user 12a to be transported by the selected transportation vehicle unit 20a transporting one or more other end users including the second end user 12b, the discounted rate being based, at least in part, on the number of passenger drop offs that are scheduled to occur prior to drop off of the first end user 12a at a first end user destination location. In some cases, the discounting of the transport rate may be greater if there are greater number of passenger drop offs.

In the same or alternative implementations, operation 758 may additionally or alternatively include an operation 760 for providing a transport rate for transporting the first end user that is a discounted rate for the first end user to be transported by the selected transportation vehicle unit transporting one or more other end users including the second end user, the discounted rate being based, at least in part, on the additional time and/or distance that the selected transportation vehicle unit will incur prior to drop off of the first end user at a first end user destination location and as a result of drop off of one or more other end users. For instance, the transport rate providing module 330 of the real-time carpooling management system 10* of FIG. 2A or 2B providing a transport rate for transporting the first end user 12*a* that is a discounted rate for the first end user 12*a* to be transported by the selected transportation vehicle unit 20*a* transporting one or more other end users including the second end user 12*b*, the discounted rate being based, at least in part, on the additional time and/or distance that the selected transportation vehicle unit 20*a* will incur prior to drop off of the first end user 12*a* at a first end user destination location and as a result of drop off of one or more other end users.

Figure 7J:
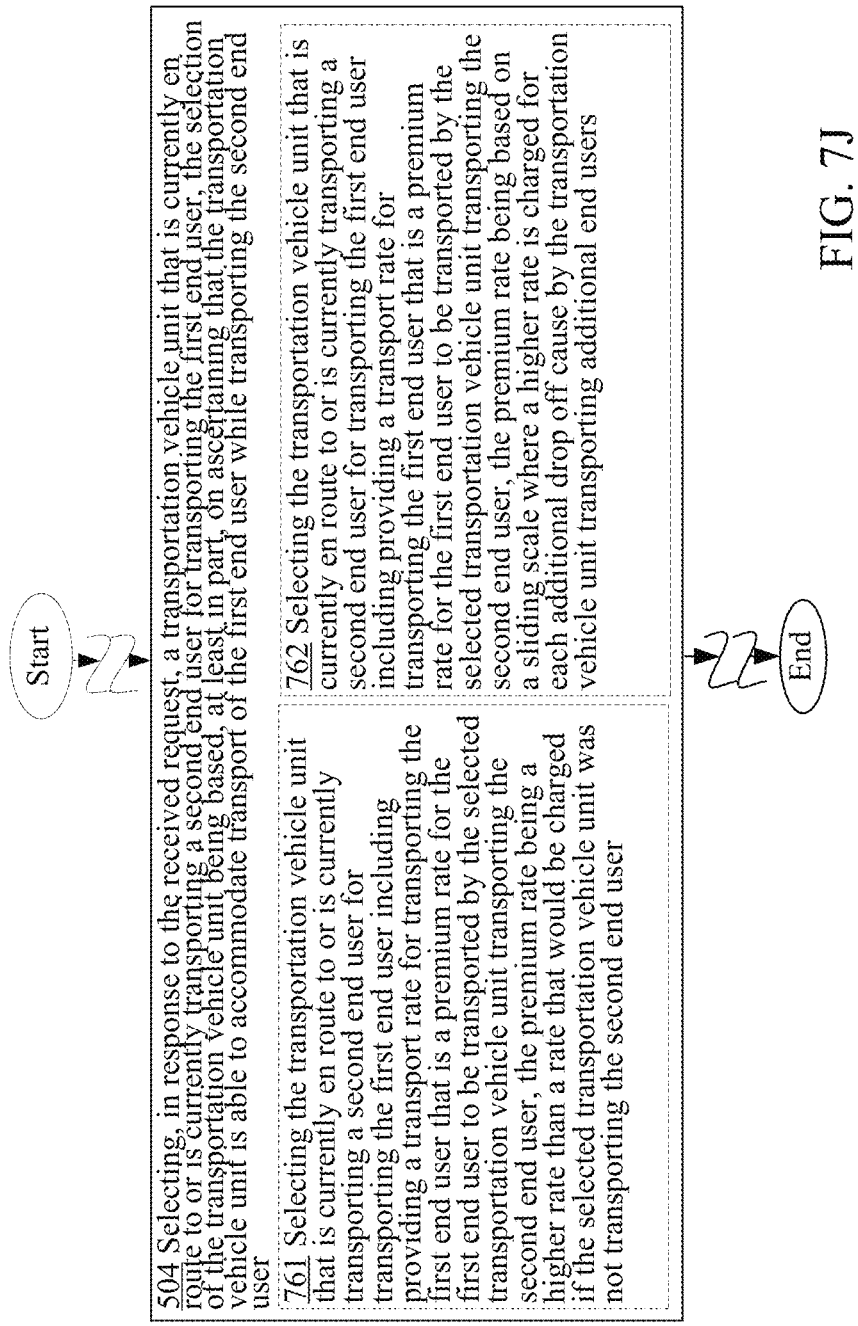
FIG. 7J is a high-level logic flowchart of a process depicting alternate implementations of the transportation vehicle unit selecting operation 504 of FIG. 5.

Referring to FIG. 7J, in some implementations, the transportation vehicle unit selecting operation 504 may include an operation 761 for selecting the transportation vehicle unit that is currently en route to or is currently transporting a second end user for transporting the first end user including providing a transport rate for transporting the first end user that is a premium rate for the first end user to be transported by the selected transportation vehicle unit transporting the second end user, the premium rate being a higher rate than a rate that would be charged if the selected transportation vehicle unit was not transporting the second end user. For instance, the transportation vehicle unit selecting module 204* including the transport rate providing module 330 of the real-time carpooling management system 10* of FIG. 2A or 2B selecting the transportation vehicle unit 20*a* that is currently en route to or is currently transporting a second end user 12*b* for transporting the first end user 12*a* including the transport rate providing module 330 providing (e.g., calculating, generating, or retrieving) a transport rate for transporting the first end user 12*a* that is a premium rate for the first end user 12*a* to be transported by the selected transportation vehicle unit 20*a* transporting the second end user 12*b*, the premium rate being a higher rate than a rate that would be charged if the selected transportation vehicle unit 20* was not transporting the second end user 12*a*. For example, if the second end user 12*b* requests that the transportation vehicle unit 20*a* transporting the second end user 12*b* carry other passengers, than the additional passengers (e.g., first end user 12*a*) be charged a higher transport rate for inconveniencing the second end user 12*b*. In another example, it may be policy by the company coordinating the matching of passengers to carpooling vehicles to charge higher fees to passengers who are last second additions or later additions to a carpooling vehicle (e.g., transportation vehicle unit 20*a*).

In some implementations, the transportation vehicle unit selecting operation 504 may include an operation 762 for selecting the transportation vehicle unit that is currently en route to or is currently transporting a second end user for transporting the first end user including providing a transport rate for transporting the first end user that is a premium rate for the first end user to be transported by the selected transportation vehicle unit transporting the second end user, the premium rate being based on a sliding scale where a higher rate is charged for each additional drop off cause by the transportation vehicle unit transporting additional end users. For instance, the transportation vehicle unit selecting module 204* including the transport rate providing module 330 of the real-time carpooling management system 10* of FIG. 2A or 2B selecting the transportation vehicle unit 20*a* that is currently en route to or is currently transporting a second end user 12*b* for transporting the first end user 12*a* including the transport rate providing module 330 providing a transport rate for transporting the first end user 12*a* that is a premium rate for the first end user 12*a* to be transported by the selected transportation vehicle unit 20*a* transporting the second end user 12*b*, the premium rate being based on a sliding scale where a higher rate is charged for each additional drop off cause by the transportation vehicle unit 20*a* transporting additional end users (e.g., the first end user 12*a*).

Referring back to the directive transmitting operation 506 of FIG. 5, the directive transmitting operation 506 similar to the request receiving operation 502 and the transportation vehicle unit selecting operation 504 of FIG. 5 may be executed in a number of different ways in various alternative embodiments as illustrated, for example, in FIG. 8. In some cases, for example, the directive transmitting operation 506 may actually include an operation 863 for transmitting the one or more directives electronically to a passenger/vehicle coordinating network system and/or a transport computing device associated with the selected transportation vehicle unit via one or more wireless and/or wired networks. For instance, the directive transmitting module 206* of the real-time carpooling management system 10* of FIG. 2A or 2B transmitting the one or more directives electronically to a passenger/vehicle coordinating network system 16 (e.g., a network server such as a workstation) and/or a transport computing device 22 (e.g., a mobile computing device or a dedicated computing system) associated with the selected transportation vehicle unit 20*a* via one or more wireless and/or wired networks 18.

In various implementations, the directive transmitting operation 506 may include an operation 864 for transmitting the one or more directives by transmitting one or more directives that identify a rendezvous location for rendezvousing with the first end user. For instance, the directive transmitting module 206* of the real-time carpooling management system 10* of FIG. 2A or 2B transmitting the one or more directives by transmitting one or more directives that identify a rendezvous location for rendezvousing with the first end user 12*a*.

As further illustrated in FIG. 8, in some implementations, operation 864 may further include an operation 865 for transmitting the one or more directives that identify a rendezvous location for rendezvousing with the first end user, the rendezvous location that is identified also being the rendezvous location for rendezvousing with the second end user. For instance, the directive transmitting module 206* of the real-time carpooling management system 10* of FIG. 2A or 2B transmitting the one or more directives that identify a rendezvous location for rendezvousing with the first end user 12*a*, the rendezvous location that is identified also being the rendezvous location for rendezvousing with the second end user 12*b* (see, for example, the exemplary scenario illustrated in FIG. 4D, in which both the first end user 12*a* and the second end user 12*b* rendezvous with the transportation vehicle unit 20*a* at a common rendezvous location 420).

In some cases, operation 865 may, in turn, further include an operation 866 for transmitting the one or more directives that identify a rendezvous location for rendezvousing with the first end user, the rendezvous location that is identified also being the rendezvous location for rendezvousing with the second end user, the one or more directives further identifying a single destination location for dropping off the first and the second end users. For instance, the directive transmitting module 206* of the real-time carpooling management system 10* of FIG. 2A or 2B transmitting the one or more directives that identify a rendezvous location for rendezvousing with the first end user 12*a*, the rendezvous location that is identified also being the rendezvous location for rendezvousing with the second end user 12*b*, the one or more directives further identifying a single destination location for dropping off the first end user 12*a* and the second end user 12*b* (see, for example, the exemplary scenario illustrated in FIG. 4D in which the transportation vehicle unit 20*a* transports the first and second end users from a common rendezvous location 420 to a single common destination location 422).

In various implementations, the directive transmitting operation 506 may include an operation 867 for transmitting the one or more directives including transmitting transport rate data that indicates at least one transport rate for the first end user being transported by the transportation vehicle unit and that is based, at least in part, on the transportation vehicle unit transporting one or more other end users including the second end user. For instance, the directive transmitting module 206* including the transport rate data transmitting module 332 (see FIG. 3B) of the real-time carpooling management system 10* of FIG. 2A or 2B transmitting the one or more directives including transport rate data transmitting module 332 transmitting transport rate data that indicates at least one transport rate for the first end user 12*a* (e.g., the fee rate being charged to the first end user 12*a*) being transported by the transportation vehicle unit 20*a* and that is based, at least in part, on the transportation vehicle unit 20*a* transporting one or more other end users including the second end user 12*b*. Note that the transport data may be transmitted to a transport computing device 22 associated with the selected transportation vehicle unit 20*a* and/or to an end user device 14 associated with the first end user 12*a*.

In some implementations, operation 867 may further include an operation 868 for transmitting transport rate data that indicates at least one discounted transport rate for the first end user being transported by the transportation vehicle unit, the discounting of the discounted transport rate being based, at least in part, on the transportation vehicle unit transporting one or more other end users including the second end user. For instance, the transport rate data transmitting module 332 of the real-time carpooling management system 10* of FIG. 2A or 2B transmitting transport rate data that indicates at least one discounted transport rate for the first end user 12*a* being transported by the transportation vehicle unit 20*a*, the discounting of the discounted transport rate being based, at least in part, on the transportation vehicle unit 20*a* transporting one or more other end users including the second end user 12*b*. For example, the discounting of the discount transport rate may be greater when there are a greater number of passengers are being transported by the transportation vehicle unit 20*a* or when a greater number of passenger drop-offs will occur before drop off of the first end user 12*a*.

In various implementations, the directive transmitting operation 506 may include an operation 869 for transmitting the one or more directives including transport rate data that indicates transport rate for the second end user and that is based, at least in part, on the transportation vehicle unit transporting the first end user. For instance, the directive transmitting module 206* including the transport rate data transmitting module 332 of the real-time carpooling management system 10* of FIG. 2A or 2B transmitting the one or more directives including the transport rate data transmitting module 332 transmitting transport rate data that indicates transport rate for the second end user 12*b* and that is based, at least in part, on the transportation vehicle unit transporting the first end user 12*a*. Note that the transport data may be transmitted to a transport computing device 22 associated with the selected transportation vehicle unit 20*a* and/or to an end user device 14 associated with the second end user 12*b*.

In some implementations, operation 869 may further include an operation 870 for transmitting transport rate data that indicates at least one discounted transport rate for the second end user being transported by the transportation vehicle unit, the discounting of the discounted transport rate being based, at least in part, on the transportation vehicle unit transporting one or more other end users including the first end user. For instance, the transport rate data transmitting module 332 of the real-time carpooling management system 10* of FIG. 2A or 2B transmitting transport rate data that indicates at least one discounted transport rate for the second end user 12*b* being transported by the transportation vehicle unit 20*a*, the discounting of the discounted transport rate being based, at least in part, on the transportation vehicle unit 20*a* transporting one or more other end users including the first end user 12*a*. Note that in some cases, the discounted rate charged to the second end user 12*b* may be lower than the discounted rate charged to the first end user 12*a* since at least in some cases it may be more of an inconvenience for the second end user 12*b* to be transported with the first end user 12*a* (e.g., if the second end user 12*b* was already picked up and the transportation vehicle unit 20*a* is rerouted to secure the first end user 12*a*).

Figure 9:
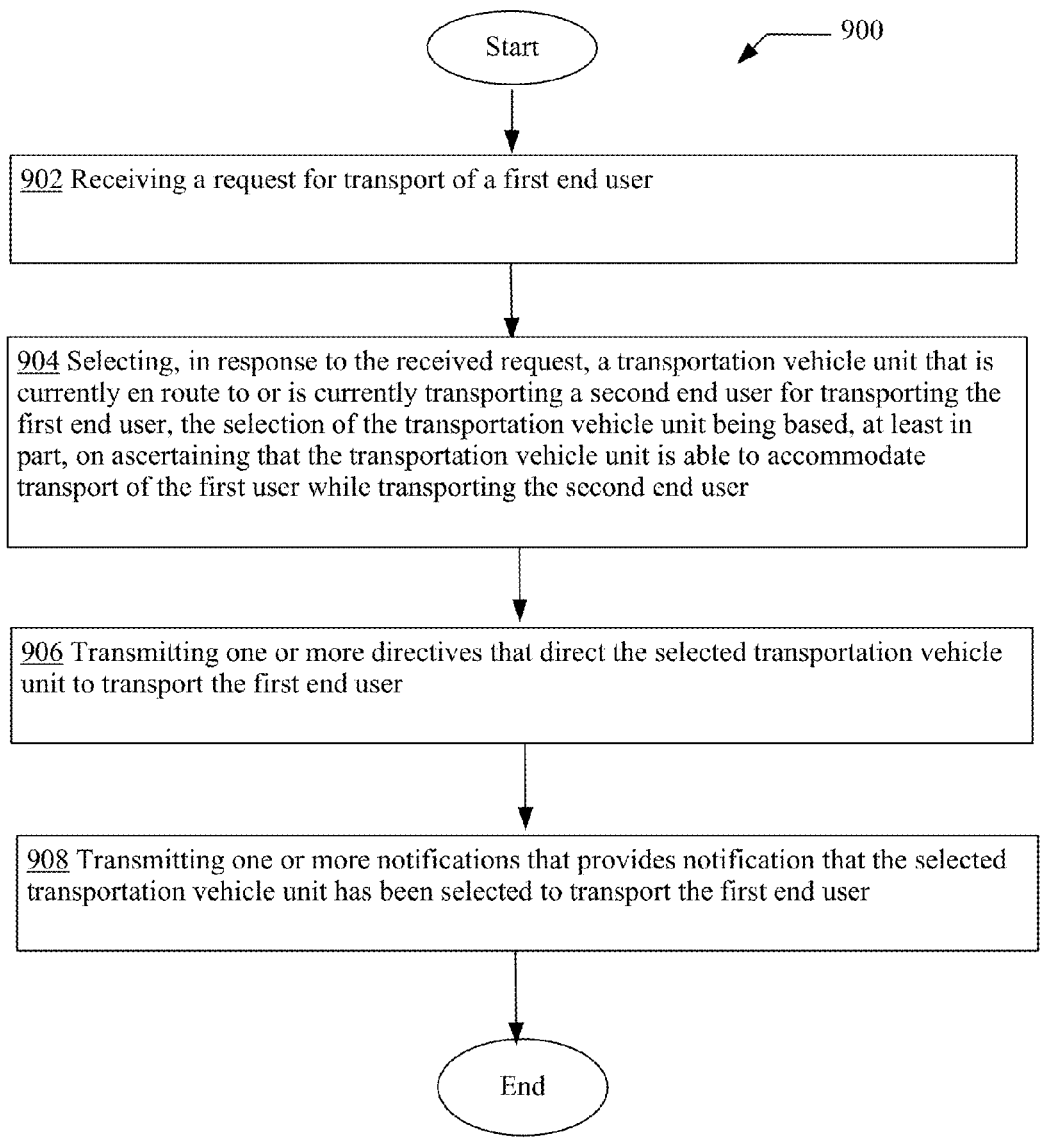
FIG. 9 is a high-level logic flowchart of another process, e.g., operational flow 900, according to some embodiments.

Turning now to FIG. 9 illustrating another operational flow 900. Operational flow 900 includes certain operations that mirror the operations included in operational flow 500 of FIG. 5. These operations include a request receiving operation 902, a transportation vehicle unit selecting operation 904, and a directive transmitting operation 906 that corresponds to and mirrors the request receiving operation 502, the transportation vehicle unit selecting operation 504, and the directive transmitting operation 506, respectively, of FIG. 5.

In addition, operational flow 900 further includes a notification transmitting operation 908 for transmitting one or more notifications that provide notification that the selected transportation vehicle unit has been selected to transport the first end user. For instance, the notification transmitting module 208* of the real-time carpooling management system 10* of FIG. 2A or 2B transmitting one or more notifications that provide notification that the selected transportation vehicle unit 20*a* has been selected to transport the first end user 12*a*. In some cases, the one or more notifications may identify the transportation vehicle unit 20*a* (e.g., vehicle ID, driver name, vehicle location, etc.).

Figure 10A:
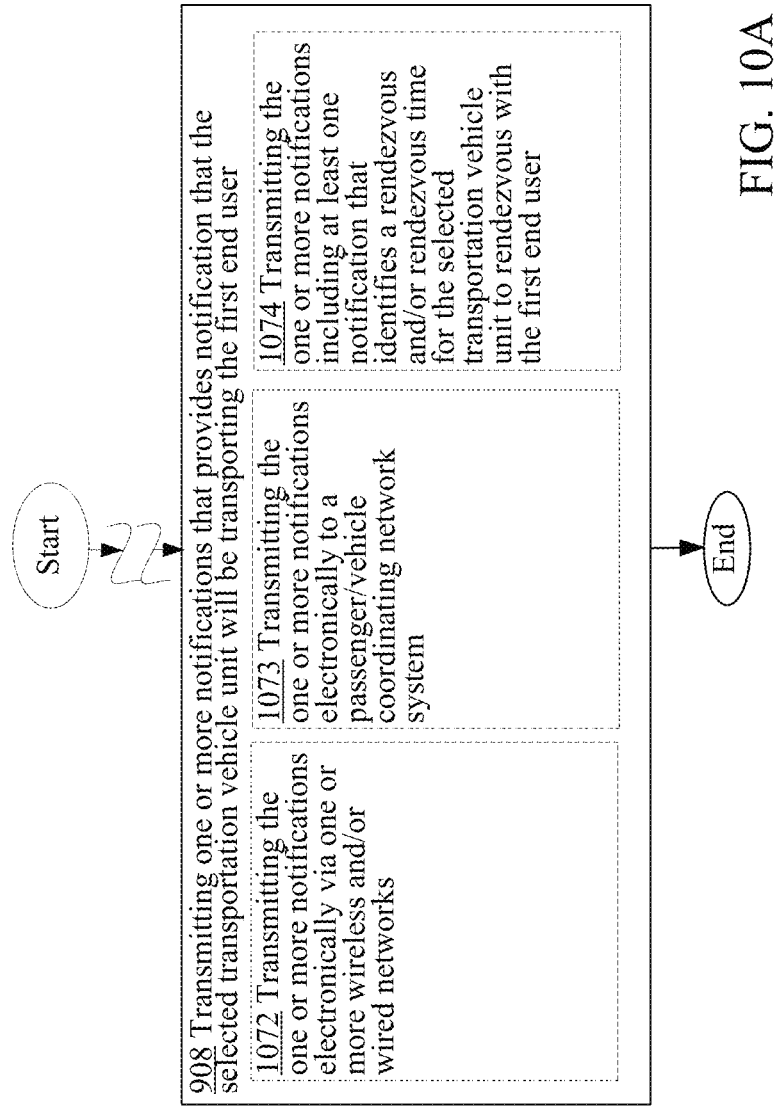
FIG. 10A is a high-level logic flowchart of a process depicting alternate implementations of the notification transmitting operation 908 of FIG. 9.
Figure 10B:
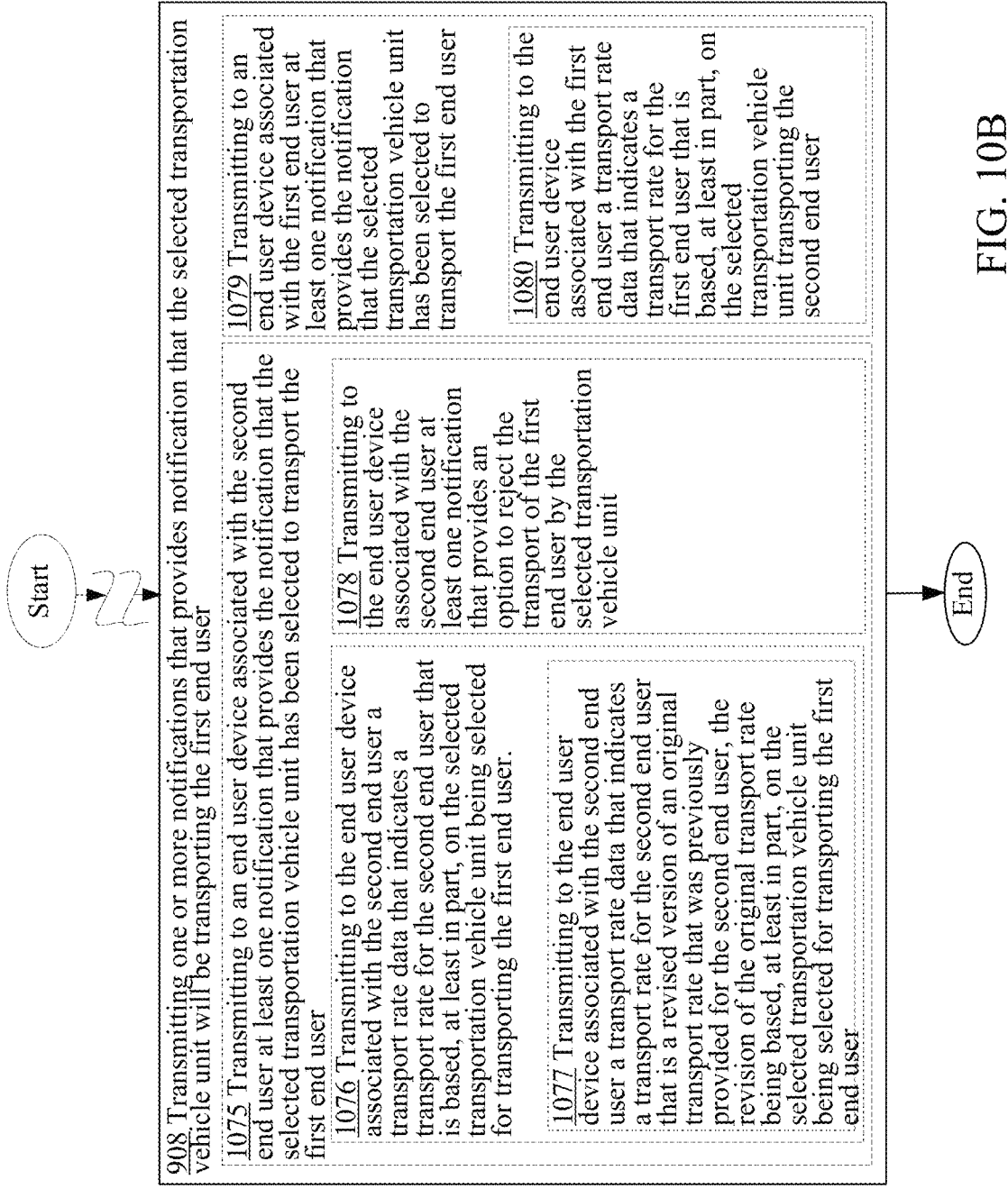
FIG. 10B is a high-level logic flowchart of a process depicting alternate implementations of the notification transmitting operation 908 of FIG. 9.

As further illustrated in FIGS. 10A and 10B, the notification transmitting operation 908 may actually include one or more additional operations. For example, in some implementations, the notification transmitting operation 908 may include an operation 1072 for transmitting the one or more notifications electronically via one or more wireless and/or wired networks as illustrated in FIG. 10A. For instance, the notification transmitting module 208* of the real-time carpooling management system 10* of FIG. 2A or 2B transmitting the one or more notifications electronically (through a network interface 240) via one or more wireless and/or wired networks 18. In some cases, the one or more notifications may be further transmitted via the Internet.

In the same or alternative implementations, the notification transmitting operation 908 may include an operation 1073 for transmitting the one or more notifications electronically to a passenger/vehicle coordinating network system. For instance, the notification transmitting module 208* of the real-time carpooling management system 10* of FIG. 2A or 2B transmitting the one or more notifications electronically to a passenger/vehicle coordinating network system 16.

In the same or alternative implementations, the notification transmitting operation 908 may include an operation 1074 for transmitting the one or more notifications including at least one notification that identifies a rendezvous and/or rendezvous time for the selected transportation vehicle unit to rendezvous with the first end user. For instance, the notification transmitting module 208* of the real-time carpooling management system 10* of FIG. 2A or 2B transmitting the one or more notifications including at least one notification that identifies a rendezvous and/or rendezvous time for the selected transportation vehicle unit 20a to rendezvous with the first end user 12a.

Referring to FIG. 10B, in various implementations, the notification transmitting operation 908 may include an operation 1075 for transmitting to an end user device associated with the second end user at least one notification that provides the notification that the selected transportation vehicle unit has been selected to transport the first end user. For instance, the notification transmitting module 208* of the real-time carpooling management system 10* of FIG. 2A or 2B transmitting (directly or indirectly) to an end user device 14 associated with the second end user 12b at least one notification that provides the notification that the selected transportation vehicle unit 20a has been selected (e.g., assigned) to transport the first end user 12a. In some cases, the notification that is transmitted may indicate the estimated delay that may be incurred to transport the second end user 12b and as a result of the selected transportation vehicle unit 20a transporting the first end user 12a.

As further illustrated in FIG. 10B, in some implementations, operation 1075 may further include an operation 1076 for transmitting to the end user device associated with the second end user a transport rate data that indicates a transport rate for the second end user that is based, at least in part, on the selected transportation vehicle unit being selected for transporting the first end user. For instance, the transport rate data transmitting module 334 (see FIG. 3D) of the real-time carpooling management system 10* of FIG. 2A or 2B transmitting to the end user device 14 associated with the second end user 12b a transport rate data that indicates a transport rate (e.g., a discounted transport rate) for the second end user 12b that is based, at least in part, on the selected transportation vehicle unit 20a being selected for transporting the first end user 12a.

In some cases, operation 1076 may, in turn, further include an operation 1077 for transmitting to the end user device associated with the second end user a transport rate data that indicates a transport rate for the second end user that is a revised version of an original transport rate that was previously provided for the second end user, the revision of the original transport rate being based, at least in part, on the selected transportation vehicle unit being selected for transporting the first end user. For instance, the transport rate data transmitting module 334 of the real-time carpooling management system 10* of FIG. 2A or 2B transmitting to the end user device 14 associated with the second end user 12b a transport rate data that indicates a transport rate for the second end user 12b that is a revised version of an original transport rate that was previously provided (e.g., previously transmitted) for the second end user 12b, the revision of the original transport rate being based, at least in part, on the selected transportation vehicle unit 20a being selected for transporting the first end user 12a.

In the same or alternative implementations, operation 1075 may include an operation 1078 for transmitting to the end user device associated with the second end user at least one notification that provides an option to reject the transport of the first end user by the selected transportation vehicle unit. For instance, the notification transmitting module 208* of the real-time carpooling management system 10* of FIG. 2A or 2B transmitting to the end user device 14 associated with the second end user 12b at least one notification that provides an option to reject the transport of the first end user 12b by the selected transportation vehicle unit 20a. For example, if the second end user 12b is unhappy with the delay in getting to the destination of the second end user 12b that may incur as a result the selected transportation vehicle unit 20a transporting the first end user 12a, then the second end user 12b may elect to reject the assignment of the first end user 12a to the selected transportation vehicle unit 20a.

In various implementations, the notification transmitting operation 908 may include an operation 1079 for transmitting to an end user device associated with the first end user at least one notification that provides the notification that the selected transportation vehicle unit has been selected to transport the first end user. For instance, the notification transmitting module 208* of the real-time carpooling management system 10* of FIG. 2A or 2B transmitting (directly or indirectly) to an end user device 14 associated with the first end user 12a at least one notification that provides the notification that the selected transportation vehicle unit 20a has been selected to transport the first end user 12a.

In some cases, operation 1079 may further include an operation 1080 for transmitting to the end user device associated with the first end user a transport rate data that indicates a transport rate for the first end user that is based, at least in part, on the selected transportation vehicle unit transporting the second end user. For instance, the transport rate data transmitting module 334 of the real-time carpooling management system 10* of FIG. 2A or 2B transmitting to the end user device 14 associated with the first end user 12a a transport rate data that indicates a transport rate (e.g., discounted rate) for the first end user 12a that is based, at least in part, on the selected transportation vehicle unit 20 transporting the second end user 12b.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
   circuitry for receiving a request for transport of a first end user;
   circuitry for selecting, responsive to the received request a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user;
   circuitry for transmitting one or more directives for the selected transportation vehicle unit to transport the first end user; and
   circuitry for transmitting one or more notifications that the selected transportation vehicle unit has been selected to transport the first end user.

2. The system of claim 1, wherein said-circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
  circuitry for selecting, responsive to the received request a transportation vehicle unit for transporting the first end user that is currently en route to or is currently transporting a second end user, the selection of the transportation vehicle unit based, at least in part, on (i) a location of the transportation vehicle unit sensed at least in part via at least one satellite-based positioning sensor of a transport computing device within the transportation vehicle unit and (ii) ascertaining that the transportation vehicle unit is able to accommodate transport of the first end user while for transporting the second end user.

3. The system of claim 1, wherein circuitry for selecting, responsive to the received request, a transportation vehicle unit for transporting the first end user that is currently en route to or is currently transporting a second end user, the selection of the transportation vehicle unit based, at least in part, in (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
  circuitry for selecting a transportation vehicle unit that is currently transporting a second end user for transporting the first end user, the selection being based, at least in part, on ascertainment that the transportation vehicle unit is currently transporting the second end user and that is ascertained to be currently located within at least one of a predefined maximum distance or a predetermined maximum amount of time from a first end user rendezvous location for rendezvousing with the first end user.

4. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
  circuitry for selecting the transportation vehicle unit that is currently en route to or is currently transporting a second end user for transporting the first end user, the selection being based, at least in part on ascertainment that the transportation vehicle unit is currently transporting the second end user and that is ascertained to be currently located at a location that is same as a first end user rendezvous location for rendezvousing with the first end user.

5. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
  circuitry for selecting the transportation vehicle unit for transporting the first end user based, at least in part, on ascertainment that the transportation vehicle unit is to rendezvous with the second end user at a rendezvous location that is ascertained to be the same as the rendezvous location for the first end user.

6. The system of claim 5, wherein circuitry for selecting the transportation vehicle unit for transporting the first end user based, at least in part, on ascertainment that the transportation vehicle unit is to rendezvous with the second end user at a rendezvous location that is ascertained to be the same as the rendezvous location for the first end user comprises:
  circuitry for selecting the transportation vehicle unit for transporting the first end user based on ascertainment that the first end user and the second end user are to be transported to a single destination location.

7. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
  circuitry for ascertaining that the transportation vehicle unit will be transporting the second end user to a second end user destination location that is near to a first end user destination location of the first end user.

8. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises: circuitry for selecting, responsive to the received request a transportation vehicle unit for transporting the first end user that is currently en route to or is currently transporting a second end user, the selection of the transportation vehicle unit based, at least in part, on (i) ascertaining that the transportation vehicle unit is approaching a current location of the first end user based, at least in part, on a location of the transportation vehicle unit sensed at least in part via at least one hardware-based positioning sensor of a transport computing device within the transportation vehicle unit and a location of the first end user sensed at least in part via at least one hardware-based positioning sensor of a computing device associated with the first end user sending the received request and (ii)ascertaining that the transportation vehicle unit is able to accommodate transport of the first end user a while transporting the second end user.

9. The system of claim 8, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that transport of the first end user by the transportation vehicle unit will not significantly delay transport of the second end user to a second end user destination location comprises:
   circuitry for selecting, responsive to the received request a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that transport of the first end user by the transportation vehicle unit will not add more than a predefined amount of permitted additional distance for transporting the second end user to a second end user destination location and as a result of transporting the first end user.

10. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
   circuitry for ascertaining that transport of the first end user to a first end user destination location by the transportation vehicle unit will not result in the transportation vehicle unit to have a total number of passenger drop offs that exceed a predefined number of maximum passenger drop offs allowed for the transportation vehicle unit during one trip transporting a group of end users to one or more end user destination locations.

11. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
   circuitry for ascertaining that transport of the first end user to a first end user destination location by the transportation vehicle unit will not result in the transportation vehicle unit to have an amount of passenger drop offs that exceed a predefined number of maximum passenger drop offs allowed for the transportation vehicle unit prior to drop off of the second end user at a second end user destination location.

12. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
   circuitry for ascertaining that transport of the first end user and at least the second end user by the transportation vehicle unit will not result in the transportation vehicle unit to have an amount of passenger drop offs that exceed a predefined number of maximum passenger drop offs allowed for the transportation vehicle unit prior to drop off of the first end user at a first end user destination location.

13. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
   circuitry for selecting the transportation vehicle unit that is currently en route to or is currently transporting a second end user for transporting the first end user only after ascertaining that no non-carpooling vehicle is available for transporting the first end user.

14. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
   circuitry for ranking two or more candidate transportation vehicle units as candidates for transporting the first end user, each of the two or more candidate transportation vehicle units currently en route to or currently transporting one or more end users, and the transportation vehicle unit selected from the two or more candidate transportation vehicle units, the two or more candidate transportation vehicle units ranked according to their suitability for transporting the first end user.

15. The system of claim 14, wherein comprises:
   circuitry for ranking two or more candidate transportation vehicle units as candidates for transporting the first end user, each of the two or more candidate transportation vehicle units currently en route to or currently transporting one or more end users, and the transportation vehicle unit selected from the two or more candidate transportation vehicle units, the two or more candidate transportation vehicle units ranked according to their suitability for transporting the first end user comprises:
circuitry for ranking the two or more candidate transportation vehicle units based, at least in part, on their efficiency in transporting the first end user and other end users to their end user destination locations.

16. The system of claim 15, wherein circuitry for ranking the two or more candidate transportation vehicle units based, at least in part, on their efficiency in transporting the first end user and other end users to their end user destination locations comprises:
circuitry for ranking the two or more candidate transportation vehicle units based, at least in part, on the number of passenger drop offs they will each have if each of the candidate transportation vehicle units transport the first end user.

17. The system of claim 15, wherein circuitry for ranking the two or more candidate transportation vehicle units based, at least in part, on their efficiency in transporting the first end user and other end users to their end user destination locations comprises:
circuitry for ranking the two or more candidate transportation vehicle units based, at least in part, on the distances they will each have to travel to drop off each of their currently assigned passengers and if each of the candidate transportation vehicle units transport the first end user.

18. The system of claim 1, wherein said circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
circuitry for providing a transport rate for transporting the second end user that is discounted as a result, at least in part, of the transportation vehicle unit being assigned to transport the first end user.

19. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
circuitry for providing a transport rate for transporting the first end user that is a discounted rate for the first end user to be transported by the selected transportation vehicle unit transporting one or more other end users including the second end user, the discounted rate being a rate that has been discounted from a rate that would be charged if the selected transportation vehicle unit was transporting fewer end users.

20. The system of claim 19, wherein circuitry for providing a transport rate for transporting the first end user that is a discounted rate for the first end user to be transported by the selected transportation vehicle unit transporting one or more other end users including the second end user, the discounted rate being a rate that has been discounted from a rate that would be charged if the selected transportation vehicle unit was transporting fewer end users comprises:
circuitry for providing a transport rate for transporting the first end user that is a discounted rate for the first end user to be transported by the selected transportation vehicle unit transporting one or more other end users including the second end user, the discounted rate being based, at least in part, on the number of passenger drop offs that are scheduled to occur prior to drop off of the first end user at a first end user destination location.

21. The system of claim 1, wherein circuitry for selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user comprises:
circuitry for providing a transport rate for transporting the first end user that is a premium rate for the first end user to be transported by the selected transportation vehicle unit transporting the second end user, the premium rate being a higher rate than a rate that would be charged if the selected transportation vehicle unit was not transporting the second end user.

22. The system of claim 1, wherein circuitry for transmitting one or more directives for the selected transportation vehicle unit to transport the first end user comprises:
circuitry for transmitting the one or more directives electronically to at least one of a passenger/vehicle coordinating network system or the transport computing device within the selected transportation vehicle unit via at least one of one or more wireless networks or one or more wired networks.

23. The system of claim 1, wherein circuitry for transmitting one or more directives for the selected transportation vehicle unit to transport the first end user comprises:
circuitry for transmitting transport rate data that indicates at least one transport rate for the first end user being transported by the transportation vehicle unit and that is based, at least in part, on the transportation vehicle unit transporting one or more other end users including the second end user.

24. The system of claim 23, wherein circuitry for transmitting transport rate data that indicates at least one transport rate for the first end user being transported by the transportation vehicle unit and that is based, at least in part, on the transportation vehicle unit transporting one or more other end users including the second end user comprises:
circuitry for transmitting transport rate data that indicates at least one discounted transport rate for the first end user being transported by the transportation vehicle unit, the discounting of the discounted transport rate being based, at least in part, on the transportation vehicle unit transporting one or more other end users including the second end user.

25. The system of claim 1, wherein circuitry for transmitting one or more directives for the selected transportation vehicle unit to transport the first end user comprises:
    circuitry for transmitting at least one transport rate data for the second end user based, at least in part, on the transportation vehicle unit transporting the first end user.

26. The system of claim 25, wherein circuitry for transmitting at least one transport rate data for the second end user based, at least in part, on the transportation vehicle unit transporting the first end user comprises:
    circuitry for transmitting at least one discounted transport rate for the second end user based, at least in part, on the transportation vehicle unit transporting the first end user.

27. The system of claim 1, wherein said-circuitry for transmitting one or more notifications that the selected transportation vehicle unit has been selected to transport the first end user comprises:
    circuitry for transmitting to an end user device associated with the second end user at least one notification that the selected transportation vehicle unit has been selected to transport the first end user.

28. The system of claim 27, wherein circuitry for transmitting to an end user device associated with the second end user at least one notification that the selected transportation vehicle unit has been selected to transport the first end user comprises:
    circuitry for transmitting to the end user device associated with the second end user at least one transport rate for the second end user based, at least in part, on the transportation vehicle unit transporting the first end user.

29. The system of claim 28, wherein circuitry for transmitting to the end user device associated with the second end user at least one transport rate for the second end user based, at least in part, on the transportation vehicle unit transporting the first end user comprises:
    circuitry for transmitting to the end user device associated with the second end user at least one transport rate for the second end user that is a revised version of an original transport rate previously provided for the second end user based, at least in part, on the transportation vehicle unit transporting the first end user.

30. The system of claim 27, wherein said-circuitry for transmitting to an end user device associated with the second end user at least one notification that the selected transportation vehicle unit has been selected to transport the first end user comprises:
    circuitry for transmitting to the end user device associated with the second end user at least one notification that provides an option to reject the transport of the first end user by the selected transportation vehicle unit.

31. The system of claim 1, wherein transmitting one or more notifications that the selected transportation vehicle unit has been selected to transport the first end user comprises:
    circuitry for transmitting to an end user device associated with the first end user at least one notification that the selected transportation vehicle unit has been selected to transport the first end user.

32. The system of claim 31, wherein circuitry for transmitting to an end user device associated with the first end user at least one notification that the selected transportation vehicle unit has been selected to transport the first end user comprises:
    circuitry for transmitting to the end user device associated with the first end user a transport rate data that indicates a transport rate for the first end user that is based, at least in part, on the selected transportation vehicle unit transporting the second end user.

33. The system of claim 1, wherein circuitry for receiving a request for transport of a first end user comprises:
    circuitry for receiving a request for a carpooling vehicle to transport the first end user and that will be transporting one or more other end users not associated with the first end user.

34. The system of claim 33, wherein circuitry for receiving a request for a carpooling vehicle to transport the first end user and that will be transporting one or more other end users not associated with the first end user comprises:
    circuitry for receiving a request for a carpooling vehicle to transport the first end user and that will be transporting one or more other end users not associated with the first end user by receiving a request that requests, as a first option, a carpooling vehicle to transport the first end user and, if no carpooling vehicle is found to transport the first end user, a second option for a non-carpooling vehicle to transport the first end user.

35. The system of claim 1, wherein circuitry for transmitting one or more notifications that the selected transportation vehicle unit has been selected to transport the first end user comprises:
    circuitry for transmitting, to an end user device associated with the first end user, at least one notification identifying at least one rendezvous location for the selected transportation vehicle unit to rendezvous with the first end user, the at least one rendezvous location other than a current location of the first end user determined based, at least in part, on the current location of the first end user sensed at least in part via at least one hardware-based positioning sensor of a computing device associated with the first end user sending the received request.

36. A method, comprising:
receiving a request for transport of a first end user;
selecting, responsive to the received request, a transportation vehicle unit for transporting the first end user that is currently en route to or is currently transporting a second end user, the selection of the transportation vehicle unit based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user;
transmitting one or more directives for the selected transportation vehicle unit to transport the first end user and
transmitting one or more notifications that the selected transportation vehicle unit has been selected to transport the first end user,
wherein at least one of the receiving, selecting, or transmitting is at least partially implemented using at least one processing device.

37. A system, comprising:
at least one computing device; and
one or more instructions which, when executed by the at least one computing device, cause the at least one computing device to perform one or more operations including at least:
    receiving a request for transport of a first end user;

selecting, responsive to the received request, a transportation vehicle unit for transporting the first end user that is currently en route to or is currently transporting a second end user for, the selection of the transportation vehicle unit being based, at least in part, on (i) a location of the transportation vehicle unit sensed at least in part via at least one hardware-based positioning sensor of a transport computing device within the transportation vehicle unit and (ii) ascertaining that the transportation vehicle unit is able to accommodate transport of the first end user while transporting the second end user;

transmitting one or more directives for the selected transportation vehicle unit to transport the first end user and transmitting one or more notifications that the selected transportation vehicle unit has been selected to transport the first end user.

* * * * *

UNITED STATES PATENT AND TRADEMARK OFFICE
CERTIFICATE OF CORRECTION

PATENT NO. : 9,689,694 B2
APPLICATION NO. : 14/564358
DATED : June 27, 2017
INVENTOR(S) : Richard T. Lord et al.

It is certified that error appears in the above-identified patent and that said Letters Patent is hereby corrected as shown below:

In Column 55, Line 1, Claim 2 "The system of claim 1, wherein said-circuitry for" should be --The system of claim 1, wherein circuitry for--
In Column 55, Line 13, Claim 2 "circuitry for selecting, responsive to the received request" should be --circuitry for selecting, responsive to the received request,--
In Column 55, Line 24, Claim 2 "transport of the first end user while for transporting the" should be --transport of the first end user while transporting the--
In Column 55, Lines 43-44, Claim 3 "one of a predefined maximum distance or a predetermined" should be --one of a predefined maximum distance or a predefined--
In Column 55, Line 62, Claim 4 "selection being based, at least in part on ascertainment" should be --selection being based, at least in part, on ascertainment--
In Column 61, Line 4, Claim 25 "circuitry for transmitting at least one transport rate data" should be --circuitry for transmitting at least one transport rate--
In Column 61, Line 9, Claim 26 "at least one transport rate data for the second end" should be --at least one transport rate for the second end--
In Column 61, Line 16, Claim 27 "The system of claim 1, wherein said-circuitry for" should be --The system of claim 1, wherein circuitry for--
In Column 61, Line 46, Claim 30 "The system of claim 27, wherein said-circuitry for" should be --The system of claim 27, wherein circuitry for--
In Column 63, Line 4, Claim 37 "transporting a second end user for, the selection of" should be --transporting a second end user, the selection of--

Signed and Sealed this
Twenty-ninth Day of May, 2018

Andrei Iancu
*Director of the United States Patent and Trademark Office*